United States Patent
Lee et al.

(10) Patent No.: US 9,019,904 B2
(45) Date of Patent: Apr. 28, 2015

(54) METHOD AND BASE STATION FOR TRANSMITTING REFERENCE SIGNALS, AND METHOD AND USER EQUIPMENT FOR RECEIVING REFERENCE SIGNALS

(75) Inventors: Moon Il Lee, Gyeonggi-do (KR); Jae Hoon Chung, Gyeonggi-do (KR); Seung Hee Han, Gyeonggi-do (KR); Min Seok Noh, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 477 days.

(21) Appl. No.: 13/049,847

(22) Filed: Mar. 16, 2011

(65) Prior Publication Data

US 2011/0228735 A1    Sep. 22, 2011

Related U.S. Application Data

(60) Provisional application No. 61/376,174, filed on Aug. 23, 2010, provisional application No. 61/331,314, filed on May 4, 2010, provisional application No. 61/324,234, filed on Apr. 14, 2010, provisional application No. 61/315,398, filed on Mar. 19, 2010, provisional application No. 61/315,023, filed on Mar. 18, 2010, provisional application No. 61/314,544, filed on Mar. 16, 2010.

(30) Foreign Application Priority Data

Feb. 10, 2011 (KR) .................. 10-2011-0011806

(51) Int. Cl.
*H04L 5/00* (2006.01)

(52) U.S. Cl.
CPC .............. *H04L 5/0092* (2013.01); *H04L 5/0016* (2013.01); *H04L 5/0051* (2013.01)

(58) Field of Classification Search
None
See application file for complete search history.

(56) References Cited

U.S. PATENT DOCUMENTS

| | | |
|---|---|---|
| 2009/0109906 A1 | 4/2009 | Love et al. |
| 2011/0199986 A1* | 8/2011 | Fong et al. .................. 370/329 |

FOREIGN PATENT DOCUMENTS

| | | |
|---|---|---|
| CN | 101626620 | 1/2010 |
| JP | 2011-142620 | 7/2011 |
| KR | 10-0964185 | 6/2010 |
| WO | 2009/023730 | 2/2009 |
| WO | 2011-052220 | 5/2011 |

OTHER PUBLICATIONS

Ericsson, Layer-to-antenna port mapping for LTE-Advanced, Feb. 22-26, 2010. 3GPP TSG-RAN #60, pp. 1-6.*

(Continued)

*Primary Examiner* — John Blanton
*Assistant Examiner* — Tito Pham
(74) *Attorney, Agent, or Firm* — Lee, Hong, Degerman, Kang & Waimey

(57) ABSTRACT

A method and apparatus for multiplexing reference signals in a predetermined number of Code Division Multiplexing (CDM) groups to balance power across Orthogonal Frequency Division Multiplexing (OFDM) symbols are disclosed. In a wireless communication system, orthogonal sequences used for spreading the reference signals are allocated such that the order of orthogonal sequences allocated to a subcarrier of one CDM group has a predetermined offset with respect to the order of orthogonal sequences allocated to a subcarrier of another CDM group, adjacent to the subcarrier of the one CDM group.

16 Claims, 42 Drawing Sheets

(56) References Cited

OTHER PUBLICATIONS

Ericsson et al., "Layer-to-antenna port mapping for LTE-Advanced", R1-100848, 3GPP TSG-RAN WG1 #60, Feb. 2010, all pages.*
LG Electronics, "Discussion on DM-RS Port Mapping Definition", R1-101240, 3GPP TSG RAN WG1 Meeting #60, Feb. 2010.
NTT Docomo et al., "Length-4 OCC Mapping Scheme for DM-RS Rank 5-8 in LTE-Advanced", R1-101213, 3GPP TSG RAN WG1 Meeting #60, Feb. 2010.
ZTE, "OCC allocation and OCC mapping", R1-102897, 3GPP TSG RAN WG1 meeting #61, May 2010.
Ericsson et al., "Layer-to-antenna port mapping for LTE-Advanced", R1-100848, 3GPP TSG-RAN WG1 #60, Feb. 2010.
K. Takeda et al., "Investigation on Multi-layer Reference Signal Using Two-Dimensional Orthogonal Codes in OFDMA Downlink Radio Access for LTE-Advanced", The Institute of Electronics, Information and Communication Engineers, RCS2009-187, vol. 109, No. 341, pp. 119-124, Dec. 2009.
Korean Intellectual Property Office Application Serial No. 10-2011-0011806, Notice of Allowance dated Dec. 28, 2012, 2 pages.

* cited by examiner

FIG. 10

FIG. 14
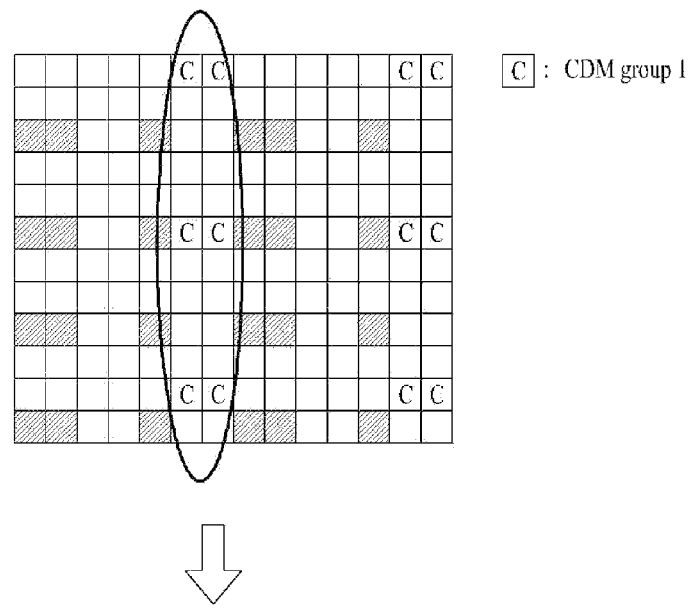
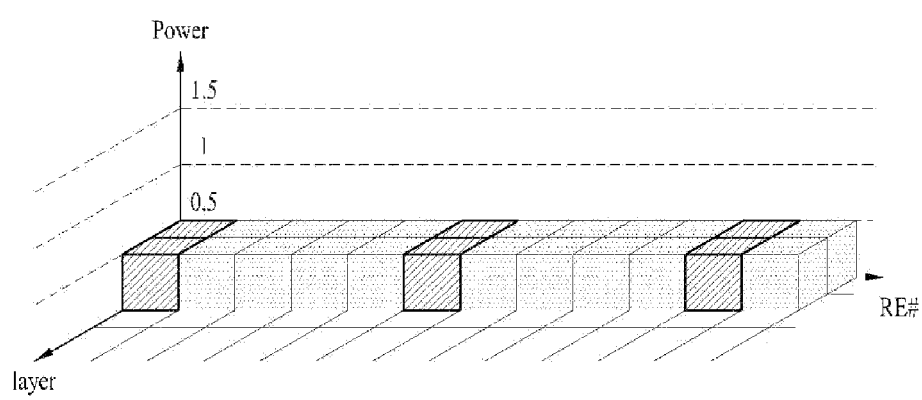
 : RS RE
CDM group 1
(layer 0, layer 1)
 : Data RE FIG. 15
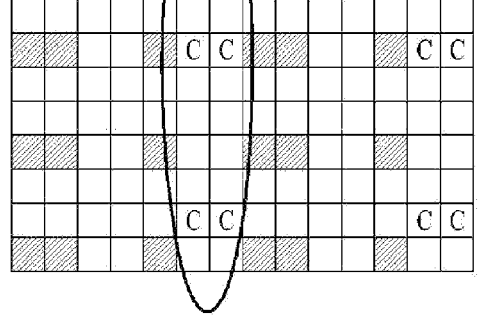
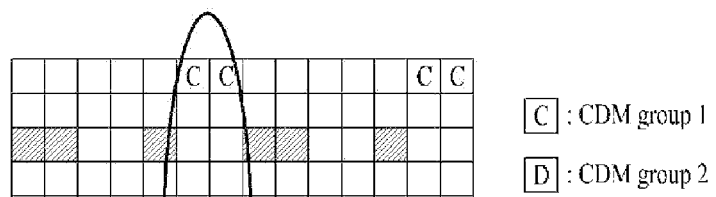
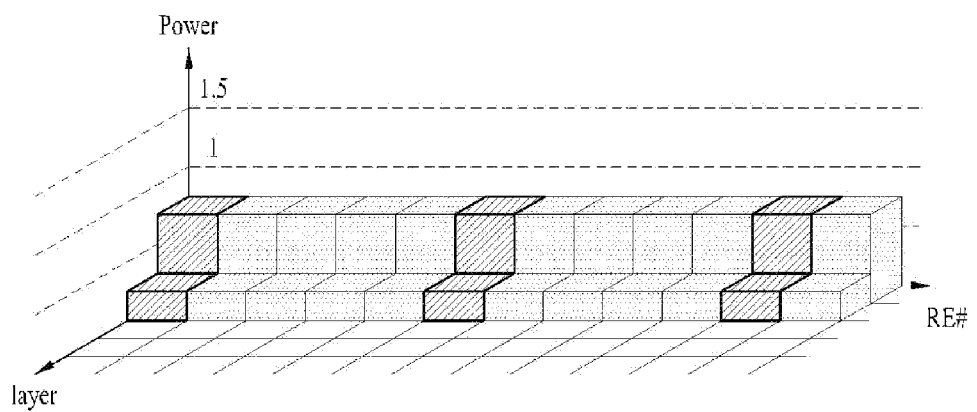
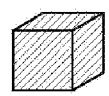 : RS RE
CDM group 1
(layer 0, layer 1)
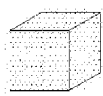 : Data RE

FIG. 16
(a)
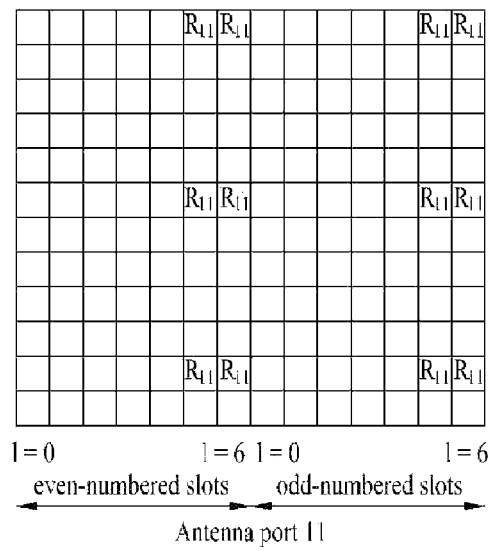
(b)
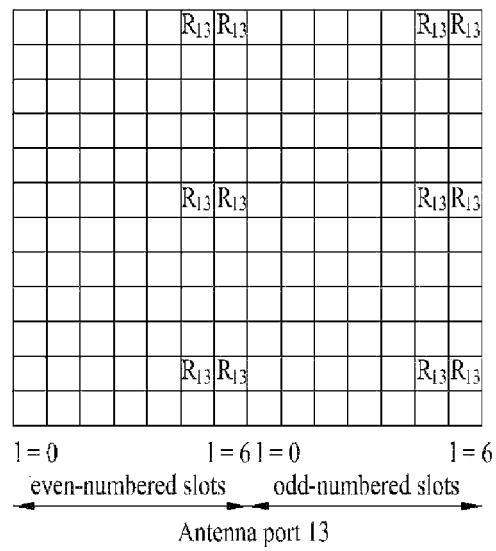
(c)
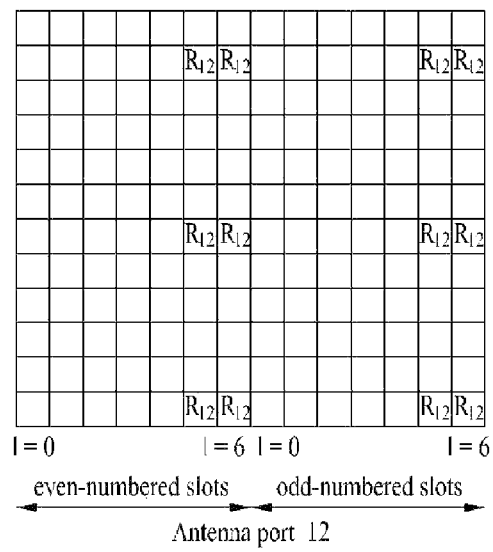
(d)
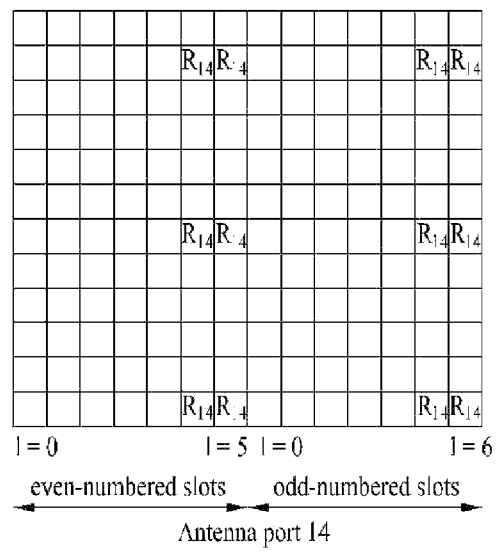

FIG. 30

...a b c d a b c d a b c d...           ...a b c d a b c d a b c d...
                              ⟩ right offset-1                        ⟩ left offset-1
...a b c d a b c d a b c d...           ...a b c d a b c d a b c d...

METHOD AND BASE STATION FOR TRANSMITTING REFERENCE SIGNALS, AND METHOD AND USER EQUIPMENT FOR RECEIVING REFERENCE SIGNALS

CROSS-REFERENCE TO RELATED APPLICATIONS

Pursuant to 35 U.S.C. §119, this application claims the benefit of earlier filing date and right of priority to Korean Application No. 10-2011-0011806 filed on Feb. 10, 2011, and also claims the benefit of U.S. Provisional Application Ser. Nos. 61/376,174, filed on Aug. 23, 2010, 61/331,314, filed on May 4, 2010, 61/324,234, filed on Apr. 14, 2010, 61/315,398, filed on Mar. 19, 2010, 61/315,023, filed on Mar. 18, 2010, and 61/314,544 filed on Mar. 16, 2010, the contents of which are all hereby incorporated by reference herein in their entirety.

BACKGROUND OF THE INVENTION

1. Field of the Invention

The present invention relates to a wireless communication system, and more particularly, to a method and apparatus for transmitting Reference Signals (RSs) for data demodulation and a method and apparatus for receiving RSs for data demodulation.

2. Discussion of the Related Art

Multiple Input Multiple Output (MIMO) has recently attracted interest to maximize the performance and communication capacity of a wireless communication system. Compared to conventional use of a single Transmission (Tx) antenna and a single Reception (Rx) antenna, MIMO adopts a plurality of Tx antennas and a plurality of Rx antennas to thereby increase the transmission and reception efficiency of data. A MIMO system is called a multiple antenna system. MIMO is an application of putting data segments received from a plurality of antennas into a whole message, without depending on a single antenna path to receive the whole message. Consequently, MIMO can increase data transmission rate within a given area or extend system coverage at a given data transmission rate.

MIMO schemes are classified into transmit diversity, spatial multiplexing, and beamforming. Transmit diversity increases transmission reliability by transmitting the same data through multiple Tx antennas. In spatial multiplexing, multiple Tx antennas simultaneously transmit different data and thus high-speed data can be transmitted without increasing a system bandwidth. Beamforming is used to increase the Signal-to-Interference plus Noise Ratio (SINR) of a signal by weighting multiple antennas according to channel states. Weights may be expressed as a weight vector or a weight matrix, called a precoding vector or a precoding matrix.

Spatial multiplexing is further divided into spatial multiplexing for a single user (or Single User MIMO (SU-MIMO)) and spatial multiplexing for multiple users (or Multi-User MIMO (MU-MIMO)).

A Base Station (BS) may transmit a plurality of layers for one or more users. For this purpose, the BS multiplexes the layers into a predetermined time/frequency area and transmits the multiplexed layers to one or more User Equipments (UEs). In general, maximum transmission power available for downlink transmission of the BS is determined by the supported frequency bandwidth, data throughput, and power efficiency of the BS. Because the total transmission power available to the BS is limited to a predetermined value, the BS needs to efficiently allocate transmission power to each subcarrier in an Orthogonal Frequency Division Multiplexing (OFDM) symbol interval.

To demodulate data allocated to a predetermined time/frequency area, a UE estimates the configuration of physical antennas used for the data transmission and channel quality using an RS received from the BS, that is, the UE performs channel estimation using the received RS. Channel estimation and an RS will be described in brief. To detect a synchronization signal, a receiver should have information about a radio channel (e.g. the attenuation, phase shift, time delay, etc. of the radio channel). Channel estimation is the process of estimating the magnitude and reference phase of a carrier. A wireless channel environment is characterized by irregular variations of channel state over time, called fading. The amplitude and phase of the fading channel are estimated through channel estimation. That is, channel estimation refers to estimating the frequency response of a radio interface or radio channel. For channel estimation, a reference value is estimated using some RSs of a BS by a two-dimensional channel estimator. An RS is defined as a symbol with high power without carrying actual data in order to help carrier phase synchronization and BS information acquisition. A transmitter and a receiver can perform channel estimation using such RSs. The receiver can recover data received from the transmitter based on the result of RS-based channel estimation.

SUMMARY OF THE INVENTION

Accordingly, the present invention is directed to a method and base station for transmitting reference signals and a method and user equipment for receiving reference signals that substantially obviate one or more problems due to limitations and disadvantages of the related art.

An object of the present invention is to appropriately configure Reference Signals (RSs) for demodulation of a signal transmitted by a transmitter so that a receiver may accurately demodulate the signal using the RSs.

Another object of the present invention is to configure RSs in such a manner that appropriate transmission power may be allocated to RSs for demodulation within a total transmission power available to a BS to allow a receiver to receive the RSs with high accuracy.

A further object of the present invention is to uniformly distribute power to Orthogonal Frequency Division Multiplexing (ODM) symbols so that a BS may efficiently utilize its available power.

It is to be understood that technical objects to be achieved by the present invention are not limited to the aforementioned technical objects and other technical objects which are not mentioned will be apparent from the following description to the person with an ordinary skill in the art to which the present invention pertains.

To achieve these objects and other advantages and in accordance with the purpose of the invention, as embodied and broadly described herein, orthogonal sequences used for spreading RSs are allocated such that the order of orthogonal sequences allocated to a subcarrier of one Code Division Multiplexing (CDM) group has a predetermined offset with respect to the order of orthogonal sequences allocated to a subcarrier of another CDM group, adjacent to the subcarrier of the one CDM group.

After phase offsets are applied to RSs of layers according to the layers, the RSs are multiplexed in predetermined radio resources.

In one aspect of the present invention, a method for transmitting a plurality of RSs to a UE at a BS in a wireless communication system includes spreading the plurality of RSs with spreading orthogonal sequences, and transmitting the plurality of RSs on at least one of a first CDM group and a second CDM group. RSs being transmitted on the first CDM group among the plurality of RSs are spread with one of orthogonal spreading sequences listed in a first table and transmitted on a subcarrier of the first CDM group, and RSs being transmitted on the second CDM group among the plurality of RSs are spread with one of orthogonal spreading sequences listed in a second table and transmitted on a subcarrier of the second CDM group.

In another aspect of the present invention, a method for receiving a plurality of RSs from a BS at a UE in a wireless communication system includes receiving the plurality of RSs on at least one of a first CDM group and a second CDM group from the BS, and detecting a first RS destined for the UE from among the plurality of RSs, using a first spreading orthogonal sequence used for spreading the first RS by the BS. If the first RS is received on the first CDM group, the first spreading orthogonal sequence is one of orthogonal spreading sequences listed in a first table, and if the first RS is received in a second CDM group, the first spreading orthogonal sequence is one of orthogonal spreading sequences listed in a second table.

In another aspect of the present invention, a BS for transmitting a plurality of RSs to a UE in a wireless communication system includes a transmitter, and a processor for controlling the transmitter. The processor controls the transmitter to spread the plurality of RSs with spreading orthogonal sequences and transmit the plurality of RSs on at least one of a first CDM group and a second CDM group. The processor controls the transmitter to spread RSs to be transmitted on the first CDM group among the plurality of RSs with one of orthogonal spreading sequences listed in the a first table and transmit the spread RSs on a subcarrier of the first CDM group, and the processor controls the transmitter to spread RSs to be transmitted on the second CDM group among the plurality of RSs with one of orthogonal spreading sequences listed in a second table and transmit the spread RSs on a subcarrier of the second CDM group.

In a further aspect of the present invention, a UE for receiving a plurality of RSs from a BS in a wireless communication system includes a receiver, and a processor for controlling the receiver. The processor controls the receiver to receive the plurality of RSs on at least one of a first CDM group and a second CDM group from the BS, and controls the receiver to detect a first RS destined for the UE from among the plurality of RSs, using a first spreading orthogonal sequence used for spreading the first RS by the BS. If the first RS is received in the first CDM group, the first spreading orthogonal sequence is one of orthogonal spreading sequences listed in a first table, and if the first RS is received in the second CDM group, the first spreading orthogonal sequence is one of orthogonal spreading sequences listed in a second table.

In each aspect of the present invention, the first table may be

| Orthogonal sequence [$w_p(0)\ w_p(1)\ w_p(2)\ w_p(3)$] |
|---|
| [+1 +1 +1 +1] |
| [+1 −1 +1 −1] |
| [+1 +1 −1 −1] |
| [+1 −1 −1 +1] | and the second table may be

| Orthogonal sequence [$w_p(0)\ w_p(1)\ w_p(2)\ w_p(3)$] |
|---|
| [+1 +1 +1 +1] |
| [+1 −1 +1 −1] |
| [−1 −1 +1 +1] |
| [−1 +1 +1 −1] |

In each aspect of the present invention, the plurality of RSs may be spread according to a third table and transmitted on at least one of the first and second CDM groups. The third table may be

| RS | Orthogonal sequence [$w_p(0)\ w_p(1)\ w_p(2)\ w_p(3)$] | CDM group |
|---|---|---|
| 0 | [+1 +1 +1 +1] | 1 |
| 1 | [+1 −1 +1 −1] | 1 |
| 2 | [+1 +1 +1 +1] | 2 |
| 3 | [+1 −1 +1 −1] | 2 |
| 4 | [+1 +1 −1 −1] | 1 |
| 5 | [−1 −1 +1 +1] | 2 |
| 6 | [+1 −1 −1 +1] | 1 |
| 7 | [−1 +1 +1 −1] | 2 | where RS 0 to RS 7 one-to-one correspond to layer 0 to layer 7.

In each aspect of the present invention, the plurality of RSs may be multiplexed in at least one of the first and second CDM groups, using multiplexing orthogonal sequences a, b, c and d defined as $$W_4 = \begin{pmatrix} +1 & +1 & +1 & +1 \\ +1 & -1 & +1 & -1 \\ +1 & +1 & -1 & -1 \\ +1 & -1 & -1 & +1 \end{pmatrix}$$
$$= (a\quad b\quad c\quad d)$$

RS 0, RS 1, RS 4 and RS 6 may be multiplexed in the first CDM group by (RS0 RS1 RS4 RS6)×(a b c d) and RS 2, RS 3, RS 5 and RS 7 may be multiplexed in the second CDM group by (RS2 RS3 RS5 RS7)×(c d a b).

In each aspect of the present invention, the plurality of RSs may be multiplexed in two adjacent subcarriers of the first and second CDM groups in a symbol, using one of multiplexing orthogonal sequence pairs (a, c) and (b, d).

In each aspect of the present invention, RS p for layer p, r(m) may be allocated to the first or second CDM group according to the following Formula.

$$a_{k,l}^p = \overline{w}_p(l') \cdot r(3 \cdot l' \cdot N_{RB}^{max,DL} + 3 \cdot n_{PRB} + m')$$

where $$\overline{w}_p(i) = \begin{cases} w_p(i) & (m' + n_{PRB})\bmod 2 = 0 \\ w_p(3-i) & (m' + n_{PRB})\bmod 2 = 1 \end{cases}$$

$$k = 5 \cdot m' + N_{sc}^{RB} \cdot n_{PRB} + k'$$

-continued $$k' = \begin{cases} 1 & p \in \{0, 1, 4, 6\} \\ 0 & p \in \{2, 3, 5, 7\} \end{cases}$$

$$l' = \begin{cases} l' \bmod 2 + 2 & \text{if in special subframe with configuration 3, 4, or 8} \\ l' \bmod 2 + 2 + 3 \cdot \lfloor l'/2 \rfloor & \text{if in special subframe with configuration 1, 2, 6, or 7} \\ l' \bmod 2 + 5 & \text{if not in special subframe} \end{cases}$$

$$l' = \begin{cases} 0, 1, 2, 3 & \text{if } n_s \bmod 2 = 0 \text{ and in special subframe with configuration 1, 2, 6, or 7} \\ 0, 1 & \text{if } n_s \bmod 2 = 0 \text{ and not in special subframe with configuration 1, 2, 6, or 7} \\ 2, 3 & \text{if } n_s \bmod 2 = 1 \text{ and not in special subframe with configuration 1, 2, 6, or 7} \end{cases}$$

$$m' = 0, 1, 2$$

where $n_{PRB}$ is the index of a Physical Resource Block (PRB), $N^{RB}_{sc}$ is the number of subcarriers in an RB, $N^{max,DL}_{RB}$ is the maximum number of RBs in a downlink slot, p is the index of a layer, k and l are a subcarrier index and an OFDM symbol index in a subframe, m' is a counter of RS subcarriers carrying RSs in an RB, and l' is a counter of RS OFDM symbols including RBs in a subframe.

In each aspect of the present invention, the plurality of RSs may be multiplexed in a subframe in the pattern of FIG. 31(b) and transmitted to the UE by the BS.

The aforementioned technical solutions are only a part of the embodiments of the present invention, and various modifications to which technical features of the present invention are applied could be understood by the person with ordinary skill in the art to which the present invention pertains, based on the following detailed description of the present invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 illustrates an exemplary transmission of DRSs for four layers in two Code Division Multiplexing (CDM) groups.

FIG. 13 illustrates an embodiment of the present invention for uniformly distributing transmission power across Orthogonal Frequency Division Multiplexing (OFDM) symbols in rank-2 transmission.

FIGS. 14 and 15 illustrate exemplary power allocations to DRS Resource Elements (REs) and data REs in rank-2 transmission.

FIG. 16 illustrates an example of allocating DRSs for layers corresponding to antenna ports 11 to 14 in two CDM groups.

FIGS. 23 to 30 illustrate multiplexing of DRSs in two CDM groups using OCCs of length 4 according to embodiments of the present invention.

DETAILED DESCRIPTION OF THE INVENTION

Figure 1:
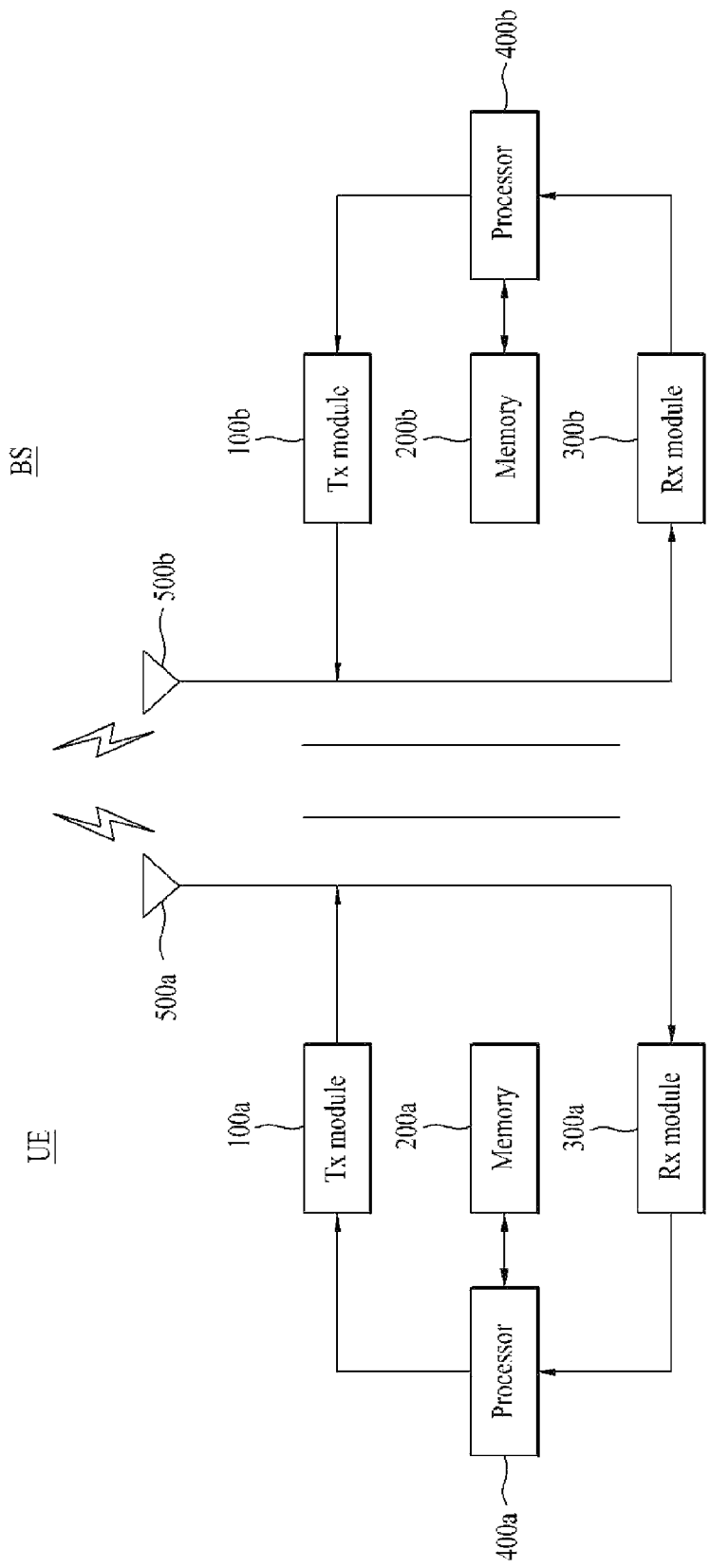
FIG. 1 is a block diagram of a User Equipment (UE) and a Base Station (BS) for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatuses and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as Institute of Electrical and Electronics Engineers (IEEE) 802.11 (Wi-Fi), IEEE 802.16 (WiMAX), IEEE 802-20, Evolved-UTRA (E-UTRA) etc. UTRA is a part of Universal Mobile Telecommunication System (UMTS). 3rd Generation Partnership Project (3GPP) Long Term Evolution (LTE) is a part of Evolved-UMTS (E-UMTS) using E-UTRA. 3GPP LTE employs OFDMA in downlink and employs SC-FDMA in uplink. LTE-Advanced (LTE-A) is an evolution of 3GPP LTE. For clarity, this application focuses on 3GPP LTE/LTE-A. However, technical features of the present invention are not limited thereto. For example, although the following description will be given in the context of a 3GPP LTE/LTE-A system being used as a mobile communication system, the following description is also applicable to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a Base Station (BS). The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a BS means a fixed station that performs communication with a UE and/or another BS, and exchanges various kinds of data and control information with the UE and another BS. The BS may be referred to as another terminology such as an evolved-Node B (eNB), a Base Transceiver System (BTS), and an Access Point (AP).

Hereinafter, a Physical Downlink Control CHannel (PDCCH)/Physical Control Format Indicator CHannel (PCFICH)/Physical Hybrid ARQ Indicator CHannel (PHICH)/Physical Downlink Shared CHannel (PDSCH)/Dedicated Reference Signal (DRS)/Common Reference Signal (CRS)/DeModulation Reference Signal (DMRS)/Channel State Information-Reference Signal (CSI-RS) Resource Element (RE) represents an RE assigned to or available for PDCCH/PCFICH/PHICH/PDSCH/DRS/CRS/DMRS/CSI-RS. Especially, an RE carrying an RS is referred to as an RS RE and an RE carrying control information or data is referred to as a data RE.

Hereinafter, a symbol/carrier/subcarrier to which a DRS/CRS/DMRS/CSI-RS is allocated will be referred to as a DRS/CRS/DMRS/CSI-RS symbol/carrier/subcarrier. For example, a symbol carrying a CSI-RS is referred to as a CSI-RS symbol and a subcarrier carrying a CSI-RS is referred to as a CSI-RS subcarrier. In addition, a symbol carrying user data (e.g. PDSCH data, PDCCH data, etc.) is referred to as a data symbol and a subcarrier carrying user data is referred to as a data subcarrier.

Meanwhile, in the present invention, if a specific signal is allocated to a frame, subframe, slot, symbol, carrier, or subcarrier, it means that the specific signal is transmitted through the corresponding carrier or subcarrier during a period/timing of the corresponding frame, subframe, slot or symbol.

According to the present invention, a rank or transmission rank is the number of layers multiplexed/allocated to an OFDM symbol or data RE.

Hereinafter, if a specific signal within a frame, subframe, slot, symbol, carrier or subcarrier is not transmitted, it will be expressed that transmission of the specific signal has been dropped, muted, nulled or blanked in the frame, the subframe, the slot, the symbol, the carrier or the subcarrier. For example, if a transmitter transmits a specific signal with zero transmission power on a predetermined RE, it may be said that the transmitter has dropped transmission of the specific signal, has muted or blanked the predetermined RE, or transmits a null signal on the RE.

FIG. 1 is a block diagram of a UE and a BS for implementing the present invention.

The UE serves as a transmitter on the uplink and as a receiver on the downlink. In contrast, the BS may serve as a receiver on the uplink and as a transmitter on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are operative coupled to the components of the UE and the BS, such as the transmitters 100a and 100b, the receivers 300a and 300b, and the memories 200a and 200b, and adapted to perform the present invention by controlling the components of the UE and the BS. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. The memories 200a and 200b may be used as buffers. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
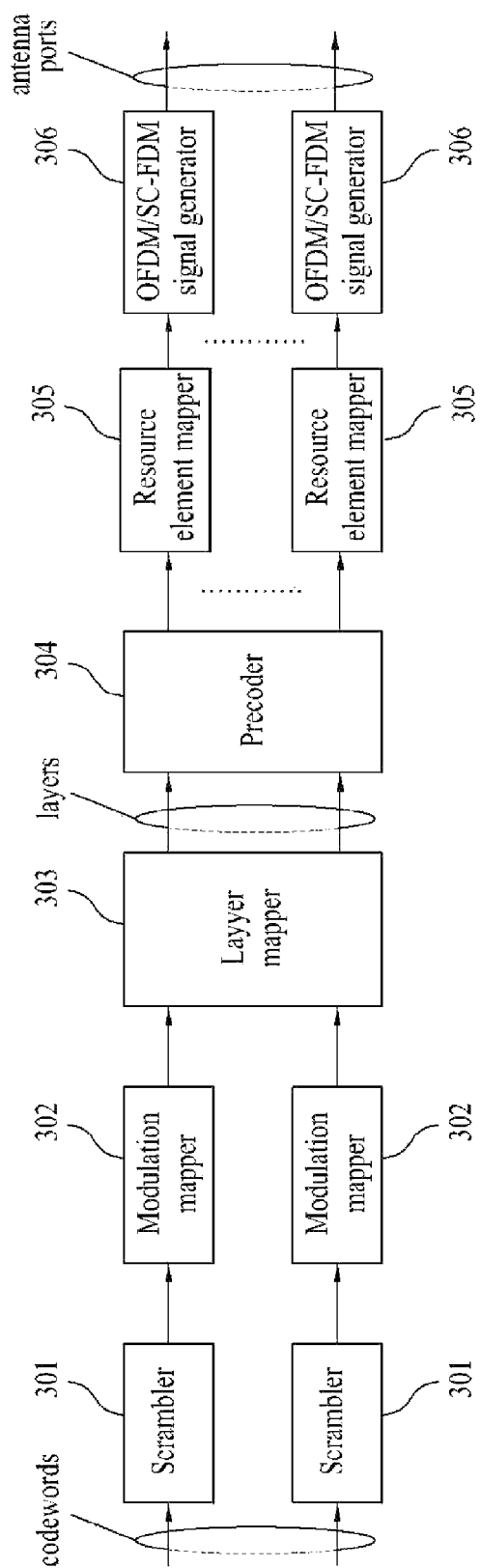
FIG. 2 is a block diagram of an exemplary transmitter in each of the UE and the BS.

FIG. 2 is a block diagram of an exemplary transmitter in each of the UE and the BS. Operations of the transmitters 100a and 100b will be described below in more detail with reference to FIG. 2.

Referring to FIG. 2, each of the transmitters 100a and 100b include scramblers 301, modulation mappers 302, a layer mapper 303, a precoder 304, RE mappers 305, Orthogonal Frequency Division Multiplexing/Single Carrier Frequency Division Multiplexing (OFDM/SC-FDM) signal generators 306. The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex modulation symbols. The modulation mappers 302 modulate the scrambled bits to complex modulation symbols representing positions on a signal constellation in a predetermined modulation scheme. The modulation scheme may be, but not limited to, any of m-Phase Shift Keying (m-PKS) and m-Quadrature Amplitude Modulation (m-QAM).

The layer mapper 303 maps the complex modulation symbols to one or several transmission layers.

The precoder 304 may precode the complex modulation symbols on each layer, for transmission through the antenna ports. More specifically, the precoder 304 generates antenna-specific symbols by processing the complex modulation symbols for multiple transmission antennas 500-1 to 500-$N_t$ in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z.

The RE mappers 305 map/allocate the complex modulation symbols for the respective antenna ports to REs. The RE mappers 305 may allocate the complex modulation symbols for the respective antenna ports to appropriate subcarriers, and may multiplex them according to users.

The OFDM/SC-FDM signal generators 306 modulate the complex modulation symbols for the respective antenna ports, that is, the antenna-specific symbols through OFDM or SC-FDM modulation, thereby producing a complex time-domain OFDM or SC-FDM symbol signal. The OFDM/SC-FDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-$N_t$ to a receiver after digital-to-analog conversion, frequency upconversion, etc. The OFDM/SC-FDM signal generators 306 may include an IFFT module, a CP inserter, a Digital-to-Analog Converter (DAC), a frequency upconverter, etc.

If the transmitters 100a and 100b adopt SC-FDMA for transmitting a codeword, the transmitters 100a and 100b include an FFT processor (not shown). The FFT processor performs FFT on the complex modulation symbols for each antenna and outputs the FFT symbol to the RE mappers 305.

The receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. A signal received through each reception antenna is down-converted to a baseband signal and then recovered to the original data stream transmitted by the transmitter 100a or 100b through multiplexing and MIMO demodulation. Each of the receivers 300a and 300b may include a signal recoverer for downconverting a received signal to a baseband signal, a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

If the receivers 300a and 300b receive SC-FDM signals, each of the receivers 300a and 300b further includes an IFFT module. The IFFT module IFFT-processes the antenna-specific symbols recovered by the RE demapper and outputs the IFFT symbol to the multiplexer.

While it has been described in FIGS. 1 and 2 that each of the transmitters 100a and 100b includes the scramblers 301, the modulation mappers 302, the layer mapper 303, the precoder 304, the RE mappers 305, and the OFDM/SC FDM signal generators 306, it may be further contemplated that the scramblers 301, the modulation mappers 302, the layer mapper 303, the precoder 304, the RE mappers 305, and the OFDM/SC FDM signal generators 306 are incorporated into each of the processors 400a and 400b of the transmitters 100a and 100b. Likewise, while it has been described in FIGS. 1 and 2 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For the convenience's sake of description, the following description will be given with the appreciation that the scramblers 301, the modulation mappers 302, the layer mapper 303, the precoder 304, the RE mappers 305, and the OFDM/SC FDM signal generators 306 are included in the transmitters 100a and 100b configured separately from the processors 400a and 400b that controls their operations, and the signal recoverer, the multiplexer, and the channel demodulator are included in the receivers 300a and 300b configured separately from the processors 400a and 400b that controls their operations. However, it is to be noted that even though the scramblers 301, the modulation mappers 302, the layer mapper 303, the precoder 304, the RE mappers 305, and the OFDM/SC FDM signal generators 306 are included in the processors 400a and 400b or the signal recoverer, the multiplexer, and the channel demodulator are included in the processors 400a and 400b, embodiments of the present invention are applicable in the same manner.

Figure 3:
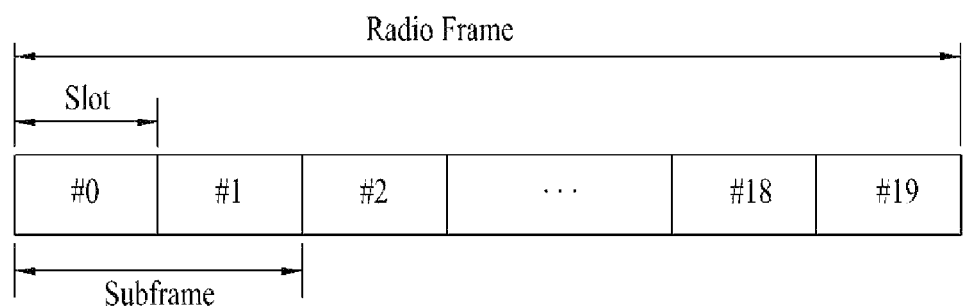
FIG. 3 illustrates an exemplary structure of a radio frame in a wireless communication system.

FIG. 3 illustrates an exemplary structure of a radio frame in a wireless communication system. Specifically, the radio frame is a 3GPP LTE/LTE-A radio frame. The radio frame structure is applicable to a Frequency Division Duplex (FDD) mode, a half FDD (H-FDD) mode, and a Time Division Duplex (TDD) mode.

Referring to FIG. 3, a 3GPP LTE/LTE-A radio frame is 10 ms (307,200 $T_s$) in duration. The radio subframe is divided into 10 equally-sized subframes, each subframe being 1 ms long. $T_s$ represents a sampling time and is given as $T_s=1/(2048\times15$ kHz). Each subframe is further divided into two slots, each of 0.5 ms in duration. 20 slots are sequentially numbered from 0 to 19. A time interval in which one subframe is transmitted is defined as a Transmission Time Interval (TTI).

Figure 4:
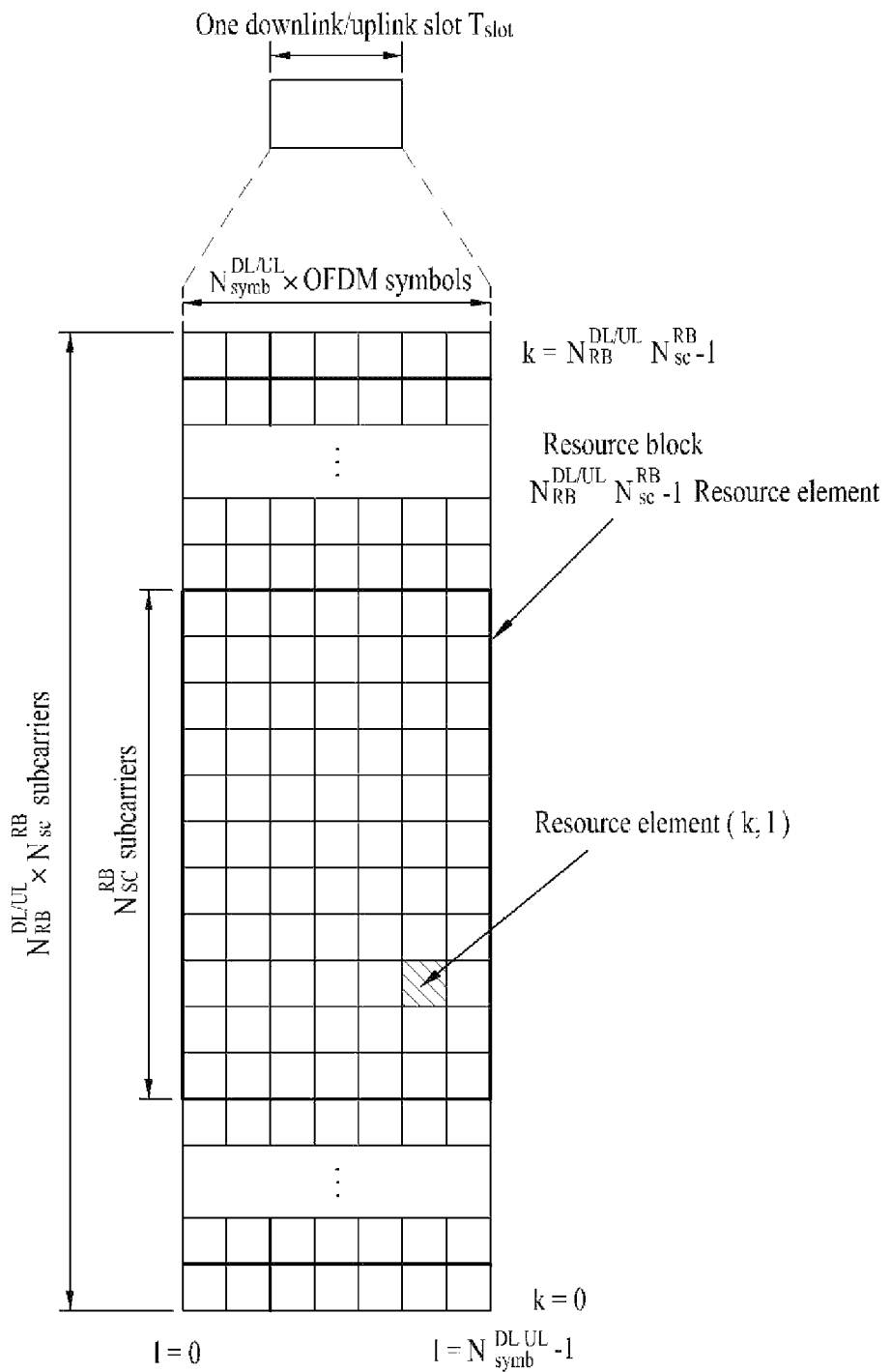
FIG. 4 illustrates an exemplary Downlink/Uplink (DL/UL) slot structure in the wireless communication system.

FIG. 4 illustrates an exemplary structure of a DownLink/UpLink (DL/UL) slot in the wireless communication system. Specifically, FIG. 4 illustrates the structure of a resource grid in the 3GPP LTE/LTE-A system.

Referring to FIG. 4, a slot includes a plurality of OFDM symbols in the time domain by a plurality of Resource Blocks (RBs) in the frequency domain. An OFDM symbol may refer to one symbol duration. An RB includes a plurality of subcarriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. While a subframe is shown in FIG. 4 as having a slot with 7 OFDM symbols for illustrative purposes, embodiments of the present invention are also applicable to subframes with any other number of OFDM symbols. A resource including one OFDM symbol by one subcarrier is referred to as a Reference Element (RE) or a tone.

Referring to FIG. 4, a signal transmitted in each slot may be described by a resource grid including $N^{DL/UL}_{RB}N^{RB}_{sc}$ subcarriers and $N^{DU/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB.

In other words, a Physical Resource Block (PRB) is defined as $N^{DL/UL}_{symb}$ consecutive OFDM symbols or SC-FDMA symbols in the time domain by $N^{RB}_{sc}$ consecutive subcarriers in the frequency domain. Therefore, one PRB includes $N^{DL/UL}_{symb}\times N^{RB}_{sc}$ REs.

Each RE in the resource grid may be uniquely identified by an index pair (k, l) in a slot. k is a frequency-domain index ranging from 0 to $N^{DU/UL}_{RB}\times N^{RB}_{sc}-1$ and l is a time-domain index ranging from 0 to $N^{DL/UL}_{symb}-1$.

Figure 5:
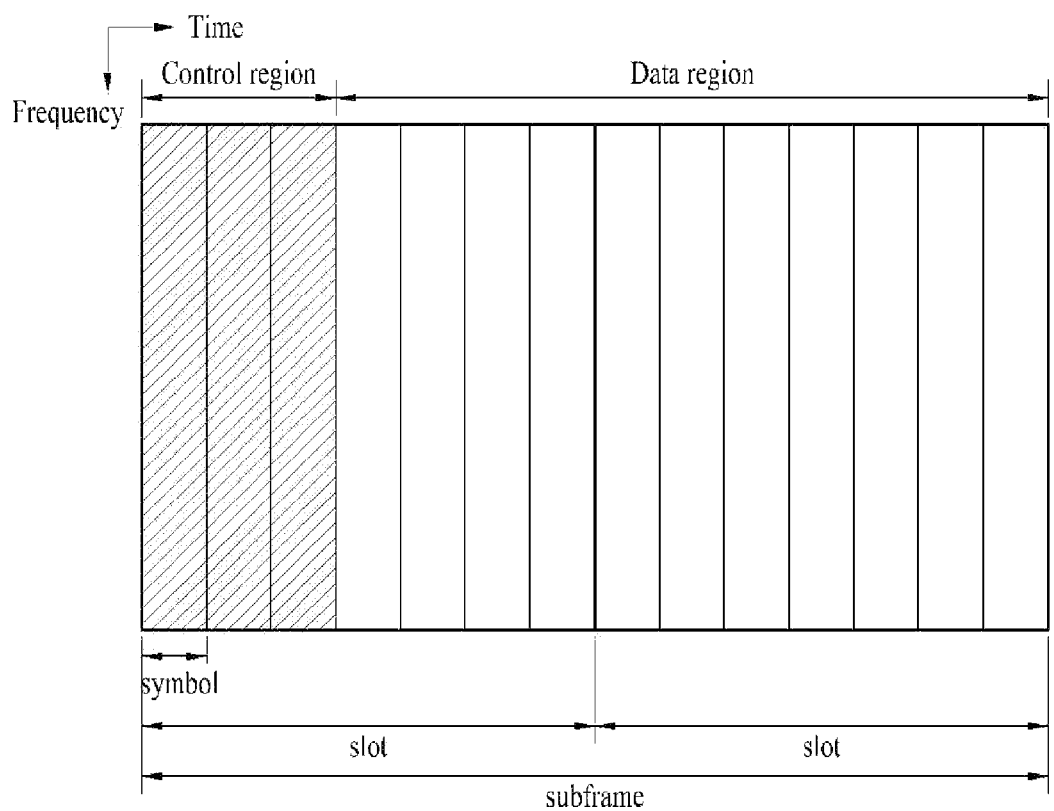
FIG. 5 illustrates an exemplary DL subframe in the wireless communication system.

FIG. 5 illustrates an exemplary structure of a DL subframe in the wireless communication system.

Referring to FIG. 5, each subframe may be divided into a control region and a data region. The control region includes one or more OFDM symbols, starting from the first OFDM symbol. The number of OFDM symbols used for the control region of a subframe may be set independently on a subframe basis and signaled on a PCFICH. A BS may transmit control information to a UE or UEs in the control region. To transmit control information, a PDCCH, a PCFICH, a PHICH, etc. may be allocated to the control region.

The BS may transmit data to a UE or UE group in the data region. Data transmitted in the data region is referred to as user data. A PDSCH may be allocated to the data region to convey data. A UE may decode control information received on a PDCCH and thus read data received on a PDSCH based on the decoded control information. For example, the PDCCH carries information indicating a UE or UE group to which the data of the PDSCH is destined and information indicating how the UE or UE group should receive and decode the PDSCH data.

The PDCCH delivers information about the transport format and resource allocation of a DownLink Shared CHannel (DL-SCH), resource allocation information about an UpLink Shared CHannel (UL-SCH), paging information about a Paging CHannel (PCH), system information about the DL-SCH, allocation information of a higher-layer control message such as a random access response transmitted on a PDSCH, a collection of Transmission Power Control (TPC) commands for the UEs of a UE group, activation information about Voice over Internet Protocol (VoIP), etc. A plurality of PDCCHs may be transmitted in the control region. A UE may detect its own PDCCH by monitoring the plurality of PDCCHs. The size and usage of control information transmitted on a PDCCH may vary according to a Downlink Control Information (DCI) format and the size of the control information may vary according to coding rates.

An independent DCI format applies to each UE and PDCCHs for a plurality of UEs may be multiplexed in one subframe. The PDCCH of each UE is independently channel-encoded and added with a Cyclic Redundancy Check (CRC). The CRC is masked by a unique ID of the UE so that the UE may receive its own PDCCH. Basically, however, without knowledge of the position of its own PDCCH, the UE performs blind detection (or blind decoding) on all PDCCHs with a specific DCI format until it receives a PDCCH having its ID.

Various types of RSs are transmitted between a BS and a UE for the purposes of interference mitigation, estimation of the channel state between the BS and the UE, demodulation of signals transmitted between the BS and the UE, etc. An RS refers to a predefined signal with a special waveform known to both the BS and the UE, transmitted from the BS to the UE or from the UE to the BS.

RSs are largely classified into DRSs and CRSs. CRSs are transmitted in every DL subframe in a cell supporting PDSCH transmission. CRSs are used for both purposes of demodulation and measurement and shared among all UEs within the cell. A CRS sequence is transmitted through every antenna port irrespective of the number of layers. DRSs are usually used for demodulation, dedicated to a specific UE. The CRSs and DRSs are also called cell-specific RSs and DMRSs, respectively. The DMRSs are also called UE-specific RSs.

Figure 6:
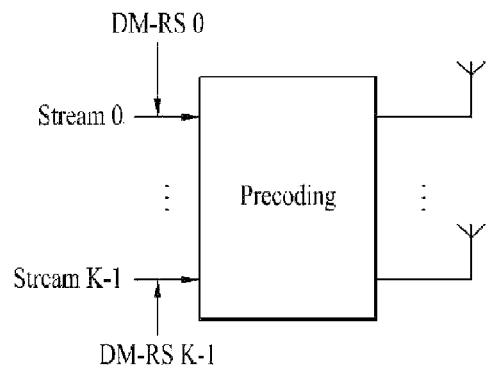
FIG. 6 is a conceptual view of Dedicated Reference Signal (DRS) transmission.

FIG. 6 is a conceptual view of DRS (i.e. DMRS) transmission. Particularly, a transmitter for transmitting precoded RSs is illustrated in FIG. 6, by way of example.

A DRS is dedicated to a particular UE and thus other UEs are not allowed to use the DRS. DRSs used for data demodulation at a specific UE may be classified into precoded RSs and non-precoded RSs. If precoded RSs are used as DRSs, the DRSs are precoded with a precoding matrix used for precoding data symbols, and as many RS sequences as K layers are transmitted. K is equal to or less than the number of physical antenna ports, $N_t$. The K layers may be allocated to one or more UEs. If a plurality of UEs share the K layers, 1 UE to K UEs may receive the K layers in the same time/frequency resources.

The UE may demodulate a received data signal by arranging the data signal at predetermined positions on a signal constellation according to a predetermined modulation scheme, based on DRSs received along with the data signal.

Figure 7:
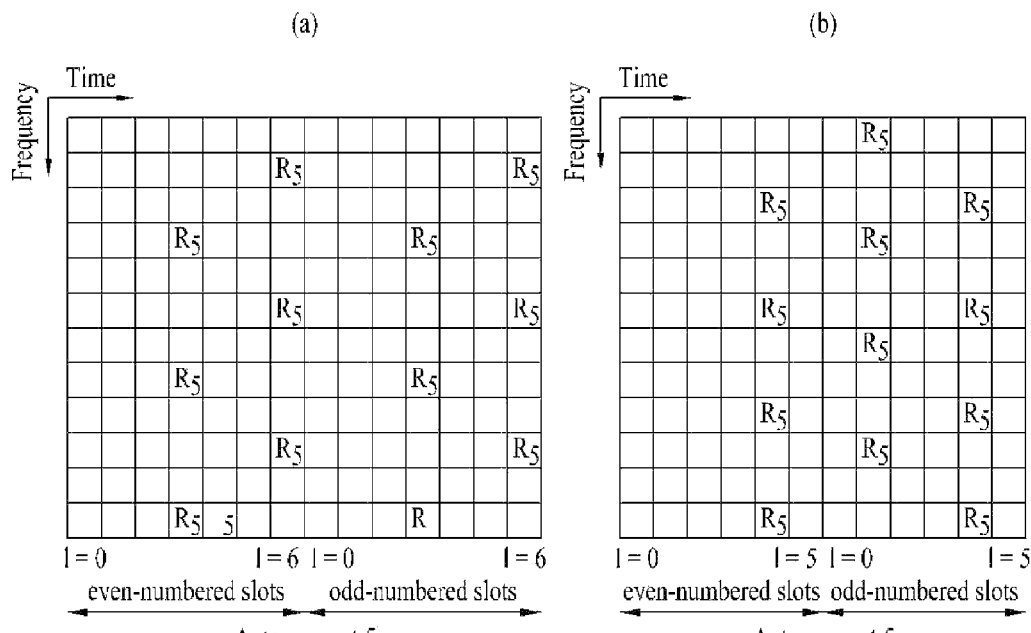
FIG. 7 illustrates exemplary DRS patterns in a Long Term Evolution (LTE) system.

FIG. 7 illustrates exemplary DRS patterns in an LTE system. Specifically, FIG. 7(a) illustrates a DRS pattern for a subframe with a normal CP and FIG. 7(b) illustrates a DRS pattern for a subframe with an extended CP. In FIG. 7, 'l' represents the position of an OFDM symbol in a slot.

REs on which DRSs can be transmitted (i.e. DRS REs) are generally preset, among the REs of an RB or an RB pair. Thus, a UE has only to detect a DRS(s) from an RE(s) at a preset position(s) among the REs of each RB or RB pair. For example, referring to FIG. 7, a BS transmits DRSs in one or more RB pairs through antenna port 5 in the pattern of FIG. 7(a) or 7(b). Hereinbelow, the positions of DRS REs in an RB or RB pair will be referred to as a DRS pattern in describing embodiments of the present invention.

In the LTE system supporting up to two layers, a BS simultaneously transmits DRSs for demodulation of the layers and CRSs for estimation of a channel between a UE and the BS. RSs should be transmitted through all physical antenna ports in CRS-based downlink transmission. Therefore, the CRS-based downlink transmission faces the problem that overall RS overhead increases with the number of physical antenna ports and thus data transmission efficiency is decreased. To avert this problem, the LTE-A system that can transmit more layers than the LTE system uses DRSs for demodulation instead of CRSs that increase transmission overhead according to the number of physical antenna ports. In DRS-based downlink transmission, only virtual antenna ports need RSs for coherent demodulation. That is, only virtual antenna ports, not all physical antenna ports of the BS, transmit their DRSs in the DRS-based downlink transmission. Since the number of virtual antenna ports is generally smaller than or equal to the number of physical antenna ports, $N_t$, the DRS-based downlink transmission advantageously decreases RS transmission overhead, compared to the CRS-based downlink transmission.

Since DRSs precoded in the same precoder as used for data serve only the purpose of demodulation, measurement RSs called CSI-RSs are additionally transmitted to allow UEs to measure channel states in the LTE-A system. Because channel states do not change much over time, CSI-RSs are transmitted at every predetermined interval of a plurality of subframes, compared to CRSs transmitted in every subframe. In view of the transmission nature of CSI-RSs, the transmission overhead of the CSI-RSs is smaller than that of the CRSs.

According to the present invention, DRSs are used for PDSCH transmission and as many DRSs as the number of layers used for the PDSCH transmission are transmitted for demodulation of the layers. The DRSs are transmitted only in RBs to which the PDSCH is mapped. In addition, the DRSs are not transmitted in REs used for other types of RSs irrespective of antenna ports.

Figure 8:
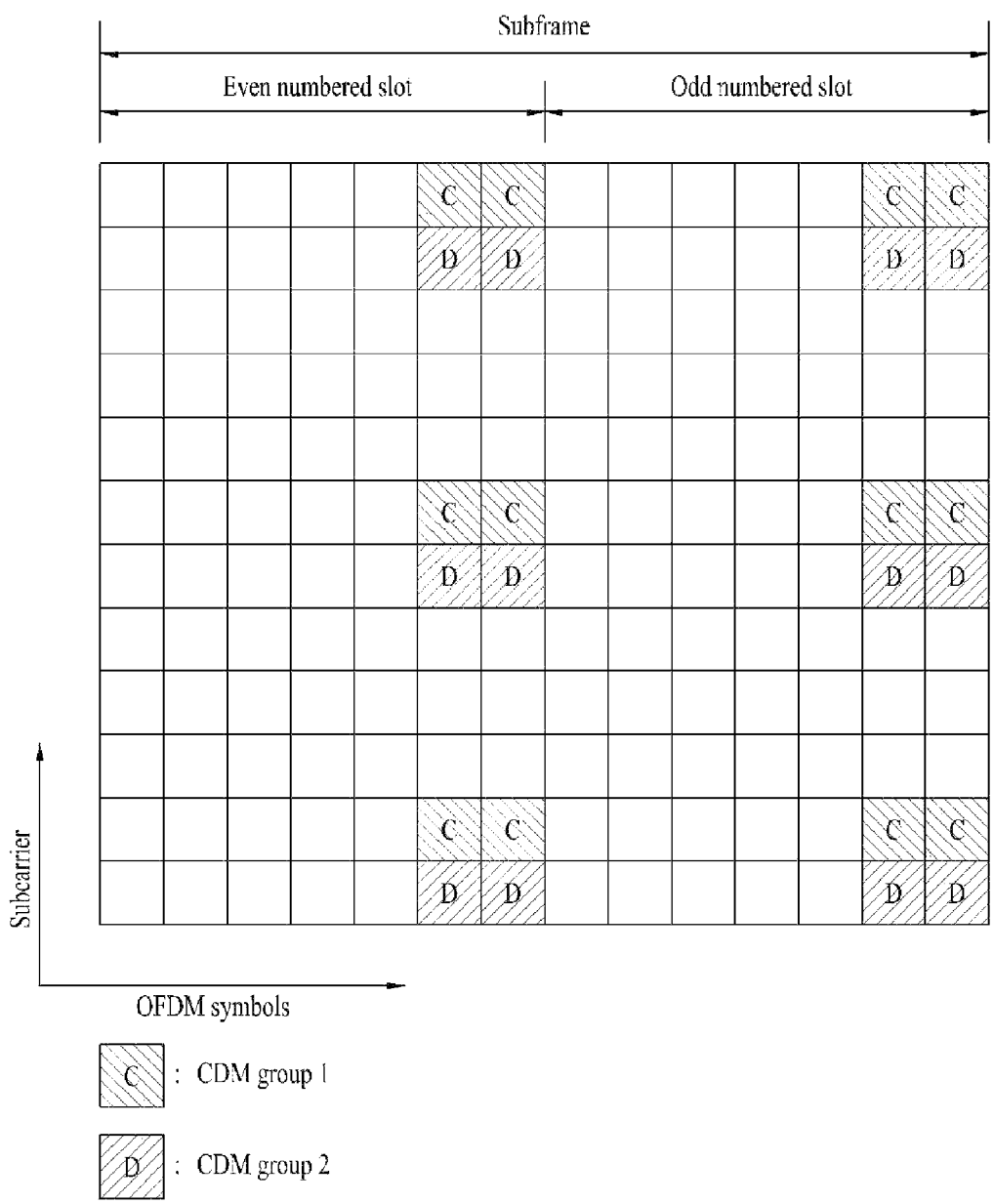
FIG. 8 illustrates an exemplary DRS pattern in an LTE-Advanced (LTE-A) system.

FIG. 8 illustrates an exemplary DRS pattern in the LTE-A system. Specifically, the DRS pattern is for an RB pair in a regular subframe with a normal CP.

In the LTE-A system, a plurality of layers may be multiplexed in a subframe, prior to transmission to a UE. Because DRSs should be transmitted for the respective layers, the number of DRSs increases in proportion to the number of transmitted layers. If a plurality of DRSs are transmitted in different REs, the number of DRS REs increases with the number of layers, thereby decreasing data transmission efficiency. Therefore, when a plurality of DRSs are to be transmitted, one or more DRSs are preferably multiplexed in a predetermined RE in order to decrease DRS transmission overhead.

Therefore, a plurality of DRSs are transmitted largely in two groups of REs in the LTE-A system. For instance, one or more DRSs may be multiplexed in REs labeled with "C" and one or more other DRSs may be multiplexed in REs labeled with "D", for transmission to UEs in FIG. 8. When a plurality of DRSs are multiplexed in a predetermined radio resource, the DRSs may be distinguished from one another by their Orthogonal Cover Codes (OCCs). For instance, up to two different DRSs may be transmitted in a single RE by extending the DRSs using OCCs of length 2. In another example, up to four different DRSs may be transmitted in a single RE by extending the DRSs using OCCs of length 4. The OCCs may be, for example, Walsh-Hadamard codes. An OCC is also called an orthogonal sequence.

Hereinbelow, a set of REs carrying DRSs which are extended by OCCs and thus distinguishable from one another among the REs of an RB or RB pair are referred to as a Code Division Multiplexing (CDM) group. Referring to FIG. 8, REs labeled with "C" form one CDM group (CDM group 1) and REs labeled with "D" form another CDM group (CDM group 2). In a pair of successive RBs (i.e. an RB pair) in a subframe, each CDM group includes 12 REs in FIG. 8.

Figure 9:
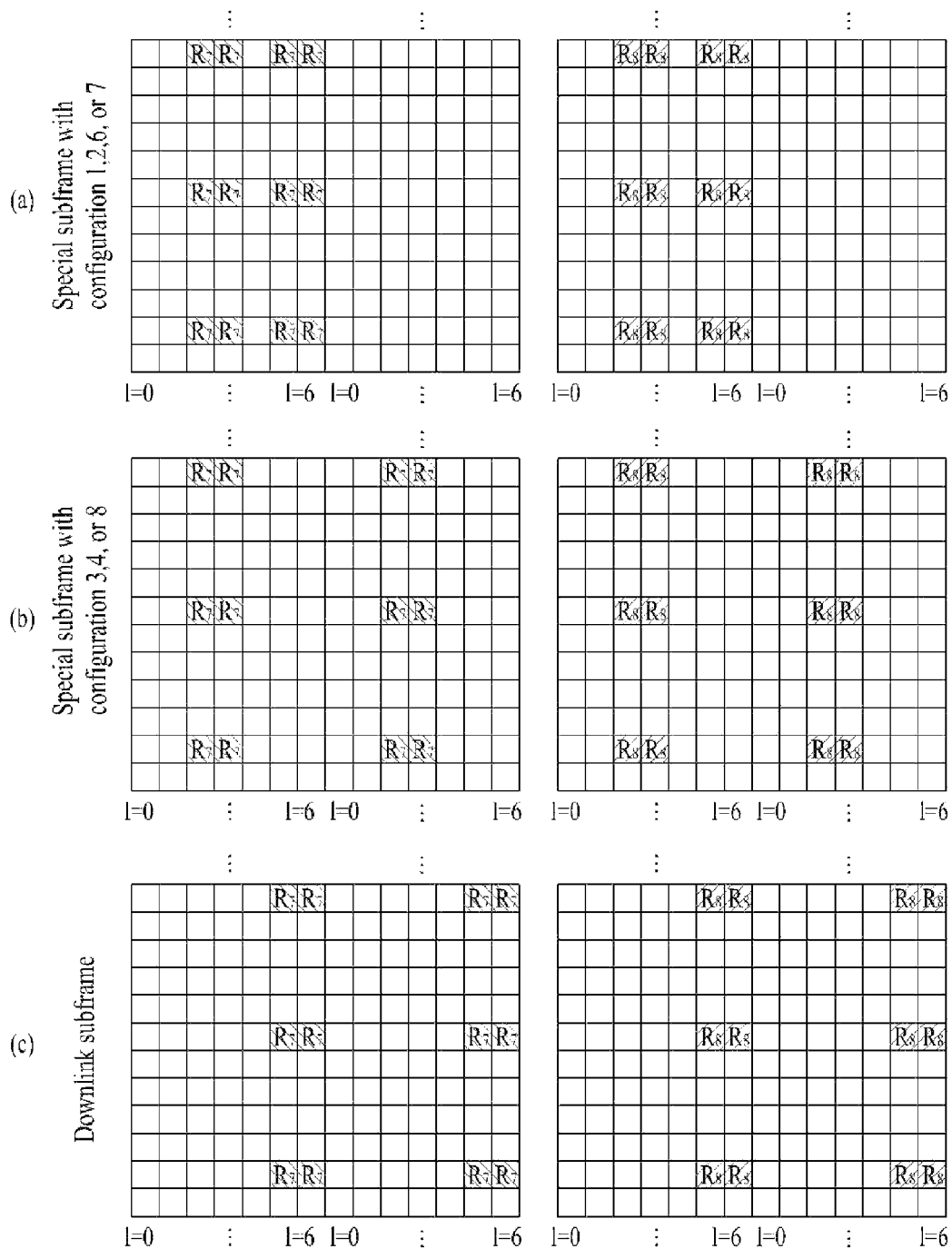
FIG. 9 illustrates exemplary patterns of multiplexing DRSs for two layers in a subframe with a normal Cyclic Prefix (CP), using Orthogonal Cover Codes (OCCs) of length 2.

FIG. 9 illustrates exemplary patterns of multiplexing DRSs for two layers in a subframe with a normal CP, using OCCs of length 2.

Referring to FIGS. 9(a), 9(b) and 9(c), two DRSs for two layers are mapped to radio resources in the following manner. For instance, it is assumed that virtual antenna ports mapped to the two layers in a one-to-one correspondence are antenna port 7 and antenna port 8. In a subframe with a normal CP, a part of each of DRS sequences r(m) for antenna ports 7 and 8 may be mapped to complex-valued modulation symbols, $a_{k,l}^{(p)}$ in a Physical Resource Block (PRB) with a frequency domain index $n_{PRB}$, allocated for transmission of a PDSCH according to the following Formula.

$$a_{k,l}^{(p)} = s \cdot r(3 \cdot l' \cdot N_{RB}^{max,DL} + 3 \cdot n_{PRB} + m') \quad \text{[Formula 1]}$$

where $$s = \begin{cases} 1 & \text{if } p = 7 \\ (-1)^{m'+l'+n_{PRB}} & \text{if } p = 8 \end{cases}$$

$$k = 5 \cdot m' + N_{sc}^{RB} \cdot n_{PRB} + 1$$

$$l = \begin{cases} l' \bmod 2 + 2 & \text{if in special subframe with configuration 3, 4, or 8} \\ l' \bmod 2 + 2 + 3 \cdot \lfloor l'/2 \rfloor & \text{if in special subframe with configuration 1, 2, 6, or 7} \\ l' \bmod 2 + 5 & \text{if not in a special subframe} \end{cases}$$

$$l' = \begin{cases} 0, 1, 2, 3 & \text{if } n_s \bmod 2 = 0 \text{ and in special subframe with configuration 1, 2, 6, or 7} \\ 0, 1 & \text{if } n_s \bmod 2 = 0 \text{ and not in special subframe with configuration 1, 2, 6, or 7} \\ 2, 3 & \text{if } n_s \bmod 2 = 1 \text{ and not in a special subframe 1, 2, 6, or 7} \end{cases}$$

$$m' = 0, 1, 2$$

In [Formula 1], p is the index of an antenna port, satisfying p∈{7, 8}, k and l are a subcarrier index and an OFDM symbol index described before with reference to FIG. 4, r(s) is a random sequence, and m' is a counter of DRS REs in each OFDM symbol used for the PDSCH transmission. Since each DRS OFDM symbol includes three DRS subcarriers for each RB, m' is one of 0, 1 and 2. $N_{RB}^{max,DL}$ is the maximum number of RBs in a DL slot allocated to the PDSCH, $n_s$ is a slot number in a radio frame, and l' is a counter of DRS OFDM symbols in a subframe. In a normal subframe other than a special subframe, there are a total of four DRS OFDM symbols in case of a normal CP. Hence, l' is one of 0, 1, 2 and 3.

Referring to FIG. 9, a DRS for a layer corresponding to antenna port 7 and a DRS for a layer corresponding to antenna port 8 are transmitted in the same REs. In other words, the DRSs of antenna port 7 and antenna port 8 are multiplexed in a predetermined CDM group, for example, CDM group 1.

The following description will be given of embodiments of the present invention in the context of a normal subframe with a CDM group configured as illustrated in FIG. 9(a). However, it is to be clearly understood that the present invention is applicable to a special subframe as well as a normal subframe in the same manner.

Figure 10:
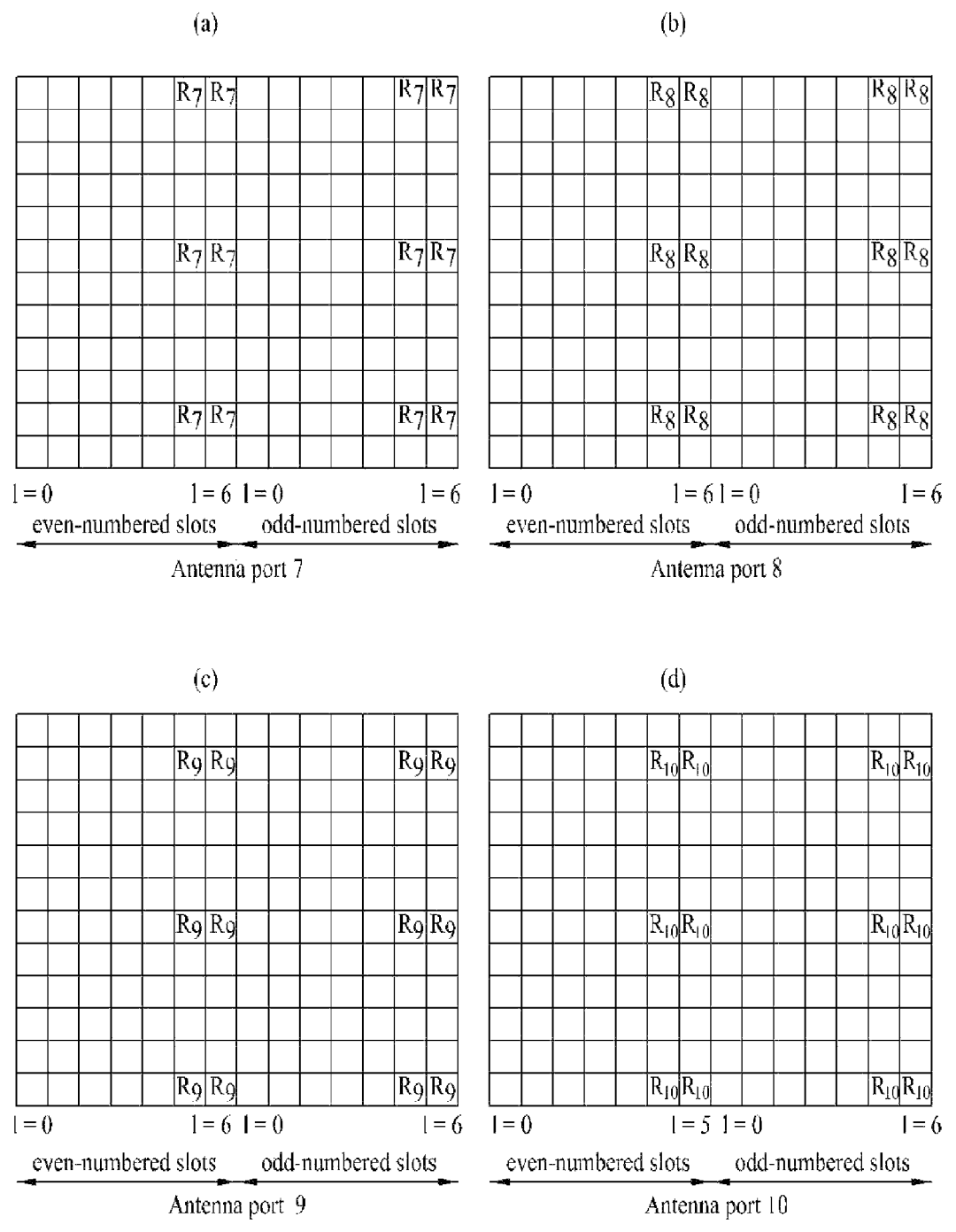

FIG. 10 illustrates an exemplary transmission of DRSs for four layers in two CDM groups. When two CDM groups are used, two DRSs may be multiplexed in each CDM group, for transmission.

Two DRSs may be multiplexed in one RE, using OCCs of length 2 (OCC=2) and the number of layers that can be multiplexed for transmission increases in proportion to the number of CDM groups. For example, up to four DRS sequences may be transmitted in two CDM groups, using OCCs of length 2 (OCC=2).

Figure 11:
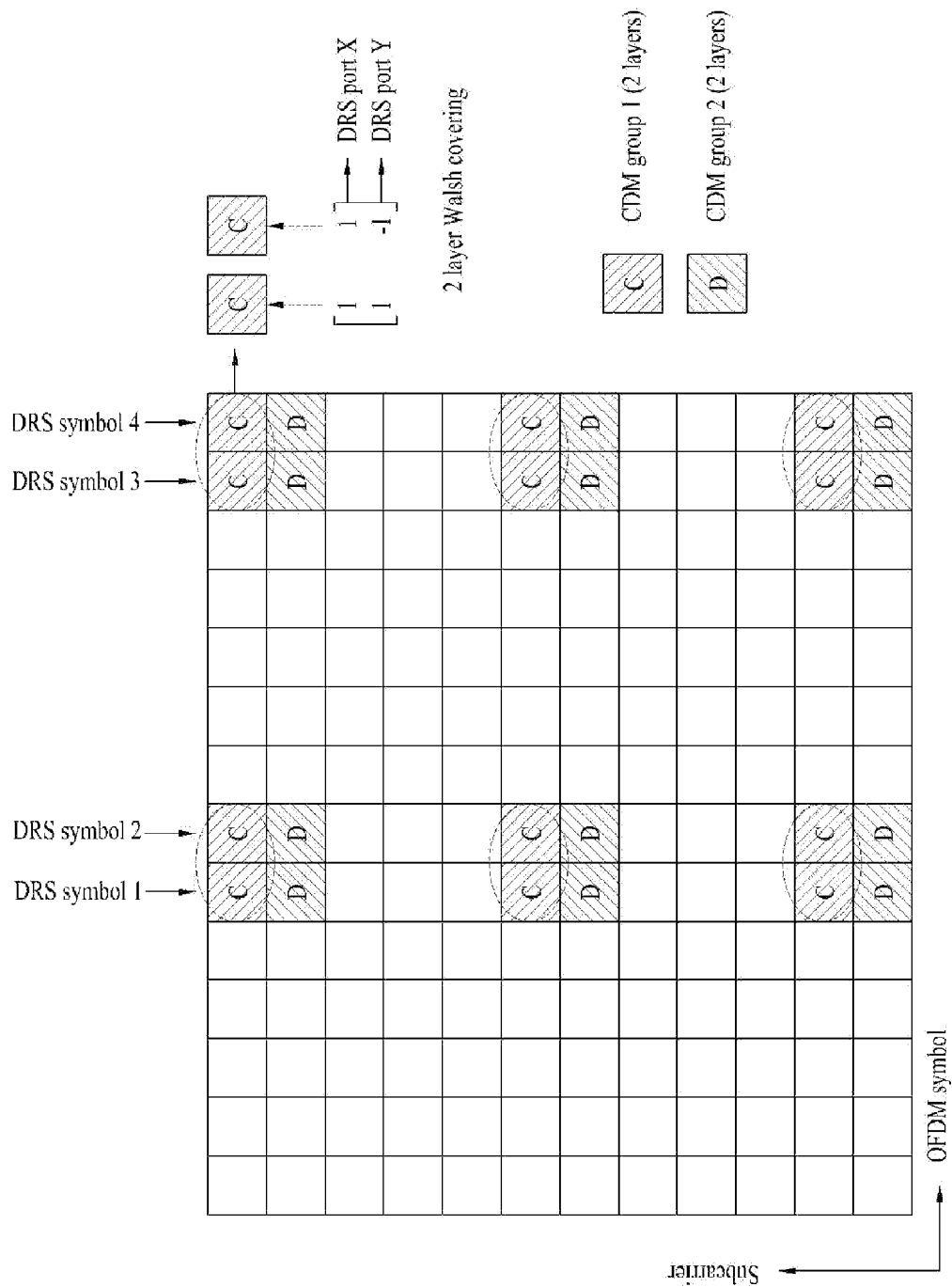
FIG. 11 illustrates a method for multiplexing four DRSs in two CDM groups.

FIG. 11 illustrates a method for multiplexing four DRSs in two CDM groups. In a MIMO system supporting a maximum rank of 4, up to four DRS sequences can be transmitted in two CDM groups. That is, two DRSs can be multiplexed in each CDM group, using two OCC sequences of length 2 (OCC=2).

Referring to FIG. 11, it is assumed that virtual antenna ports corresponding to DRSx, DRSy, DRSz and DRSw are DRS port X, DRS port Y, DRS port Z, and DRS port W, respectively, and two OCC sequences of length 2 are [1 1] and [1 −1]. The two OCC sequences are the row-direction sequences of a 2×2 matrix illustrated in FIG. 11.

In FIG. 11, DRSx and DRSy may be extended by the sequences [1 1] and [1 −1], respectively and then allocated to CDM group 1. DRSz may be extended by one of the sequences [1 1] and [1 −1], DRSw may be extended by the other sequence, and then the extended DRSz and DRSw may be allocated to CDM group 2.

An RB pair illustrated in FIG. 11 includes a total of four DRS symbols, DRS symbol 1 to DRS symbol 4. A part of DRSx extended by the sequence [1 1] and a part of DRSy extended by the sequence [1 −1] are allocated to DRS symbol 1. For example, DRSx is extended to [DRSx DRSx] by multiplying DRSx by [1 1] and DRSy is extended to [DRSy −DRSy] by multiplying DRSy by [1 −1]. The first elements of the extended DRSx and DRSy, DRSx and DRSy may be allocated to DRS symbol 1 and the second elements of the extended DRSx and DRSy, DRSx and −DRSy may be allocated to DRS symbol 2. That is, (1×DRSx)+(1×DRSy) is allocated to DRS symbol 1 and (1×DRSx)+(−1×DRSy) is allocated to DRS symbol 2.

In summary, four DRSs may be allocated to DRS REs in two CDM groups, using OCCs as illustrated in [Table 1].

TABLE 1

| DRS port | Orthogonal Cover Code [$w_p(0)$ $w_p(1)$] | CDM group |
|---|---|---|
| 0 | [+1 +1] | 1 |
| 1 | [+1 −1] | 1 |
| 2 | [+1 +1] | 2 |
| 3 | [+1 −1] | 2 |

Referring to [Table 1], DRS ports are mapped to layers in a one-to-one correspondence. Thus, the indexes of DRS ports may be used as the indexes of layers or vice versa. Antenna port 7 to antenna port 10 may be mapped to DRS port 0 to DRS port 3 in a one-to-one correspondence. A DRS for each DRS port is extended by [$w_p(0)$ $w_p(1)$] and mapped to one pair of REs in its CDM group.

For each DM group, DRS ports allocated to the CDM group and OCCs used to spread DRSs for the DRS ports are listed in [Table 2] below.

TABLE 2

| CDM group 1 | | CDM group 2 | |
| --- | --- | --- | --- |
| DRS port | Orthogonal Cover Code [$w_p(0)$ $w_p(1)$] | DRS port | Orthogonal Cover Code [$w_p(0)$ $w_p(1)$] |
| 0 | [+1 +1] | 2 | [+1 +1] |
| 1 | [+1 −1] | 3 | [+1 −1] |

Referring to [Table 1] or [Table 2], (+1×DRS0)+(+1×DRS1) and (+1×DRS0)+(−1×DRS1) are sequentially mapped to REs of CDM group 1 and (+1×DRS2)+(+1×DRS3) and (+1×DRS2)+(−1×DRS3) are sequentially mapped to REs of CDM group 2.

OCCs of length 2 used for spreading DRSs and OCCs of length 2 used for multiplexing the DRSs in one RE may be simply expressed as the following Formula.

$$W_2 = \begin{pmatrix} +1 & +1 \\ +1 & -1 \end{pmatrix} \quad \text{[Formula 2]}$$
$$= (a \ b)$$
$$= \begin{pmatrix} x \\ y \end{pmatrix}$$

In [Formula 2], the column vectors a and b are OCCs each being used for multiplexing a plurality of DRSs. Each of the column vectors a and b are comprised of coefficients that will be multiplied with DRSs. Each of the row vectors x and y represents an OCC that spreads a DRS, that is, each row vector is a kind of spreading factor. Hereinbelow, an OCC seen from the viewpoint of spreading is referred to as a spreading OCC and an OCC seen from the viewpoint of multiplexing is referred to as a multiplexing OCC in describing the present invention.

For the convenience' sake of description, a form in which a plurality of DRSs are multiplexed in an RE is expressed with row a (representing the column vector a of weights multiplied with DRSs) or b (representing the column vector b of weights multiplied by the DRSs). For instance, in FIG. 12 illustrating examples of multiplexing two DRSs into one CDM group, RE 'a' represents an RE which two DRSs are multiplexed by the elements of the column vector a and allocated thereto, and RE 'b' represents an RE which two DRSs are multiplexed by the elements of the column vector b and allocated thereto.

Figure 12:
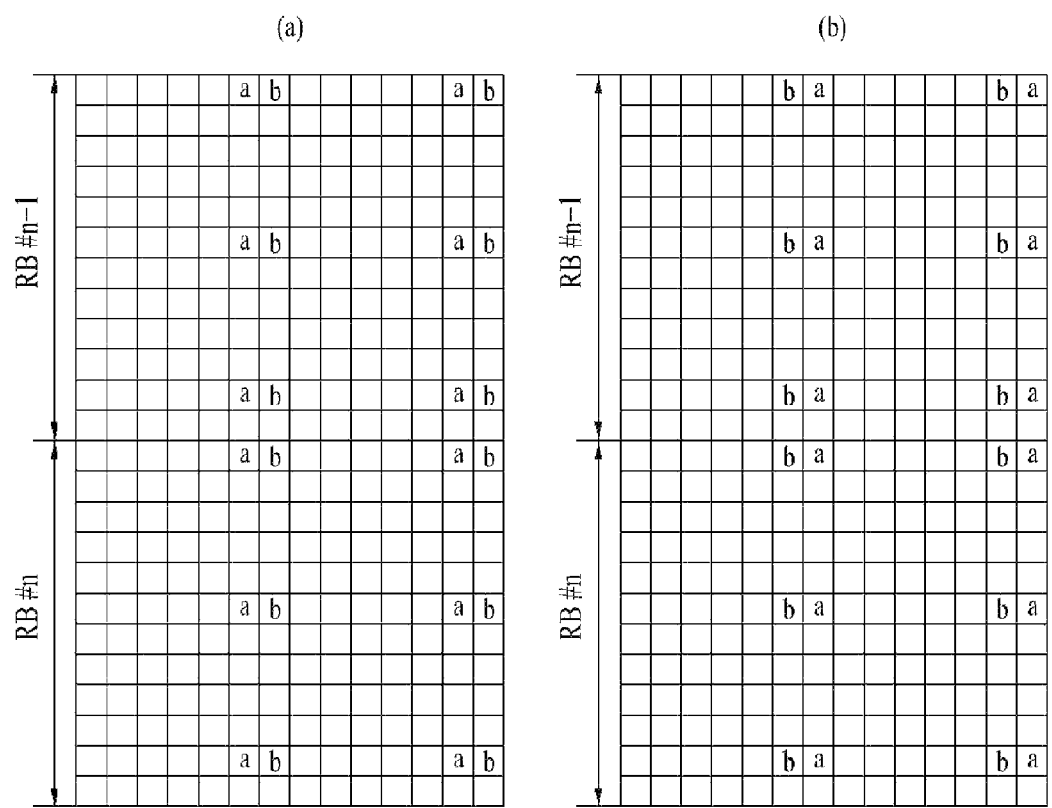
FIG. 12 illustrates exemplary multiplexing of two DRSs in one CDM group.

Referring to FIG. 12, in the case where multiplexing OCCs are allocated, multiplexing OCCs used for multiplexing layers in an OFDM symbol are preset. Even though a plurality of RBs are allocated to a UE, the multiplexing OCCs are allocated to the RBs in the same pattern. Because layers transmitted to the UE are scrambled with the same scrambling sequence, the DRS allocation illustrated in FIG. 12 may cause concentration of transmission power on a specific OFDM symbol. Therefore, transmission power efficiency may be decreased. It is preferable that transmission power of a BS is uniform within a maximum transmission power range irrespective of time in order to increase the data transmission rate of the BS. Accordingly, there exists a need for appropriately allocating multiplexing OCCs to prevent power concentration on a specific OFDM symbol, that is, to uniformly distribute transmission power across OFDM symbols.

Figure 13:
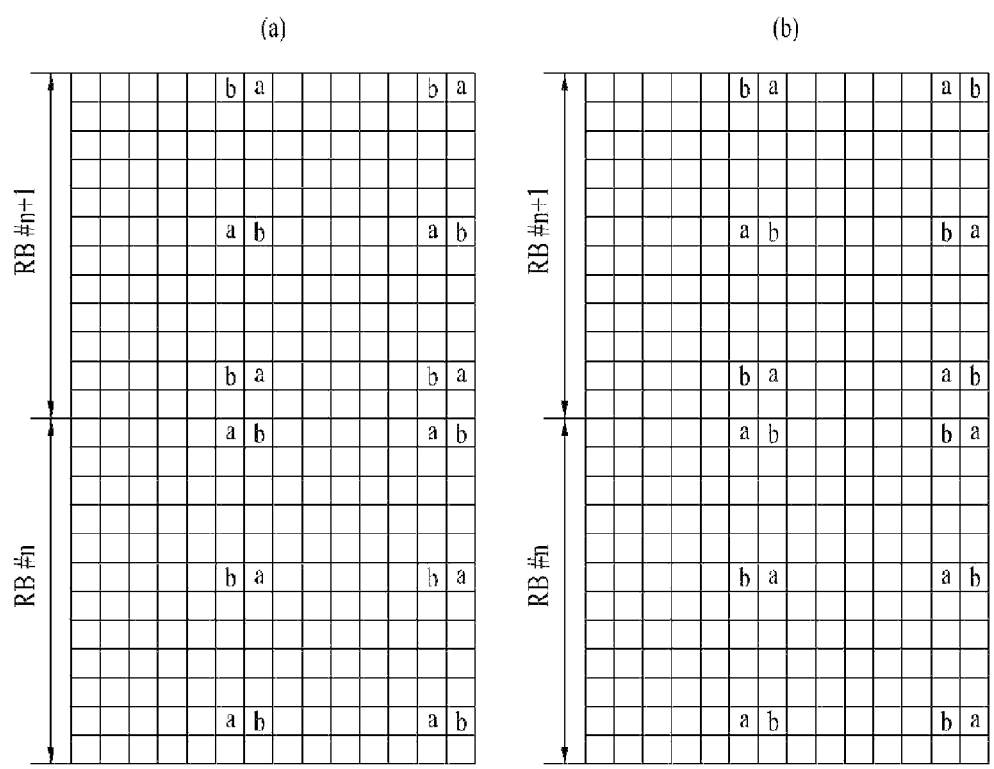
FIG. 13 illustrates

FIG. 13 illustrates an embodiment of the present invention for uniformly distributing transmission power across OFDM symbols in rank-2 transmission.

Referring to FIG. 13, to prevent the counterbalance between DRS sequences or too large a sum of the DRS sequences in specific OFDM symbols, the allocation positions of multiplexing OCCs may be swapped or shifted in the time domain or the frequency domain.

FIGS. 14 and 15 illustrate exemplary power allocations to DRS REs and data REs in rank-2 transmission.

Referring to FIG. 14, given a rank of 2, a BS may transmit two layers and two DRSs through two DRS ports. Since the same precoder is used for precoding the two layers and the two DRSs, the power ratio between data REs and DRS REs is the same for each layer.

Therefore, a UE can determine the power ratio between data REs and DRS REs for each layer without receiving additional information from the BS. It is because as each DRS port transmits a signal allocated to a data RE and a signal allocated to a DRS RE with the same power, the power ratio between the data RE and the DRS RE is implicitly signaled to the UE. Thus, different layers may have different power ratios in rank-2 transmission. Referring to FIG. 15, layer 0 and layer 1 may be transmitted at different power levels.

Referring to FIGS. 14 and 15, a transmission power per RE as well as a transmission power for each layer in each RE is constant. That is, power may be uniformly distributed across OFDM symbols in a subframe in up to rank-2 transmission. However, in rank-3 or higher-rank transmission, the number of layers per data RE and the number of layers per DRS RE may vary in an OFDM symbol according to the length of OCCs and the number of CDM groups. For example, referring to FIG. 10, on the assumption that a total of four layers are mapped to antenna port 7 to antenna port 10 in a one-to-one correspondence, the four layers are multiplexed in each data RE, whereas two DRSs are multiplexed in each DRS RE. As a consequence, a data RE and a DRS RE may have different transmission power per layer in rank-3 or higher-rank transmission. Hence, uniform power distribution to OFDM symbols in a subframe may be more difficult in rank-3 or higher-rank transmission than in rank-2 or lower-rank transmission. Accordingly, a power balancing scheme should be specified to prevent fluctuation of transmission power over OFDM symbols in the LTE-A system supporting rank-3 or higher-rank transmission.

A method for allocating/configuring DRSs in such a manner that power can be uniformly distributed to OFDM symbols in a subframe will be described below. For the convenience' sake of description, the present invention will be described, taking an example of using two CDM groups to support up to eight layers.

To transmit DRSs for eight layers in two CDM groups, OCCs of length 4 (OCC=4) may be used as illustrated in FIG. 15. FIG. 16 illustrates an example of allocating DRSs for layers corresponding to antenna port 11 to antenna port 14 in two CDM groups. Referring to FIGS. 10 and 16, it is noted that DRSs for layers corresponding to antenna port 7 to antenna port 14 are multiplexed in fours in two CDM groups. Namely, each CDM group carries up to four DRSs.

Figure 17:
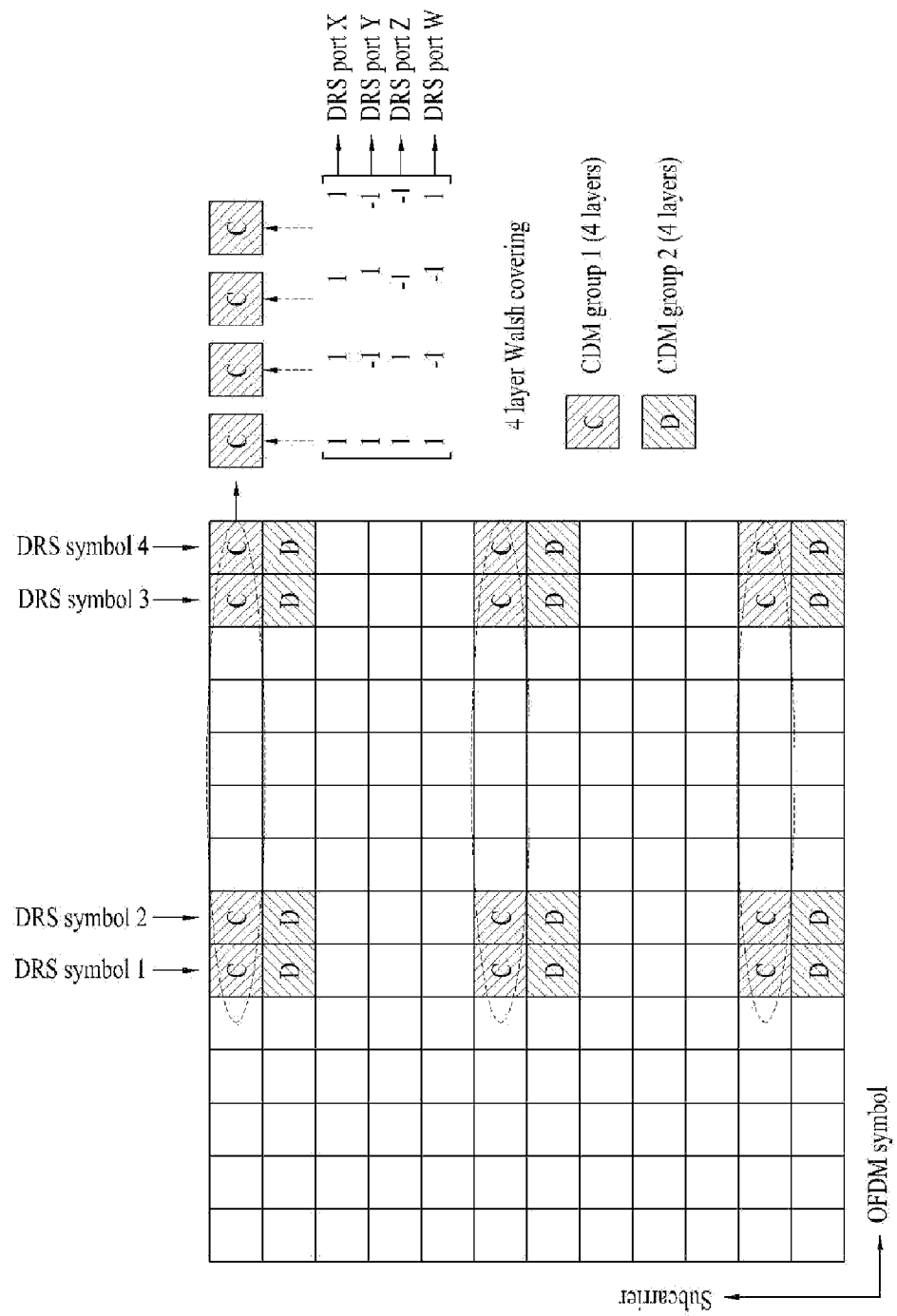
FIG. 17 illustrates a method for multiplexing eight DRSs in two CDM groups.

FIG. 17 illustrates a method for multiplexing eight DRSs in two CDM groups.

In a MIMO system supporting a rank of up to 8, up to eight DRS sequences may be transmitted in two CDM groups. Four DRSs may be multiplexed in each CDM group, using four OCC sequences of length 4. Let virtual antenna ports transmitting DRSx, DRSy, DRSz and DRSw be DRS port X, DRS port Y, DRS port Z, and DRS port W, respectively. It is assumed that the OCC sequences of length 4 are [1 1 1 1], [1 −1 1 −1], [1 1 −1 −1], and [1 −1 −1 1], respectively. The four OCC sequences correspond to the row-direction sequences of a 4×4 matrix illustrated in FIG. 17.

Referring to FIG. 17, DRSx is extended by the sequence [1 1 1 1], DRSy is extended by the sequence [1 −1 1 −1], DRSz is extended by the sequence [1 1 −1 −1], and DRSw is extended by the sequence [1 −1 −1 1]. Then the extended DRSx, DRSy, DRSz, and DRSw may be allocated to CDM group 1. Four DRSs other than DRSx, DRSy, DRSz, and DRSw are extended by the respective sequences, [1 1 1 1], [1 −1 1 −1], [1 1 −1 −1], and [1 −1 −1 1], and then may be allocated to CDM group 2.

In FIG. 17, an RB pair includes four DRS symbols, DRS symbol 1 to DRS symbol 4. Parts of DRSx, DRSy, DRSz, and DRSw extended by the sequences [1 1 1 1], [1 −1 1 −1], [1 1 −1 −1], and [1 −1 −1 1], respectively are allocated to DRS symbol 1. For example, DRSx is extended to [DRSx DRSx DRSx DRSx] by multiplying DRSx by the sequence [1 1 1 1], DRSy is extended to [DRSy −DRSy DRSy −DRSy] by multiplying DRSy by the sequence [1 −1 1 −1], DRSz is extended to [DRSz DRSz −DRSz −DRSz] by multiplying DRSx by the sequence [1 1 −1 −1], and DRSw is extended to [DRSw −DRSw −DRSw DRSw] by multiplying DRSw by the sequence [1 −1 −1 1]. For example, the first elements DRSx, DRSy, DRSz and DRSw of the extended DRS sequences are allocated to DRS symbol 1, the second elements DRSx, −DRSy, DRSz and −DRSw of the extended DRS sequences are allocated to DRS symbol 2, the third elements DRSx, DRSy, −DRSz and −DRSw of the extended DRS sequences are allocated to DRS symbol 3, and the fourth elements DRSx, −DRSy, −DRSz and DRSw of the extended DRS sequences are allocated to DRS symbol 4. That is, a (1×DRSx)+(1×DRSy)+(1×DRSz)+(1×DRSw) element is allocated to DRS symbol 1, a (1×DRSx)+(−1×DRSy)+(1×DRSz)+(−1×DRSw) element is allocated to DRS symbol 2, a (1×DRSx)+(1×DRSy)+(−1×DRSz)+(−1×DRSw) element is allocated to DRS symbol 3, and a (1×DRSx)+(−1×DRSy)+(−1×DRSz)+(1×DRSw) element is allocated to DRS symbol 4.

In summary, four DRSs may be allocated to DRS REs of two CDM groups, using the following OCCs.

$$W_4 = \begin{pmatrix} +1 & +1 & +1 & +1 \\ +1 & -1 & +1 & -1 \\ +1 & +1 & -1 & -1 \\ +1 & -1 & -1 & +1 \end{pmatrix}$$ [Formula 3]

$$= (a \quad b \quad c \quad d)$$

$$= \begin{pmatrix} x \\ y \\ z \\ w \end{pmatrix}$$

In [Formula 3], the column vectors a, b, c and d are multiplexing OCCs each including coefficients that are multiplied with a plurality of DRSs, when the DRSs are multiplexed into one RE. Each of the row vectors x, y, z and w is a spreading OCC with which a DRS is spread. For the convenience' sake of description, DRSs multiplexed in one RE are represented by a multiplexing OCC having weights multiplied with the DRSs in describing the present invention.

The DRS multiplexing illustrated in FIG. 11 and the DRS multiplexing illustrated in FIG. 17 may be carried out simultaneously or only either of them may be carried out in a wireless communication system. For example, the DRS multiplexing scheme of FIG. 11 may be used for a BS to multiplex one to four layers, for transmission, whereas the DRS multiplexing scheme of FIG. 17 may be used for a BS to multiplex five to eight layers, for transmission. In another example, one to eight layers may be multiplexed and transmitted using the DRS multiplexing scheme of FIG. 17. Notably, since the length of OCCs varies with the total number of layers transmitted by a BS in the former case, information indicating the total number of layers transmitted by the BS or the length of OCCs used for multiplexing the layers should be signaled to a UE explicitly or implicitly so that the UE may detect its layer using an OCC.

Now a description will be given of embodiments of the present invention for uniformly distributing transmission power across OFDM symbols according to scenarios.

<One CDM Group and OCC=4 Allocation>

FIGS. 18 to 22 illustrate multiplexing of DRSs in one CDM group using OCCs of length 4 according to embodiments of the present invention.

Embodiment 1

Figure 18:
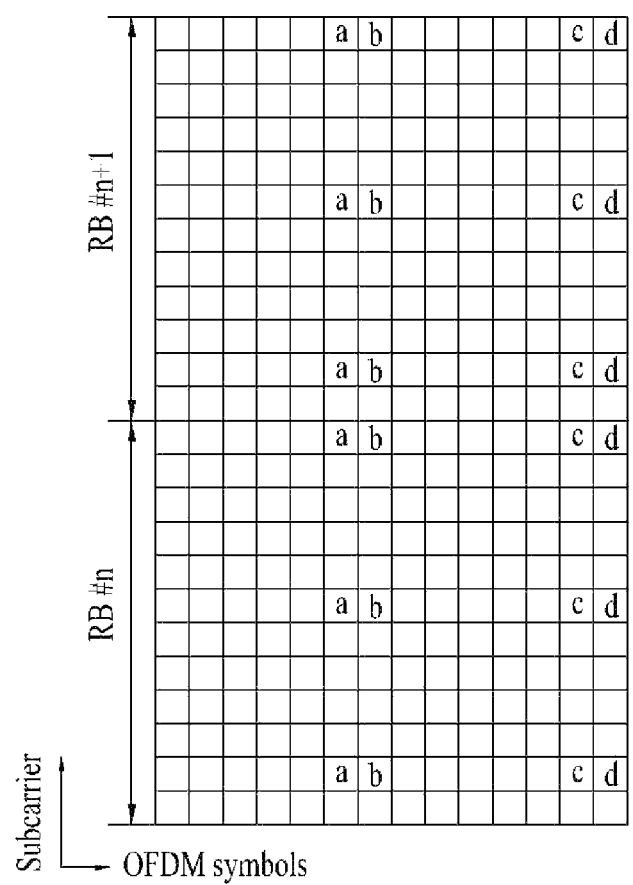
FIGS. 18 to 22 illustrate multiplexing of DRSs in one CDM group using OCCs of length 4 according to embodiments of the present invention.

Referring to FIG. 18, four multiplexing OCCs may be allocated to DRS OFDM symbols on each DRS subcarrier in the same order in every RB, such that from the viewpoint of one DRS OFDM symbol, only one of the OCCs is used in the DRS OFDM symbol. Therefore, power may concentrate on one DRS OFDM symbol. In the case where four multiplexing OCCs of length 4 are allocated to a CDM group, Embodiment 2 to Embodiment 5 may be contemplated for uniform power distribution across OFDM symbols.

Embodiment 2

Figure 19:
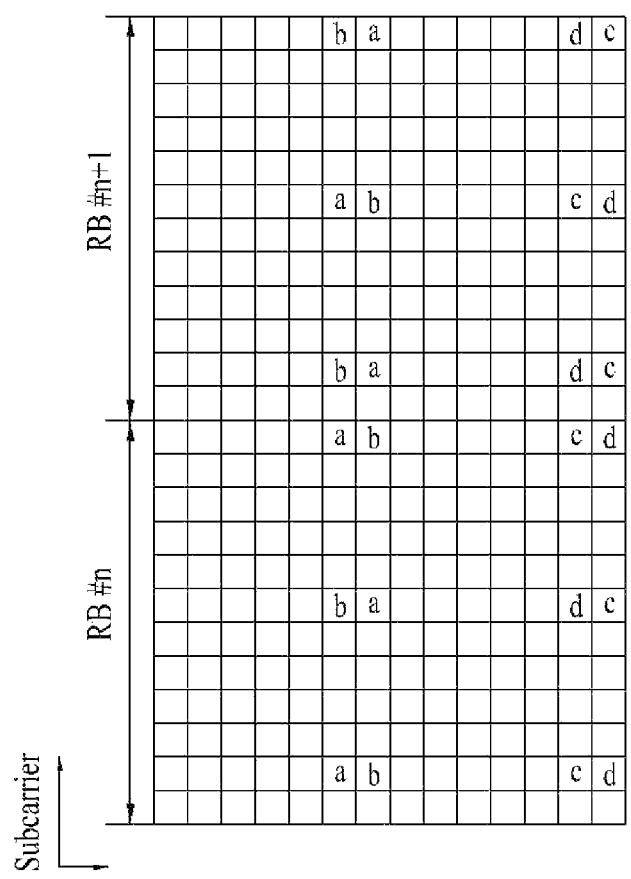
Figure 20:
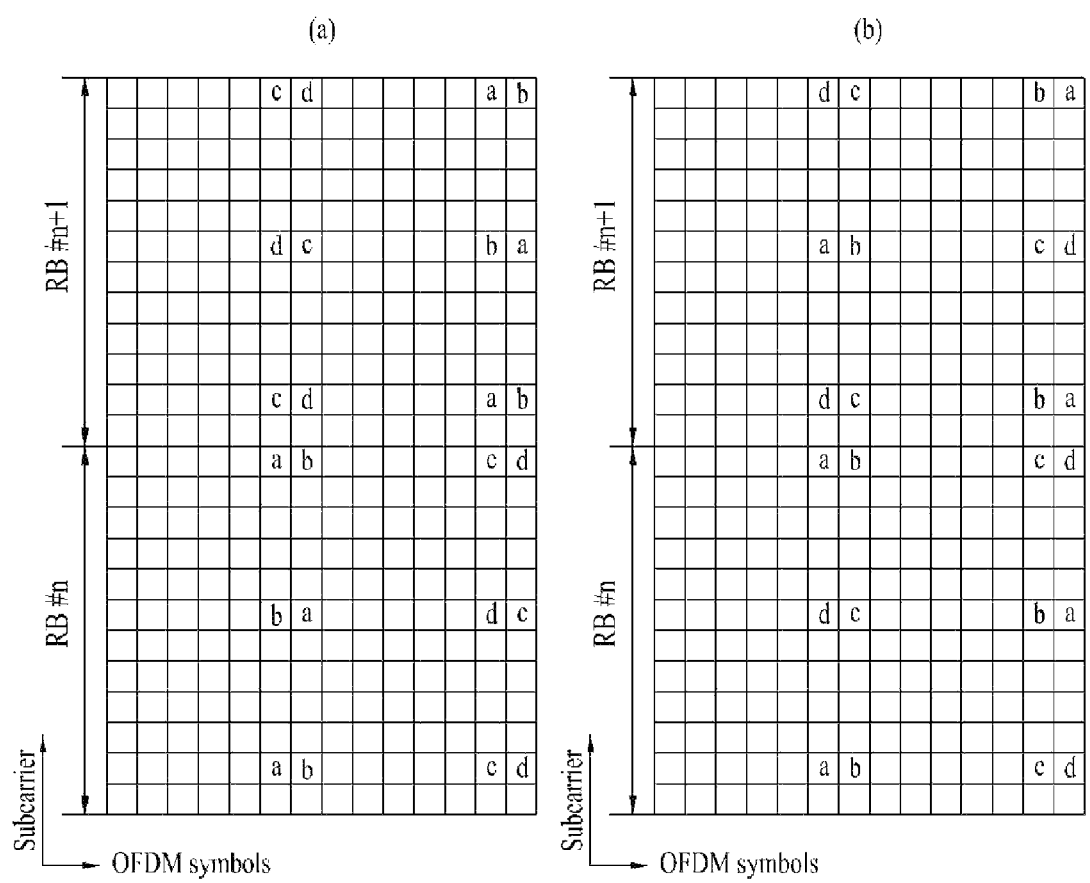

Referring to FIG. 19, the OCCs a and b of an OCC group (a, b) may be swapped with each other on DRS subcarriers in a slot, and the OCCs c and d of an OCC group (c, d) may be swapped with each other on DRS subcarriers in another slot. Specifically, if the OCCs a and b are allocated in the order of [a b] to a DRS subcarrier in a slot, the OCCs a and b are allocated in the reverse order of [b a] to the next DRS subcarrier in the slot. Since the order of two OCCs alternates between forward and reverse on DRS subcarriers in a slot, the same OCC allocation pattern occurs in every successive RB pair. Therefore, even though a plurality of RBs are allocated to a particular UE, OCCs are allocated in the same pattern in every two PRBs. One thing to note herein is that from the viewpoint of one DRS OFDM symbol, only two of four OCCs are used. From the viewpoint of one RB, only two OCCs are used for the RB. This means that the OCCs are not uniformly distributed across a subframe. Thus it may be concluded that OCC allocation according to Embodiment 2 makes it difficult to uniformly distribute power across all OFDM symbols in a subframe.

Embodiment 3-1

In Embodiment 3-1, the OCC patterns of two slots in an RB are swapped with each other in the next RB so that all OCCs exist in an OFDM symbol. Referring to FIG. 20(a), even though all OCCs are not allocated in an RB, all OCCs exist in an OFDM symbol. Thus, Embodiment 3-1 may achieve a uniform power distribution across OFDM symbols in a subframe, compared to Embodiment 2.

However, because only a part of the OCCs are allocated to an RB, power fluctuates over different RBs in the frequency domain.

Embodiment 3-2

For uniform distribution of OCCs at an RB level, four OCCs are allocated to each of DRS subcarriers in a reverse order to an OCC allocation order of the previous DRS subcarrier in a subframe. Referring to FIG. 20(b), if OCCs a, b, c and d are allocated to a first DRS subcarrier of a subframe in the order of [a b c d], they are allocated to a second DRS subcarrier of the subframe in the reverse order to [a b c d], that is, in the order of [d c b a], and to a third DRS subcarrier of the subframe in the reverse order to [d c b a], that is, in the order of [a b c d].

Embodiment 3-2 is advantageous in that all OCCs are allocated in one slot. However, only two OCCs are repeated in each DRS OFDM symbol.

Embodiment 4

Figure 21:
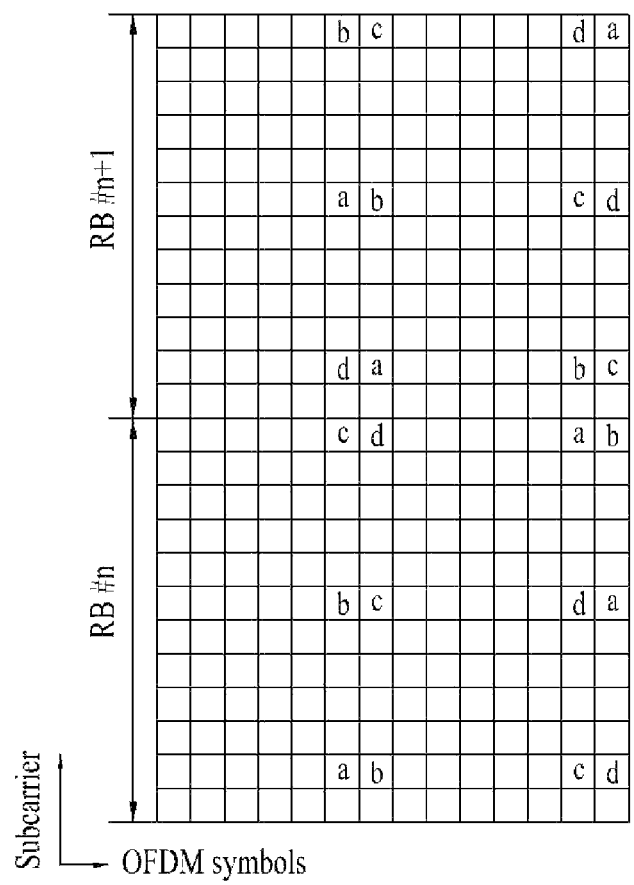

The OCCs (a, b, c, d) are cyclically shifted on DRS subcarriers in one CDM group so that the OCCs may be uniformly distributed at both an RB level and a DRS OFDM symbol level. Referring to FIG. 21, the OCCs (a, b, c, d) are allocated in the order of [a b c d] to a first DRS subcarrier of RB #n in a subframe, in the order of [b c d a] to a second DRS subcarrier of RB #n in the subframe by cyclically shifting [a b c d], and then in the order of [c d a b] to a third DRS subcarrier of RB #n in the subframe by cyclically shifting [b c d a].

According to Embodiment 4, all OCCs are allocated to an RB as well as a DRS OFDM symbol. However, the four OCCs cannot be allocated to a resource area defined as one DRS OFDM symbol by one RB because only three DRS REs are available in the resource area.

Embodiment 5

Figure 22:
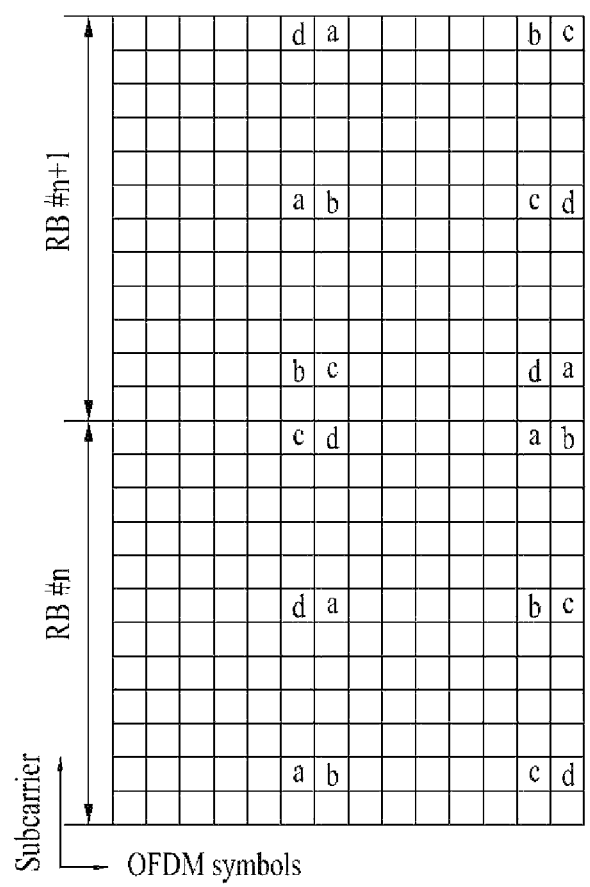

The OCCs are cyclically shifted on DRS REs of DRS OFDM symbols in such a manner that OCCs are uniformly distributed across a plurality of RBs in each DRS OFDM symbol. Referring to FIG. 22, four DRS OFDM symbols include DRSs in a subframe and three DRS REs per RB are available in each DRS OFDM symbol. Since different DRS OFDM symbols start with different OCCs, all OCCs exist on each DRS subcarrier in a subframe.

<2 CDM Groups and OCC=4 Allocation>

FIGS. 23 to 30 illustrate multiplexing of DRSs in two CDM groups using OCCs of length 4 according to embodiments of the present invention. In the case where four multiplexing OCCs of length 4 are allocated to each of two CDM groups, the following embodiments may be considered to uniformly distribute power across OFDM symbols. Embodiment 6, Embodiment 7 and Embodiment 8 may be used in combination with any of Embodiment 1 to Embodiment 5.

Embodiment 6

The simplest method for allocating four OCCs to each of two CDM groups is to repeat the OCC allocation pattern of one CDM group for the other CDM group. For example, referring to FIGS. 21 and 23, if Embodiment 4 is adopted for CDM group 1, the OCCs may be allocated to CDM group 2 in the same OCC pattern of CDM group 1.

When OCCs are allocated to two adjacent DRS subcarriers according to Embodiment 5, spreading OCCs and DRS ports for CDM group 1 and CDM group 2 are placed in the following relationship.

TABLE 3

| DRS port | Orthogonal Cover Code [$w_p(0)$ $w_p(1)$ $w_p(2)$ $w_p(3)$] | CDM group |
|---|---|---|
| 0 | [+1 +1 +1 +1] | 1 |
| 1 | [+1 −1 +1 −1] | 1 |
| 2 | [+1 +1 +1 +1] | 2 |
| 3 | [+1 −1 +1 −1] | 2 |
| 4 | [+1 +1 −1 −1] | 1 |
| 5 | [+1 +1 −1 −1] | 2 |
| 6 | [+1 −1 −1 +1] | 1 |
| 7 | [+1 −1 −1 +1] | 2 |

In [Table 3], DRS ports are virtual antenna ports that transmit DRSs among antenna ports. The DRS ports one-to-one correspond to layers. For example, antenna port 7 to antenna port 14 may be mapped to DRS port 0 to DRS port 7, respectively. DRS port 0 to DRS port 7 may one-to-one correspond to layer 0 to layer 7 in [Table 3]. In this case, a spreading OCC for each DRS port is a spreading OCC for each layer. A DRS for each DRS port (or each layer) is extended by [$w_p(0)$ $w_p(1)$ $w_p(2)$ $w_p(3)$] and mapped to four successive DRS REs on a DRS subcarrier in a CDM group corresponding to the DRS.

For the two CDM groups, DRS ports allocated to the CDM groups on two DRS subcarriers and spreading OCCs used for layers corresponding to the DRS ports are listed in [Table 4] below.

TABLE 4

| CDM group 1 | | CDM group 2 | |
|---|---|---|---|
| DRS port | Orthogonal Cover Code [$w_p(0)$ $w_p(1)$ $w_p(2)$ $w_p(3)$] | DRS port | Orthogonal Cover Code [$w_p(0)$ $w_p(1)$ $w_p(2)$ $w_p(3)$] |
| 0 | [+1 +1 +1 +1] | 2 | [+1 +1 +1 +1] |
| 1 | [+1 −1 +1 −1] | 3 | [+1 −1 +1 −1] |
| 4 | [+1 +1 −1 −1] | 5 | [+1 +1 −1 −1] |
| 6 | [+1 −1 −1 +1] | 7 | [+1 −1 −1 +1] |

Figure 23:
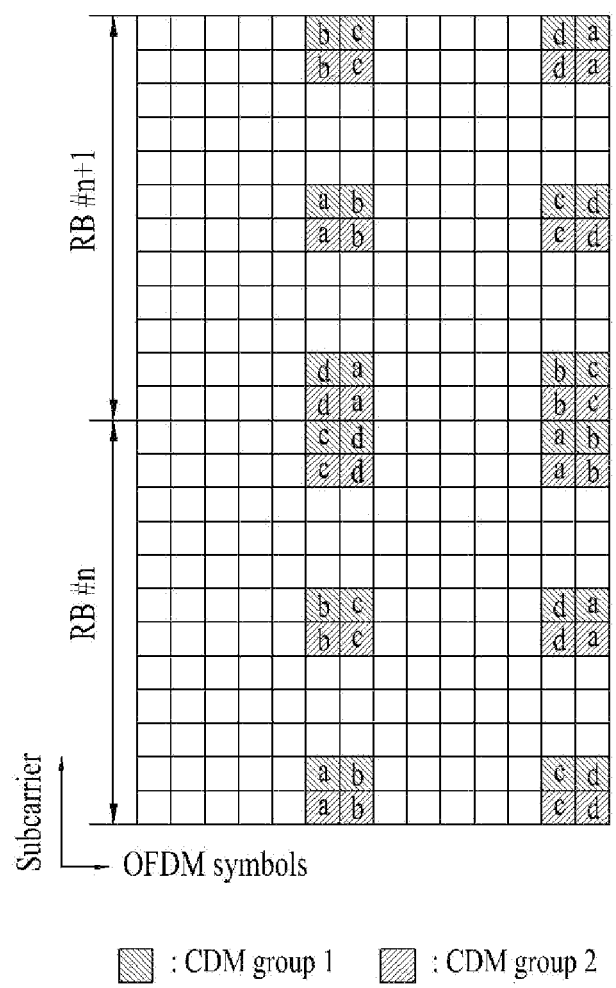

In [Table 4], $w_p(l')$ is a weight multiplied by a layer in DRS OFDM symbol l'. A vector of weights applied to the DRS ports of a CDM group may be regarded as a multiplexing OCC. For example, referring to [Table 4], $w_p(0)$ for DRS ports 0, 1, 4, and 6 allocated to CDM group 1 and $w_p(0)$ for DRS ports 2, 3, 5 and 7 allocated to CDM group 2 are +1, +1, +1, +1. Therefore, a multiplexing OCC allocated to a start DRS OFDM symbol on a start DRS subcarrier of CDM group 1 is a sequence a, [+1 +1 +1 +1]. Referring to FIG. 23, multiplexing OCCs are allocated in the order of [a b c d] to four DRS OFDM symbols on the start DRS subcarrier of each CDM group.

Embodiment 7

The OCC allocation pattern of a first CDM group is cyclically shifted slotwise by two OCCs and then allocated to a second CDM group. Referring to FIG. 24(a), the OCCs (a, b, c, d) allocated to a DRS subcarrier are cyclically shifted by one OCC on the next DRS subcarrier in CDM group 1 according to Embodiment 4. The OCC pattern of a DRS subcarrier of CDM group 1 is shifted by two OCCs slotwise on a DRS subcarrier of CDM group 2 adjacent to the DRS subcarrier of CDM group 1. Therefore, if one CDM group starts with an OCC pattern [a b c d] over DRS OFDM symbols, the other CDM group starts with an OCC pattern [c d a b] in Embodiment 7.

Embodiment 8

The OCC allocation pattern of a first CDM group is cyclically shifted slotwise by one OCC and then allocated to a second CDM group. Referring to FIG. 25(a), the OCCs (a, b, c, d) allocated to a DRS subcarrier are cyclically shifted by one OCC on the next DRS subcarrier in CDM group 1 according to Embodiment 4. In CDM group 2, the OCC pattern of a DRS subcarrier of CDM group 1 adjacent to a DRS subcarrier is shifted by one OCC slotwise on the DRS subcarrier. Therefore, if one CDM group starts with an OCC pattern [a b c d] over DRS OFDM symbols, the other CDM group starts with an OCC pattern [d a b c] in Embodiment 8.

The OCC patterns illustrated in FIGS. 24(a) and 25(a) may be swapped in the two CDM groups. FIGS. 24(b) and 25(b) illustrate embodiments in which the OCC patterns of CDM group 1 are swapped with the OCC patterns of CDM group 2 in FIGS. 24(a) and 25(a).

The same scrambling sequence may be applied to all DRS ports, or different scrambling sequences may be applied to different DRS port groups and/or different DRS ports in Embodiment 1 to Embodiment 8.

Figure 24:
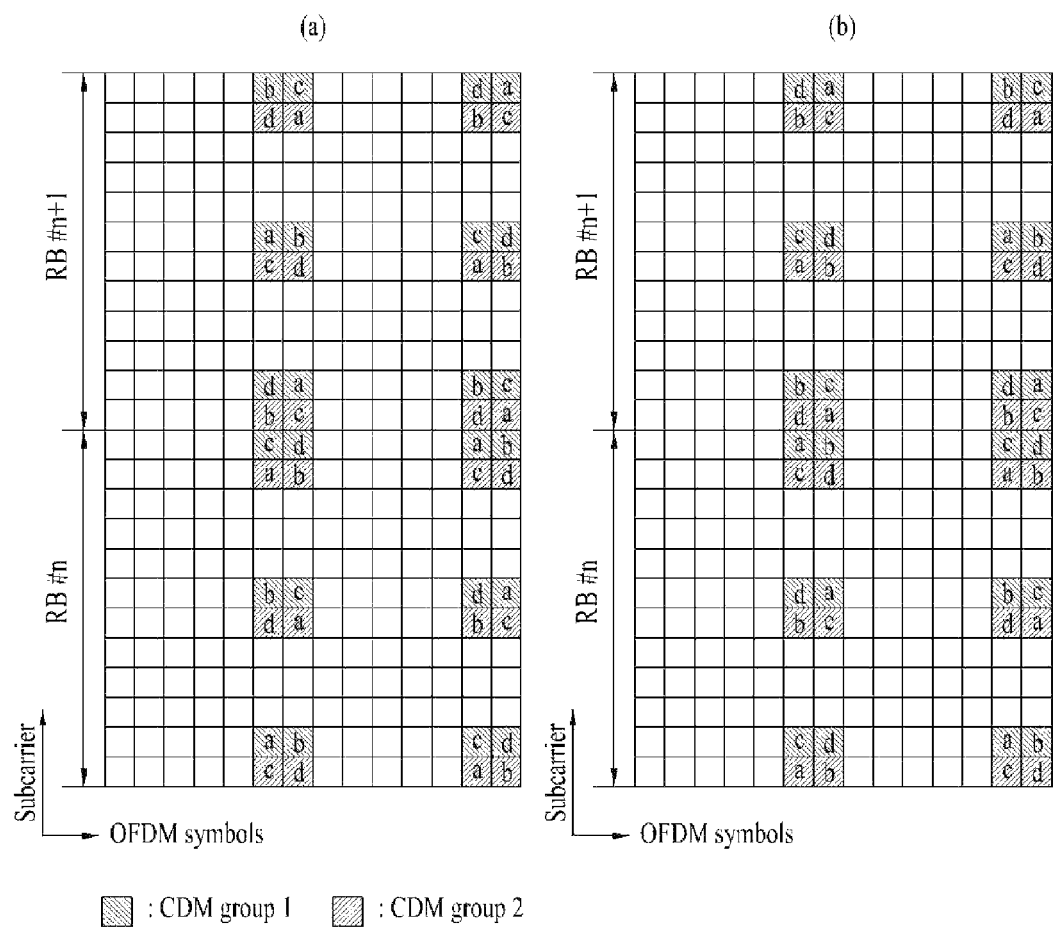
Figure 25:
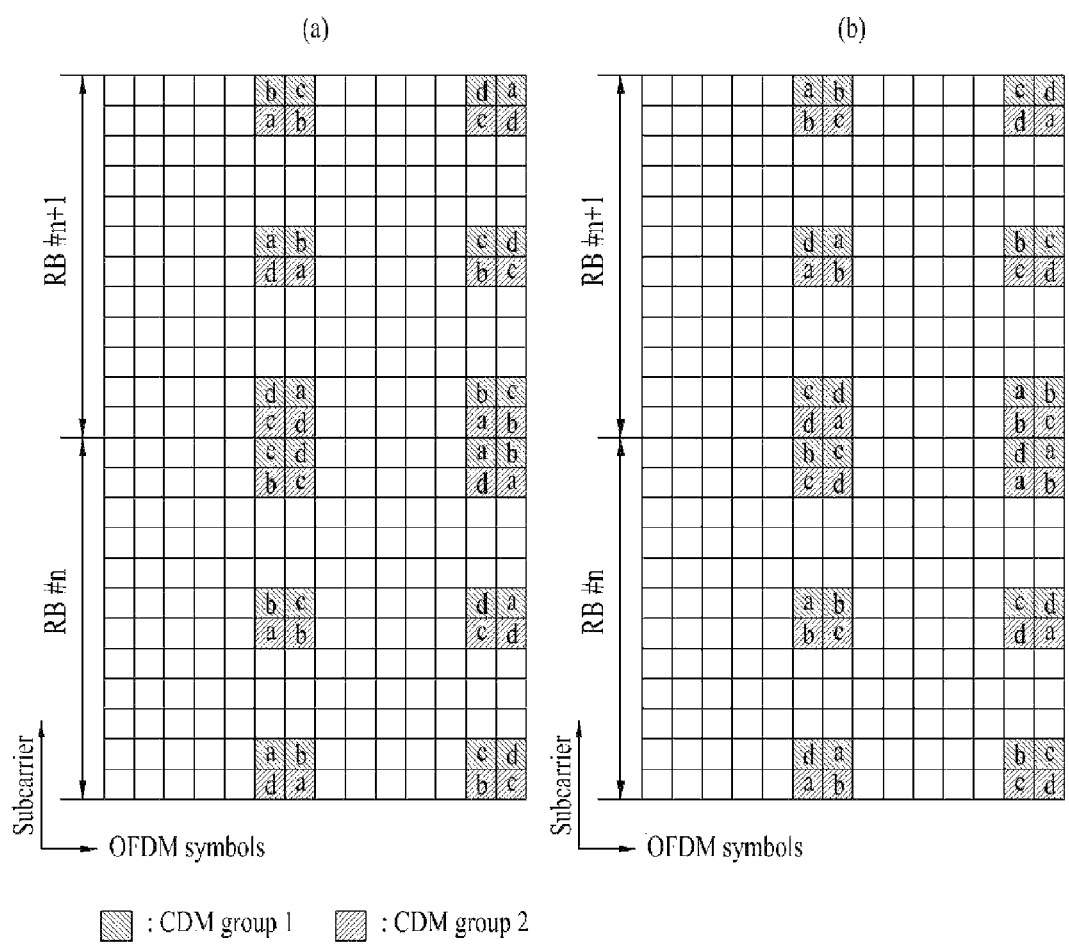
Figure 26:
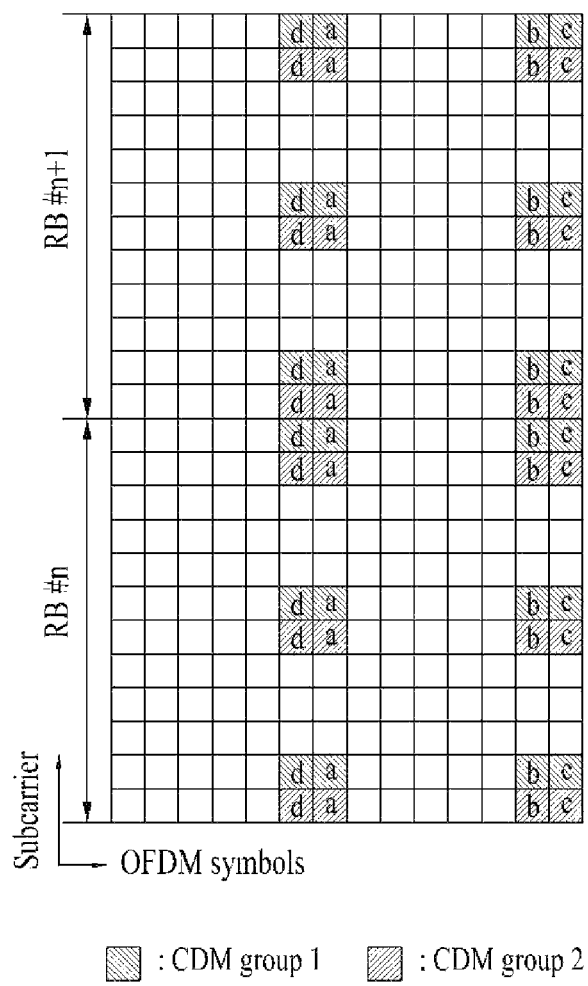
Figure 27:
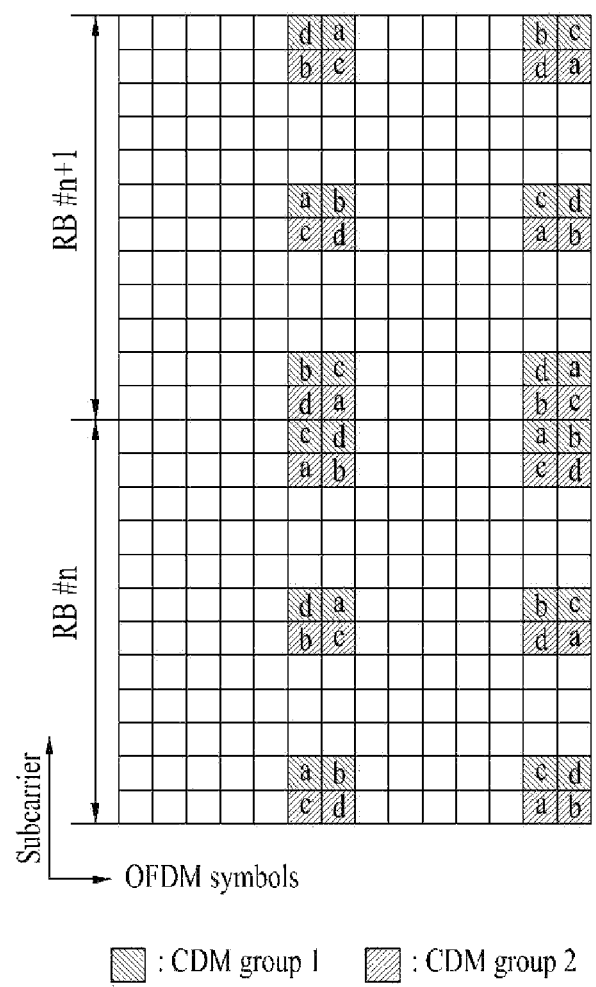

FIGS. 23, 24 and 25 illustrate methods for allocating OCCs to two CDM groups, when OCCs are allocated to a first CDM group according to Embodiment 4 as illustrated in FIG. 21, according to Embodiment 6, Embodiment 7, and Embodiment 8. If the OCCs are allocated to the first CDM group according to Embodiment 5, the two CDM groups may have OCC patterns illustrated in FIGS. 26, 27 and 28 according to Embodiment 6, Embodiment 7, and Embodiment 8. The OCC patterns of CDM group 1 illustrated in FIGS. 26, 27 and 28 may be swapped with those of CDM group 2.

Figure 28:
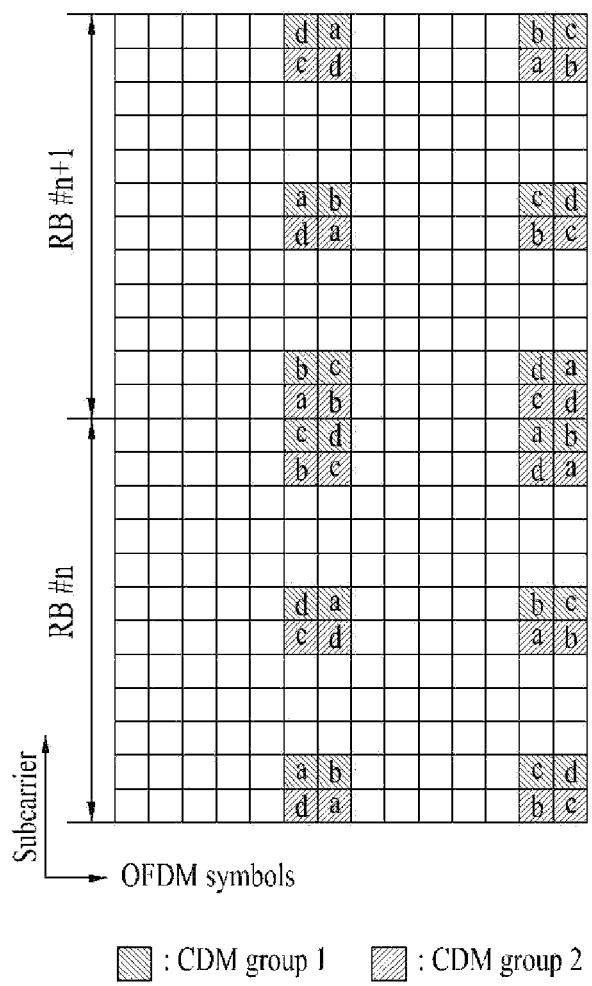
Figure 29:
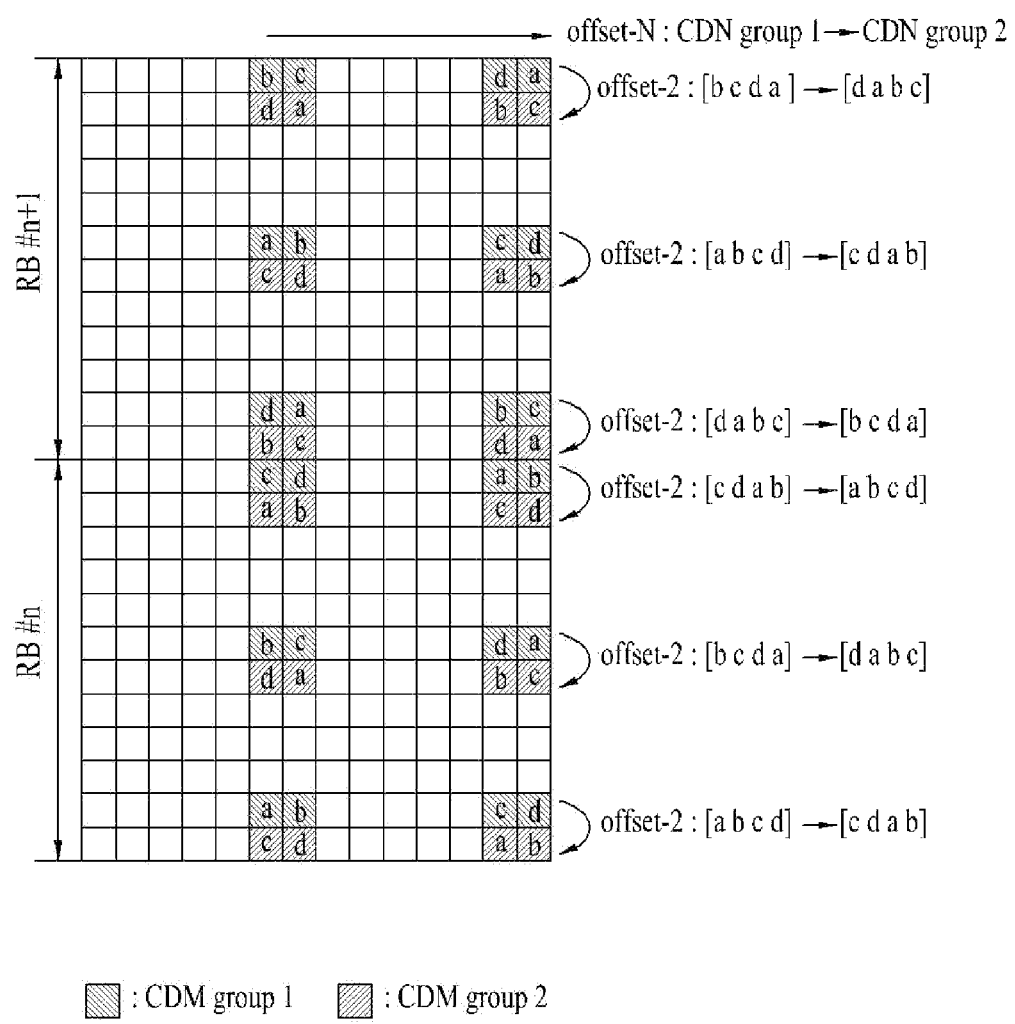

In Embodiment 7, in the case where OCCs are allocated to two CDM groups, if the OCCs are allocated in the order of [a b c d] to a DRS subcarrier in one CDM group, a 2-OCC shift version of the OCC pattern [a b c d], that is, [c d a b] is allocated to a DMRS subcarrier of the other CDM group, adjacent to the DRS subcarrier of the one CDM group. In Embodiment 8, in the case where OCCs are allocated to two CDM groups, if the OCCs are allocated in the order of [a b c d] to a DRS subcarrier in one CDM group, a 1-OCC shift version of the OCC pattern [a b c d], that is, [b c d a] is allocated to a DMRS subcarrier of the other CDM group, adjacent to the DRS subcarrier of the one CDM group. That is, there is an offset being a predetermined number of OCCs between the OCC patterns of two adjacent DRS subcarriers in Embodiment 7 and Embodiment 8. This offset is called an OCC offset. Therefore, the OCC offset is 0, 2 and 1, respectively in Embodiment 6, Embodiment 7, and Embodiment 8. If the OCCs are allocated in the order of [a b c d] to a start DRS subcarrier of CDM group 1, the OCC patterns of CDM group 1 and CDM group 2 are formed according to Embodiment 6, Embodiment 7, and Embodiment 8 as illustrated in FIG. 29. In FIG. 29, offset-N means that there is an difference of N OCCs between the OCCs of the CDM groups. Particularly, N is 2 in FIG. 29. In FIG. 28 illustrating Embodiment 8, the OCC pattern of CDM group 2 has a left offset of 1 with respect to the OCC pattern of CDM group 1. As illustrated in FIG. 30, the OCCs may be allocated to CDM group 2 with a right offset of 1, that is, a left offset of 3 with respect to the OCC pattern of CDM group 1. If the OCC offset is 2, left shift and right shift lead to the same result.

The OCC offset of the second CDM group with respect to the first CDM group may be fixed or set by a BS. It is also possible to vary the OCC offset depending on frequency positions to more uniformly distribute the OCCs. In addition, the OCC offset may be changed according to a rank and/or a transmission mode.

An embodiment in which the OCC pattern of a DRS subcarrier of a second CDM group adjacent to a DRS subcarrier of a first CDM group has a specific offset with respect to the OCC pattern of the DRS subcarrier of the first CDM group can be implemented irrespective of how OCCs are allocated to the first CDM group. That is, while Embodiment 6, Embodiment 7, and Embodiment 8 allocate OCCs to two CDM groups with a specific OCC offset on the assumption that OCCs are allocated to the first CDM group according to Embodiment 4, the same thing is also applicable to Embodiment 1 to Embodiment 5.

In the embodiments in which OCCs are allocated to two CDM groups with a predetermined OCC offset, spreading OCCs and DRS ports are in the following mapping relationship, for CDM group 1 and CDM group 2 whose DRS subcarriers are adjacent. An OCC offset of 2 is given for [Table 5].

TABLE 5

| DRS port | Orthogonal Cover Code $[w_p(0)\ w_p(1)\ w_p(2)\ w_p(3)]$ | CDM group |
|---|---|---|
| 0 | [+1 +1 +1 +1] | 1 |
| 1 | [+1 −1 +1 −1] | 1 |
| 2 | [+1 +1 +1 +1] | 2 |
| 3 | [+1 −1 +1 −1] | 2 |
| 4 | [+1 +1 −1 −1] | 1 |
| 5 | [−1 −1 +1 +1] | 2 |
| 6 | [+1 −1 −1 +1] | 1 |
| 7 | [−1 +1 +1 −1] | 2 |

DRS ports allocated to two CDM groups on two adjacent DRS subcarriers and orthogonal codes used to spread layers corresponding to the DRS ports are summarized as follows.

In [Table 5], DRS port 0 to DRS port 7 may be mapped to layer 0 to layer 7 in a one-to-one correspondence. In this case, the spreading OCCs of the DRS ports are the spreading OCCs of the layers.

TABLE 6

| CDM group 1 | | CDM group 2 | |
|---|---|---|---|
| DRS port | Orthogonal Cover Code $[w_p(0)\ w_p(1)\ w_p(2)\ w_p(3)]$ | DRS port | Orthogonal Cover Code $[w_p(0)\ w_p(1)\ w_p(2)\ w_p(3)]$ |
| 0 | [+1 +1 +1 +1] | 2 | [+1 +1 +1 +1] |
| 1 | [+1 −1 +1 −1] | 3 | [+1 −1 +1 −1] |
| 4 | [+1 +1 −1 −1] | 5 | [−1 −1 +1 +1] |
| 6 | [+1 −1 −1 +1] | 7 | [−1 +1 +1 −1] |

In [Table 5] and [Table 6], $w_p(l')$ is a weight multiplied with a layer in DRS OFDM symbol l'. A DRS of a DRS port is extended by a spreading OCC $[w_p(0)\ w_p(1)\ w_p(2)\ w_p(3)]$ and mapped to four DRS OFDM symbols in a subframe. A vector of weights for DRS ports allocated to a CDM group may be regarded as a multiplexing OCC. For example, referring to [Table 6], $w_p(0)$ for DRS ports 0, 1, 4, and 6 allocated to CDM group 1 is +1, +1, +1, +1. Therefore, a multiplexing OCC allocated to a start DRS OFDM symbol on a start DRS subcarrier of CDM group 1 is a sequence a, [+1 +1 +1 +1]. $w_p(0)$ for DRS ports 2, 3, 5, and 7 allocated to CDM group 2 is +1, +1, −1, −1. Therefore, a multiplexing OCC allocated to a start DRS OFDM symbol on a start DRS subcarrier of CDM group 2 is a sequence c, [+1 +1 −1 −1].

Figure 31:
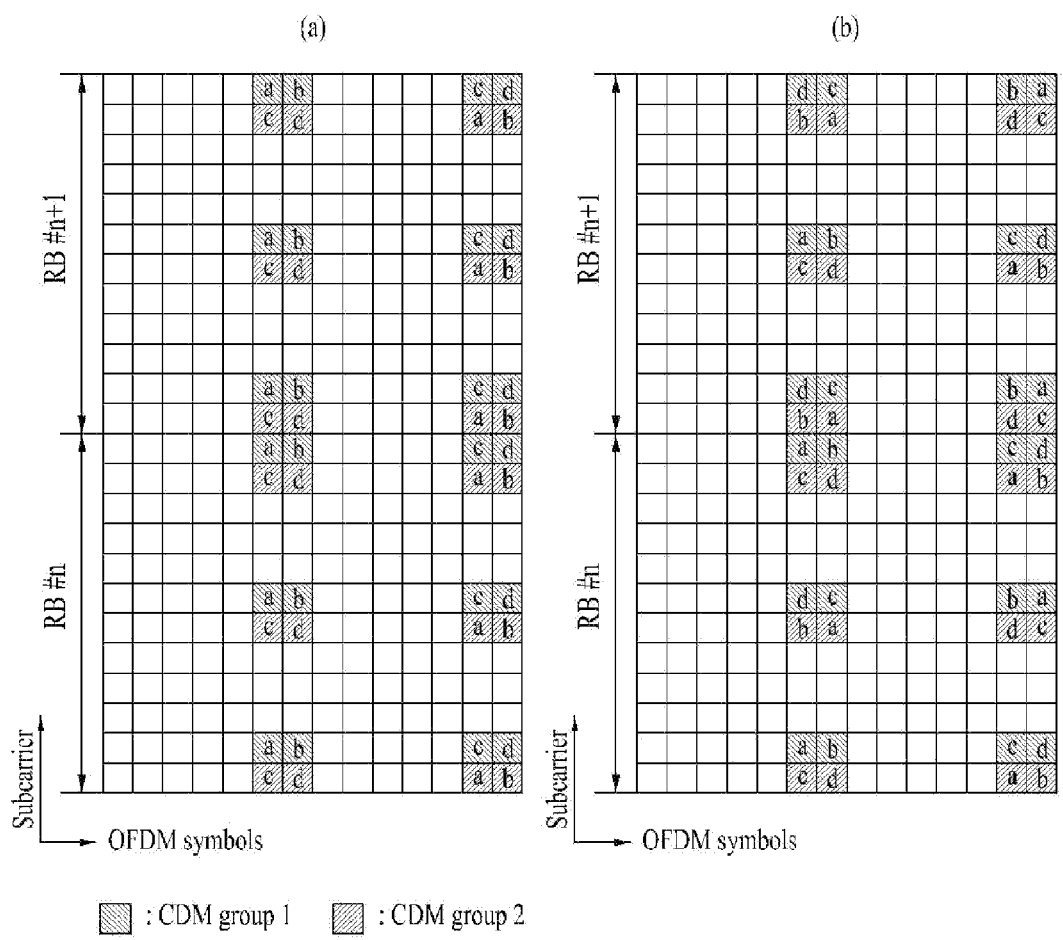
FIG. 31 illustrates OCC allocation so that there is a predetermined OCC offset between two CDM groups according to embodiments of the present invention.

FIG. 31 illustrates OCC allocation so that there is a predetermined OCC offset between two CDM groups according to embodiments of the present invention. Specifically, FIG. 31(a) illustrates OCC allocation to the other CDM group with an OCC offset of 2, when OCCs are allocated to one CDM group according to Embodiment 1 (see FIG. 18) and FIG. 31(a) illustrates OCC allocation to the other CDM group with an OCC offset of 2, when OCCs are allocated to one CDM group according to Embodiment 4 (see FIG. 20(b)).

Referring to FIG. 31(a), OCCs are allocated to each DRS subcarrier of CDM group 1 in the pattern [a b c d], starting with the OCC a. The OCCs are allocated to each DRS subcarrier of CDM group 2 with an OCC offset of 2 with respect to the OCC pattern of CDM group 1, thus in the pattern [c d a b]. This OCC allocation scheme may be represented as the following Formula.

$$a_{k,l}^{(p)} = \overline{w}_p(l') \cdot r(3 \cdot l' \cdot N_{RB}^{max,DL} + 3 \cdot n_{PRB} + m') \qquad \text{[Formula 4]}$$

where $$\overline{w}_p(i) = w_p(i)$$

$$k = 5 \cdot m' + N_{sc}^{RB} \cdot n_{PRB} + k'$$

$$k' = \begin{cases} 1 & p \in \{0, 1, 4, 6\} \\ 0 & p \in \{2, 3, 5, 7\} \end{cases}$$

$$l = \begin{cases} l' \bmod 2 + 2 & \text{if in special subframe with configuration 3, 4, or 8} \\ l' \bmod 2 + 2 + 3 \cdot \lfloor l'/2 \rfloor & \text{if in special subframe with configuration 1, 2, 6, or 7} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7} \\ 0, 1 & \text{if } n_s \bmod 2 = 0 \text{ and not in special subframe with configuration 1, 2, 6, or 7} \\ 2, 3 & \text{if } n_s \bmod 2 = 1 \text{ and not in a special subframe 1, 2, 6, or 7} \end{cases}$$

$$m' = 0, 1, 2$$

where $w_p(i)$ is given in [Table 5], and if k'=0, k' represents a DRS port allocated to CDM group 1, and if k'=1, k' represents a DRS port allocated to CDM group 2. DRS port 0 to DRS port 7 may correspond to antenna port 7 to antenna port 14 illustrated in FIGS. 10 to 16.

When the OCCs are allocated to a CDM group according to Embodiment 1, a DRS OFDM symbol contains only one OCC for each CDM group. Therefore, only two OCCs exist for the two CDM groups in the DRS OFDM symbol. As illustrated in FIG. 31(b), the OCCs may be allocated in such a manner that a DRS OFDM symbol contains all OCCs in the two CDM groups.

Referring to FIG. 31(b), the OCCs are allocated in the order of [a b c d] to a DRS subcarrier of CDM group 1, starting with the OCC a, and the OCCs are allocated in the reverse order of [a b c d], that is, in the order of [d c b a] to the next DRS subcarrier in CDM group 1. That is, the OCC allocation orders of one DRS subcarrier and the next DRS subcarrier are reverse to each other in CDM group 1. Meanwhile, the OCCs are allocated to each DRS subcarrier of CDM group 2, with an OCC offset of 2 with respect to the OCC pattern of a DRS subcarrier of CDM group 1 adjacent to the DRS subcarrier of CDM group 2. For example, when the OCCs are allocated in the order of [a b c d] to a DRS subcarrier of CDM group 1, the OCCs are allocated in the order of [c d a b] to a DRS subcarrier of CDM group 2 adjacent to the DRS subcarrier of CDM group 1. When the OCCs are allocated in the order of [d c b a] to a DRS subcarrier of CDM group 1, the OCCs are allocated in the order of [b a d c] to a DRS subcarrier of CDM group 2 adjacent to the DRS subcarrier of CDM group 1. Thus, the OCC patterns [a b c d] and [d c b a] alternate between DRS subcarriers in CDM group 1 and the OCC patterns [c d a b] and [b a d c] alternate between DRS subcarriers in CDM group 2. This OCC allocation scheme is expressed as $$a_{k,l}^{(p)} = \overline{w}_p(l') \cdot r(3 \cdot l' \cdot N_{RB}^{max,DL} + 3 \cdot n_{PRB} + m') \qquad \text{[Formula 5]}$$

where $$\overline{w}_p(i) = \begin{cases} w_p(i) & (m' + n_{PRB}) \bmod 2 = 0 \\ w_p(3 - i) & (m' + n_{PRB}) \bmod 2 = 1 \end{cases}$$

$$k = 5 \cdot m' + N_{sc}^{RB} \cdot n_{PRB} + k'$$

$$k' = \begin{cases} 1 & p \in \{0, 1, 4, 6\} \\ 0 & p \in \{2, 3, 5, 7\} \end{cases}$$

$$l = \begin{cases} l' \bmod 2 + 2 & \text{if in special subframe with configuration 3, 4, or 8} \\ l' \bmod 2 + 2 + 3 \cdot \lfloor l'/2 \rfloor & \text{if in special subframe with configuration 1, 2, 6, or 7} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7} \\ 0, 1 & \text{if } n_s \bmod 2 = 0 \text{ and not in special subframe with configuration 1, 2, 6, or 7} \\ 2, 3 & \text{if } n_s \bmod 2 = 1 \text{ and not in a special subframe 1, 2, 6, or 7} \end{cases}$$

$$m' = 0, 1, 2$$

where $w_p(i)$ is given in [Table 5], and if k'=0, k' represents a DRS port allocated to CDM group 1, and if k'=1, k' represents a DRS port allocated to CDM group 2. DRS port 0 to DRS port 7 may correspond to antenna port 7 to antenna port 14 illustrated in FIGS. 10 to 16.

When OCCs are allocated to one CDM group according to Embodiment 3-2 and the OCCs are allocated to the other CDM group with an OCC offset of 2 with respect to the one CDM group, all of the four OCCs can be used for the two CDM groups in a DRS OFDM symbol. If OCCs are allocated with a predetermined OCC offset between CDM groups, the number of OCC pairs that can be allocated to two adjacent DRS subcarriers of the CDM groups is limited to 2 per DRS OFDM symbol. For example, referring to FIG. 31, given an OCC offset of 2, only OCC pairs (a, c) and (b, d) can be allocated to two adjacent DRS subcarriers of different CDM groups in a DRS OFDM symbol.

FIGS. 32 to 38 are views referred to for describing advantages of allocating OCCs so that there is a predetermined OCC offset between two CDM groups according to embodiments of the present invention.

Figure 32:
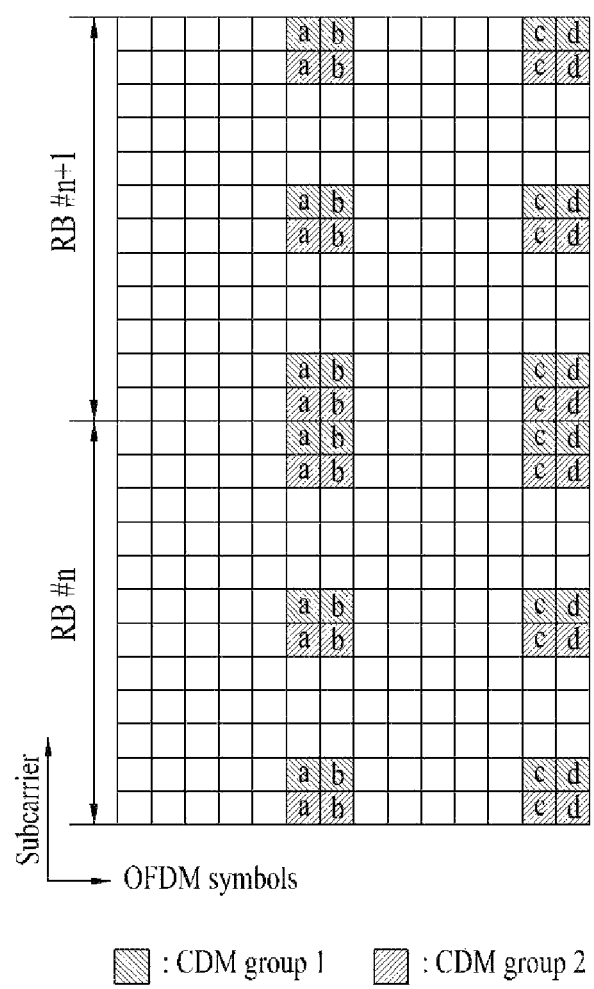
FIGS. 32 to 38 are views referred to for describing advantages of allocating OCCs so that there is a predetermined OCC offset between two CDM groups according to embodiments of the present invention.

It is assumed that eight DRS ports are mapped to eight layers in a one-to-one correspondence, and OCCs are allocated to two CDM groups as illustrated in FIG. 32. If the OCCs are allocated in the pattern of FIG. 32 and a common scrambling sequence is applied to all layers, power may be increased in a specific OFDM symbol, or DRS signals are counterbalanced with one another on a DRS subcarrier of a specific OFDM symbol, thus decreasing the power of the specific OFDM symbol.

Figure 33:
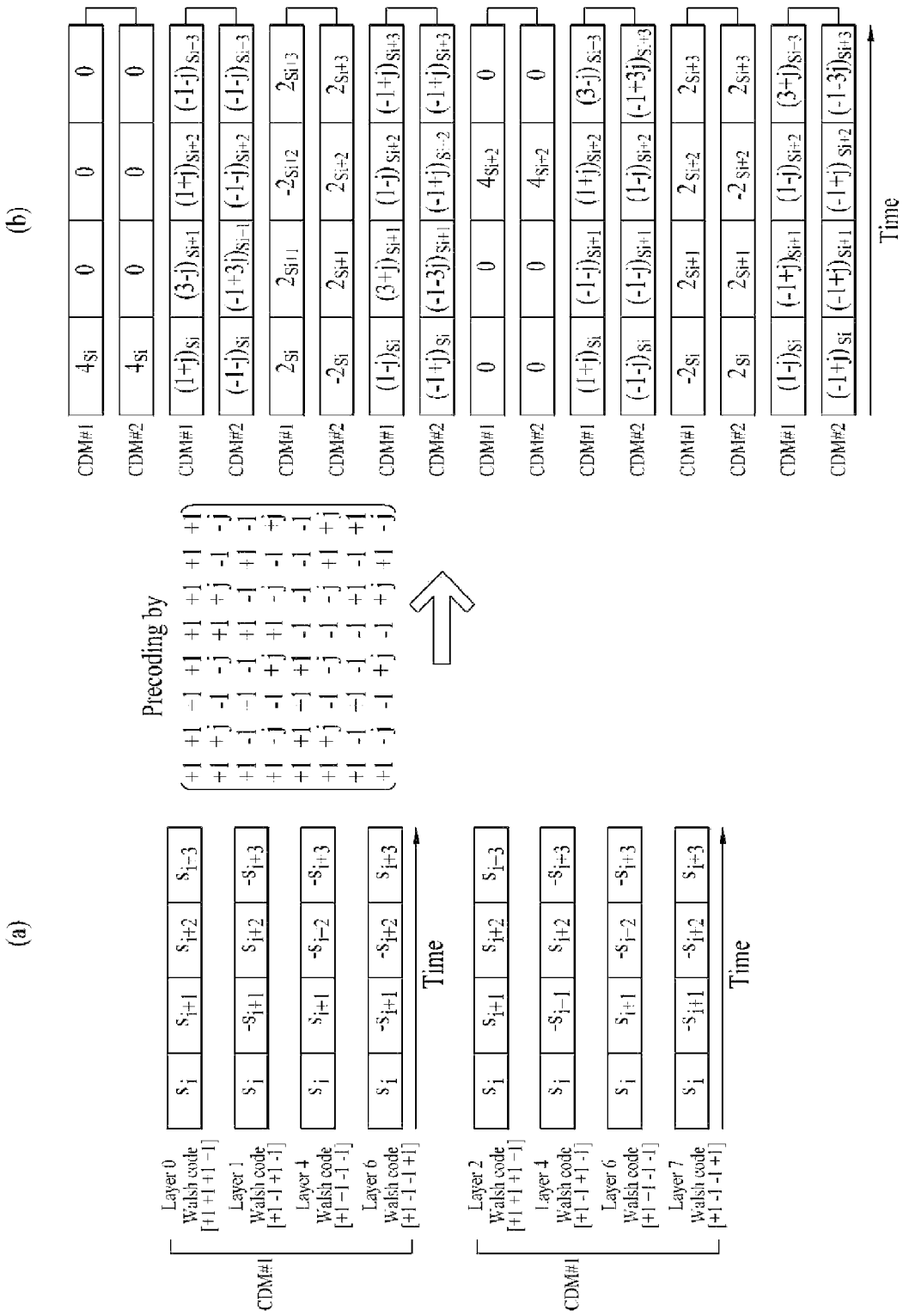

Let a DRS port corresponding to layer m be denoted by DRS port m. Then if multiplexing OCCs are allocated as illustrated in FIG. 32, each layer may be spread as illustrated in FIG. 33($a$). In FIG. 33, $s_i$ represents the position of a DRS OFDM symbol in a subframe. From the viewpoint of a layer, $s_i$, $s_{i+1}$, $s_{i+2}$ and $s_{i+3}$ have the same value. CDM #1 and CDM #2 represent CDM group 1 and CDM group 2, respectively.

Referring to FIG. 33, a DRS for each layer is spread with a predetermined spreading OCC, multiplied by a precoding matrix W in the precoder 304, and then distributes to the RE mappers 305, corresponding respectively to Ant #0 to Ant #7, which is expressed as $$\begin{pmatrix} Ant\#0 \\ Ant\#1 \\ Ant\#2 \\ Ant\#3 \\ Ant\#4 \\ Ant\#5 \\ Ant\#6 \\ Ant\#7 \end{pmatrix} = W \times \begin{pmatrix} \text{layer } 0 \times [+1 \quad +1 \quad +1 \quad +1] \\ \text{layer } 1 \times [+1 \quad -1 \quad +1 \quad -1] \\ \text{layer } 2 \times [+1 \quad +1 \quad +1 \quad +1] \\ \text{layer } 3 \times [+1 \quad -1 \quad +1 \quad -1] \\ \text{layer } 4 \times [+1 \quad +1 \quad -1 \quad -1] \\ \text{layer } 5 \times [+1 \quad +1 \quad -1 \quad -1] \\ \text{layer } 6 \times [+1 \quad -1 \quad -1 \quad +1] \\ \text{layer } 7 \times [+1 \quad -1 \quad -1 \quad +1] \end{pmatrix} = \quad \text{[Formula 6]}$$

$$\begin{pmatrix} +1 & +1 & +1 & +1 & +1 & +1 & +1 & +1 \\ +1 & +j & -1 & -j & +1 & +j & -1 & -j \\ +1 & -1 & +1 & -1 & +1 & -1 & +1 & -1 \\ +1 & -j & -1 & +j & +1 & -j & -1 & +j \\ +1 & +1 & +1 & +1 & -1 & -1 & -1 & -1 \\ +1 & +j & -1 & -j & -1 & -j & +1 & +j \\ +1 & -1 & +1 & -1 & -1 & +1 & -1 & +1 \\ +1 & -j & -1 & +j & -1 & +j & +1 & -j \end{pmatrix} \times$$

$$\begin{pmatrix} s_i & s_{i+1} & s_{i+2} & s_{i+3} \\ s_i & -s_{i+1} & s_{i+2} & -s_{i+3} \\ s_i & s_{i+1} & s_{i+2} & s_{i+3} \\ s_i & -s_{i+1} & s_{i+2} & -s_{i+3} \\ s_i & s_{i+1} & -s_{i+2} & -s_{i+3} \\ s_i & s_{i+1} & -s_{i+2} & -s_{i+3} \\ s_i & -s_{i+1} & -s_{i+2} & s_{i+3} \\ s_i & -s_{i+1} & -s_{i+2} & s_{i+3} \end{pmatrix}$$

Figure 34:
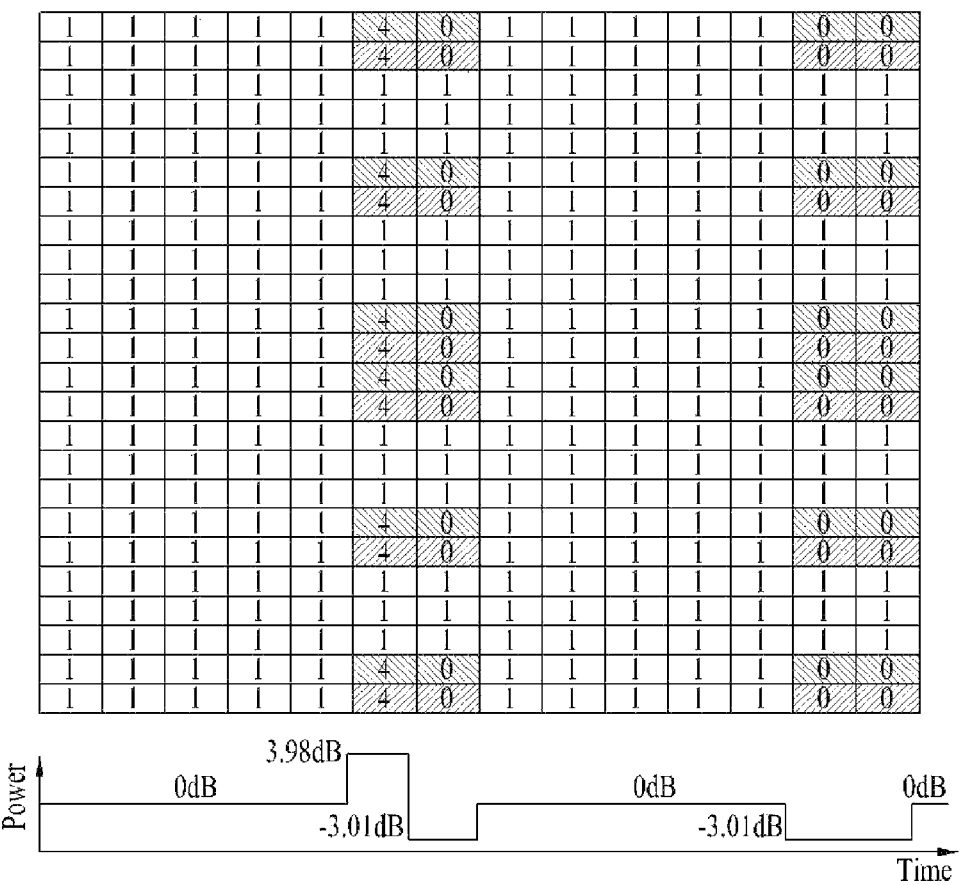

Referring to FIG. 33($b$), Ant #0 may require very high power for DRS OFDM symbol 0 and Ant #4 may require very high power for DRS OFDM symbol 2. For two PRBs in a subframe, the power ratios among OFDM symbols allocated to Ant #0 are calculated as illustrated in FIG. 34. Given a power of 1 for a data RE, a power per RE in each OFDM symbol is calculated over two PRBs in FIG. 34. Referring to FIG. 34, for Ant #0, the first DRS OFDM symbol has a peak power, while no power is allocated to the other DRS OFDM symbols. Thus the other DRS OFDM symbols are at a lower power level than non-DRS OFDM symbols.

Meanwhile, if OCCs are allocated with a predetermined offset between two CDM groups according to the present invention, for example, if OCCs are allocated as illustrated in FIG. 31($a$), DRSs are distributed to Ant #0 to Ant #7 as follows.

$$\begin{pmatrix} Ant\#0 \\ Ant\#1 \\ Ant\#2 \\ Ant\#3 \\ Ant\#4 \\ Ant\#5 \\ Ant\#6 \\ Ant\#7 \end{pmatrix} = W \times \begin{pmatrix} \text{layer } 0 \times [+1 \quad +1 \quad +1 \quad +1] \\ \text{layer } 1 \times [+1 \quad -1 \quad +1 \quad -1] \\ \text{layer } 2 \times [+1 \quad +1 \quad +1 \quad +1] \\ \text{layer } 3 \times [+1 \quad -1 \quad +1 \quad -1] \\ \text{layer } 4 \times [+1 \quad +1 \quad -1 \quad -1] \\ \text{layer } 5 \times [-1 \quad -1 \quad +1 \quad +1] \\ \text{layer } 6 \times [+1 \quad -1 \quad -1 \quad +1] \\ \text{layer } 7 \times [-1 \quad +1 \quad +1 \quad -1] \end{pmatrix} = \quad \text{[Formula 7]}$$

$$\begin{pmatrix} +1 & +1 & +1 & +1 & +1 & +1 & +1 & +1 \\ +1 & +j & -1 & -j & +1 & +j & -1 & -j \\ +1 & -1 & +1 & -1 & +1 & -1 & +1 & -1 \\ +1 & -j & -1 & +j & +1 & -j & -1 & +j \\ +1 & +1 & +1 & +1 & -1 & -1 & -1 & -1 \\ +1 & +j & -1 & -j & -1 & -j & +1 & +j \\ +1 & -1 & +1 & -1 & -1 & +1 & -1 & +1 \\ +1 & -j & -1 & +j & -1 & +j & +1 & -j \end{pmatrix} \times$$

$$\begin{pmatrix} s_i & s_{i+1} & s_{i+2} & s_{i+3} \\ s_i & -s_{i+1} & s_{i+2} & -s_{i+3} \\ s_i & s_{i+1} & s_{i+2} & s_{i+3} \\ s_i & -s_{i+1} & s_{i+2} & -s_{i+3} \\ s_i & s_{i+1} & -s_{i+2} & -s_{i+3} \\ -s_i & -s_{i+1} & s_{i+2} & s_{i+3} \\ s_i & -s_{i+1} & -s_{i+2} & s_{i+3} \\ -s_i & +s_{i+1} & +s_{i+2} & -s_{i+3} \end{pmatrix}$$

Figure 35:
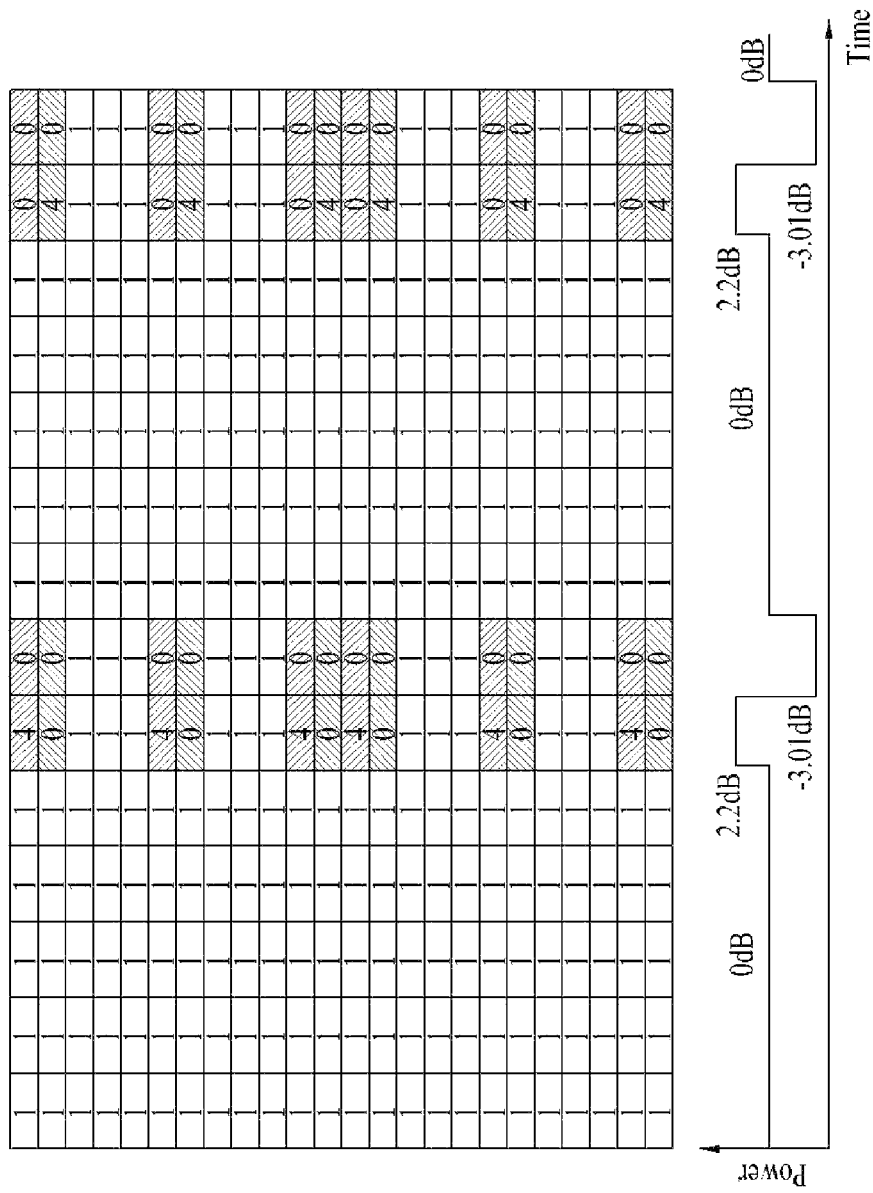

Among antenna-specific symbols distributed according to [Formula 7], the power of symbols distributed to Ant #0 may be represented as illustrated in FIG. 35. Compared to FIG. 34 where the OFDM symbol power ranges from −3.1 dB to 3.98 dB, it ranges from −3.1 dB to 2.2 dB in FIG. 35(a) and thus has a reduced power variation. The power of symbols allocated to Ant #0 over one RB of a subframe may be represented as illustrated in FIG. 36.

Figure 36:
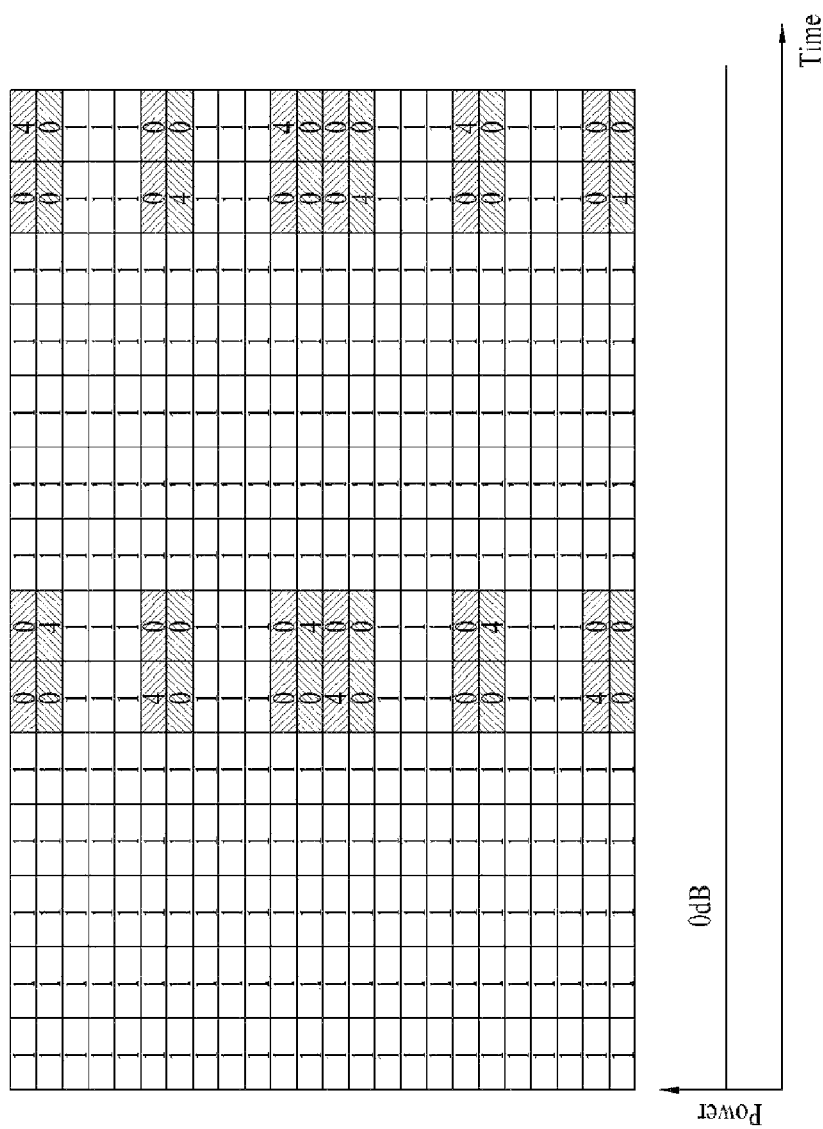

Meanwhile, if OCCs are allocated as illustrated in FIG. 31(b), power may be more uniformly distributed across OFDM symbols as illustrated in FIG. 36.

Embodiment 9

Phase offsets may be used to eliminate power imbalance. Embodiment 9 seeks power balancing by applying a phase offset to at least one of CDM groups. Embodiment 9 may be implemented in combination with any of the foregoing embodiments for eliminating power imbalance. It is also possible to use only a phase offset without an OCC offset.

Figure 37:
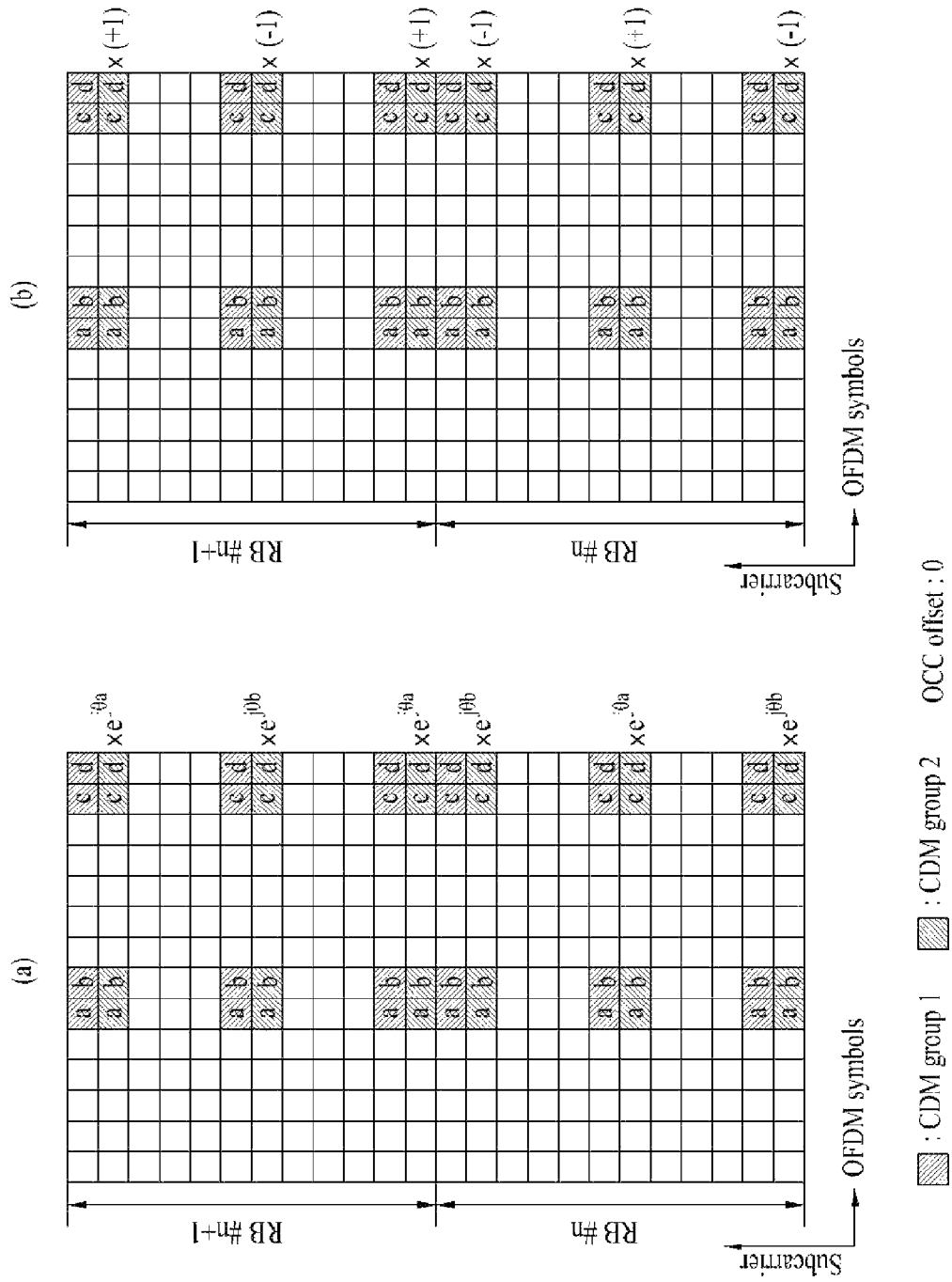
Figure 38:
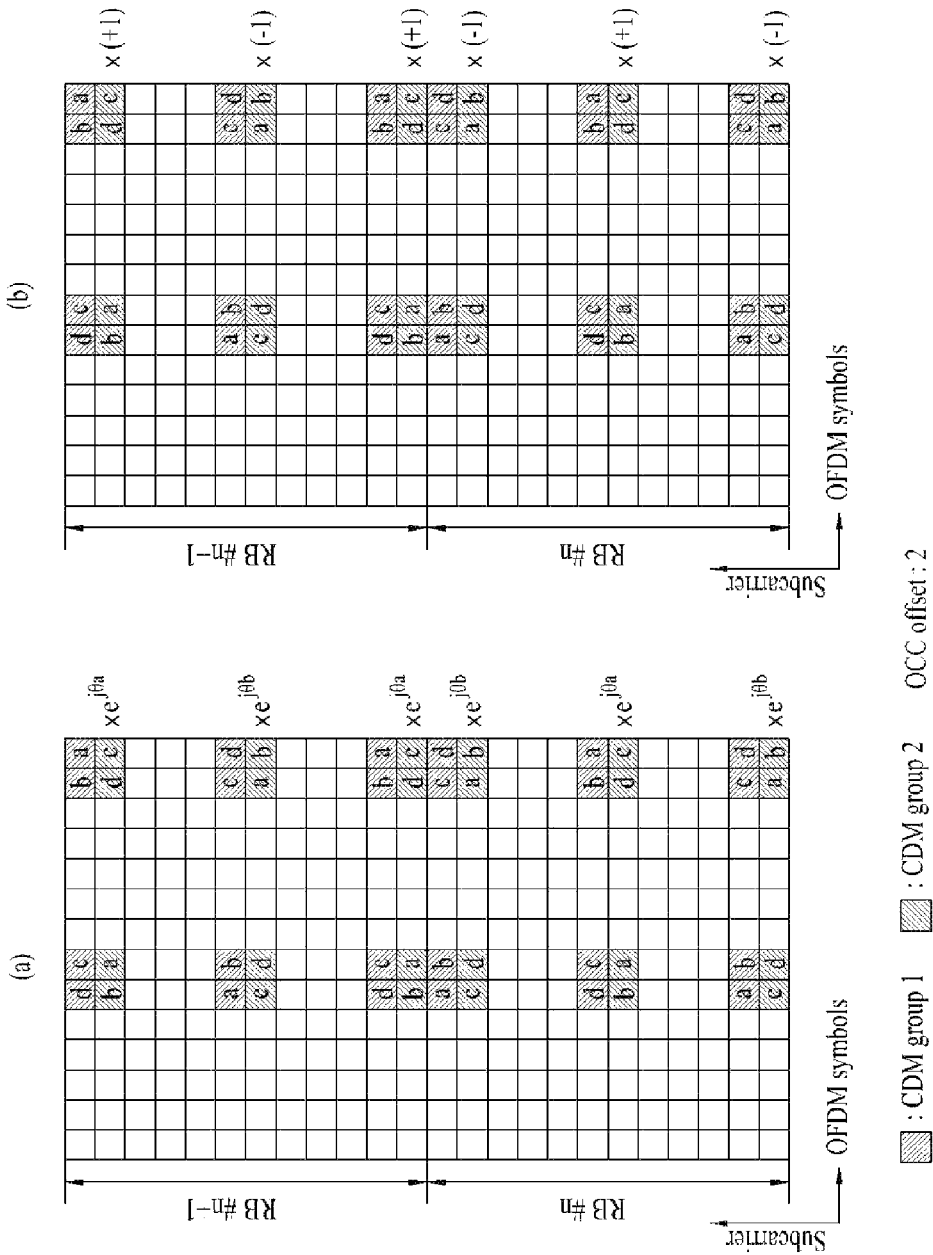

FIGS. 37 and 38 illustrate OCC allocation using phase offsets according to an embodiment of the present invention.

In FIG. 37, two phase offsets are alternately applied only to CDM group 2, with no OCC offset, that is, with an OCC offset of 0. Referring to FIG. 37(a), DRSs multiplexed to CDM group 2 are alternately multiplied by two phase offsets $\theta_a$ and $\theta_b$ on DRS subcarriers.

In FIG. 38, two phase offsets are alternately applied to CDM group 2, with an OCC offset of 2. Specifically, OCCs are allocated as illustrated in FIG. 31(b) and DRSs multiplexed in CDM group 2 are multiplied alternately by two phase offsets $\theta_a$ and $\theta_b$ on DRS sub carriers.

For instance, if $\theta_a$ and $\theta_b$ are 0 and $\pi$, respectively, the DRSs multiplexed in CDM group 2 are multiplied by 1 and −1, alternately on DRS subcarriers, as illustrated in FIGS. 37(b) and 38(b).

Embodiment 10

Different phases may be applied according to DRS ports. While the same phase offset is applied to each DRS subcarrier for all DRS ports allocated to a CDM group in Embodiment 9, different phase offsets are applied according to DRS ports in Embodiment 10. That is, different phase offsets are multiplied with layers on the same DRS subcarrier. In addition, the same phase offset is applied to layers spread with the same OCC and DRSs corresponding to the layers. To repeat the same OCC pattern in every predetermined number of RBs, a phase offset may be set such that the product of the phase offset and the number of DRS subcarriers included in the predetermined number of RBs is an integer multiple of $2\pi$.

Figure 39:
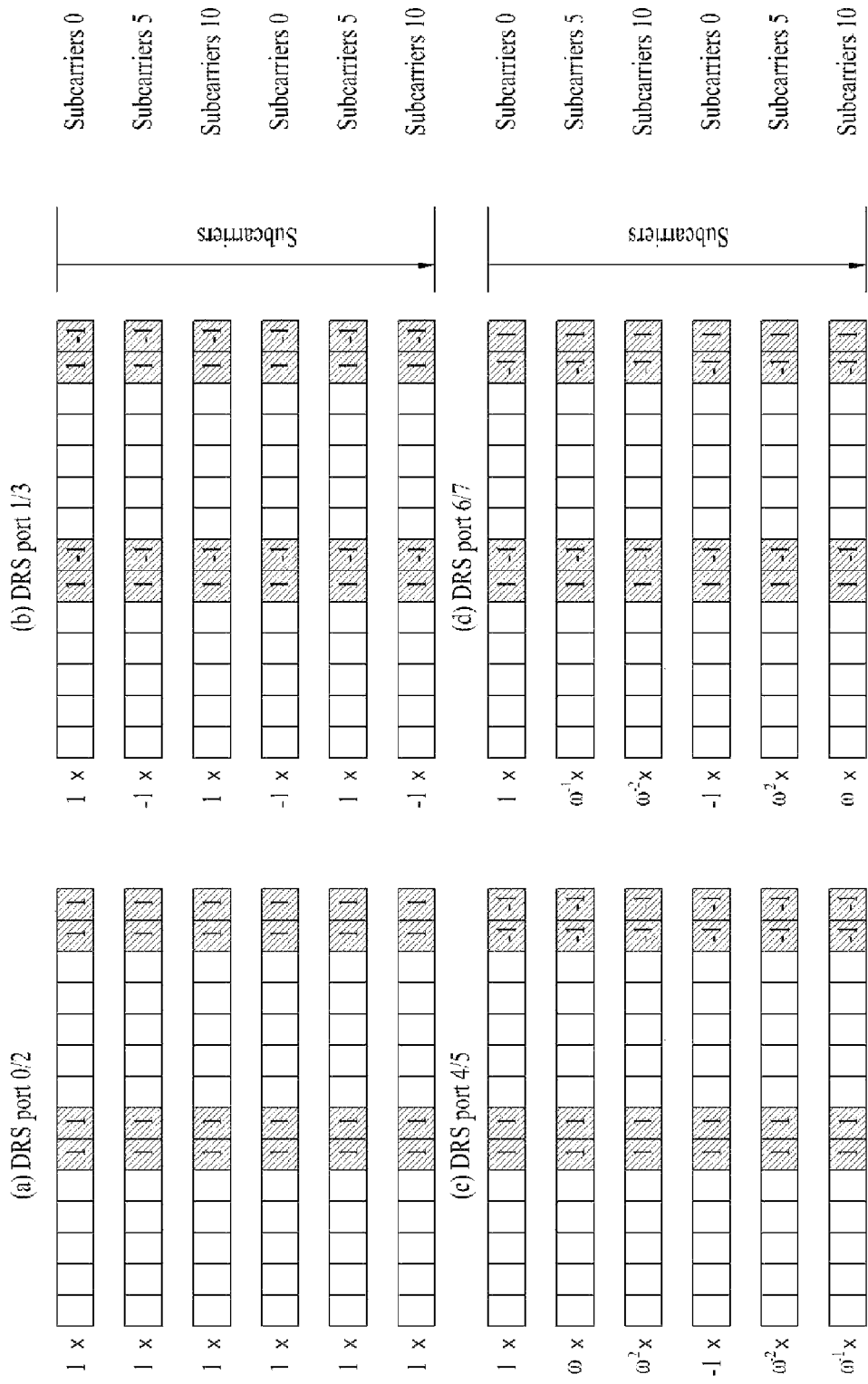
FIG. 39 illustrates exemplary phase offsets for DRS subcarriers of respective DRS ports.

FIG. 39 illustrates phase offsets applied to DRS subcarriers for each DRS port. Particularly, FIG. 39 illustrates a case where the layer and DRS of each DRS port are spread with a spreading OCC listed in [Table 3]. In FIG. 39, subcarriers 0, 5 and 10 are the logical indexes of subcarriers in an RB, mapped to DRS subcarriers 0, 1 and 2.

Referring to FIG. 39, irrespective of CDM groups, phase offsets are applied in the same pattern to layers and DRSs corresponding to DRS port 0 and DRS port 2, to layers and DRSs corresponding to DRS port 1 and DRS port 3, to layers and DRSs corresponding to DRS port 4 and DRS port 5, and to layers and DRSs corresponding to DRS port 6 and DRS port 7. Referring to FIG. 39(a), DRS subcarriers have a phase offset of 0 for each DRS port. Referring to FIG. 39(b), DRS subcarriers have a phase offset of $\pi$ for each DRS port. In FIGS. 39(c) and 39(d), $\omega$ is $e^{j(\pi/3)}$. The phase offset between DRS subcarriers is $\pi/3$ for each DRS port in FIG. 39(c) and $-\pi/3$ for each DRS port in FIG. 39(d).

Figure 40:
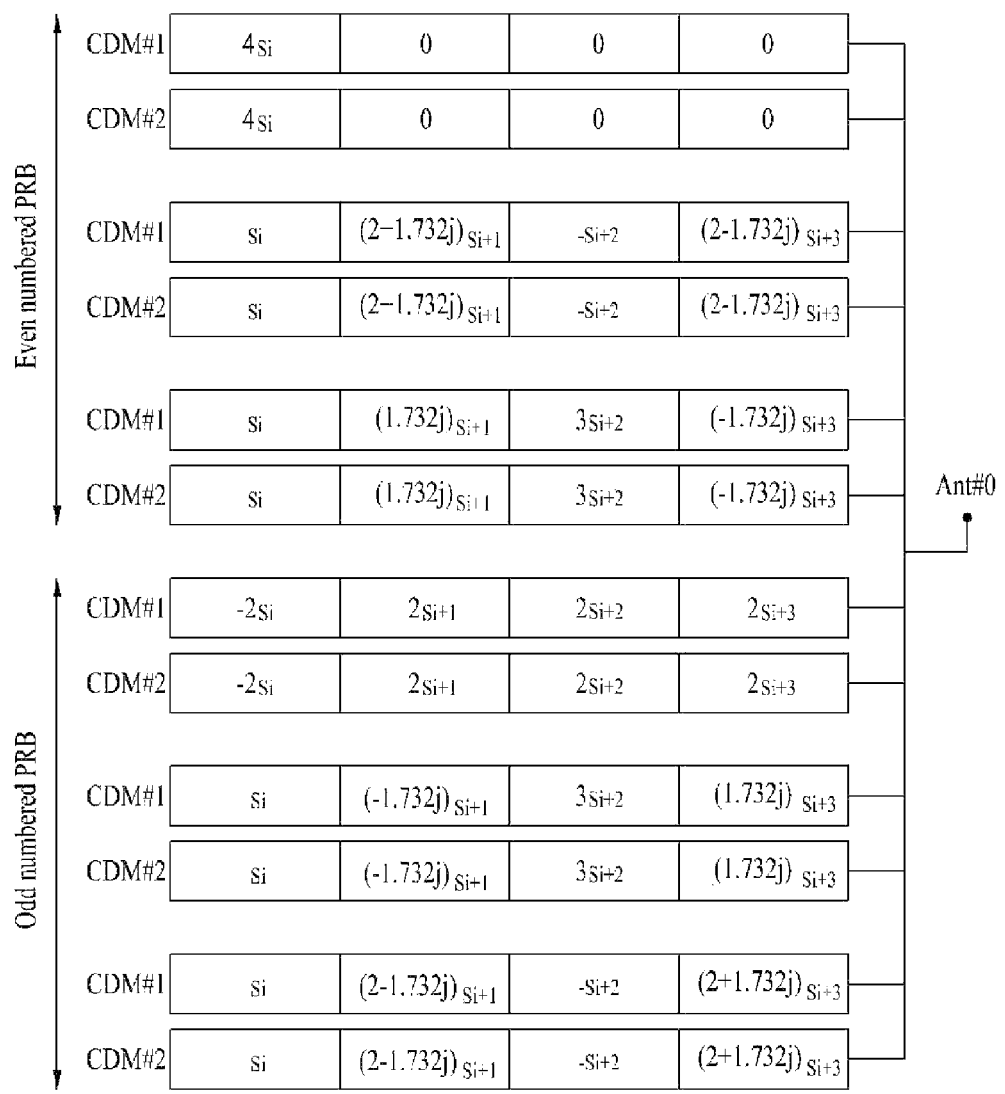
FIGS. 40, 41 and 42 are views referred to for describing advantages of applying phase offsets according to DRS subcarriers for each layer according to embodiments of the present invention.
Figure 41:
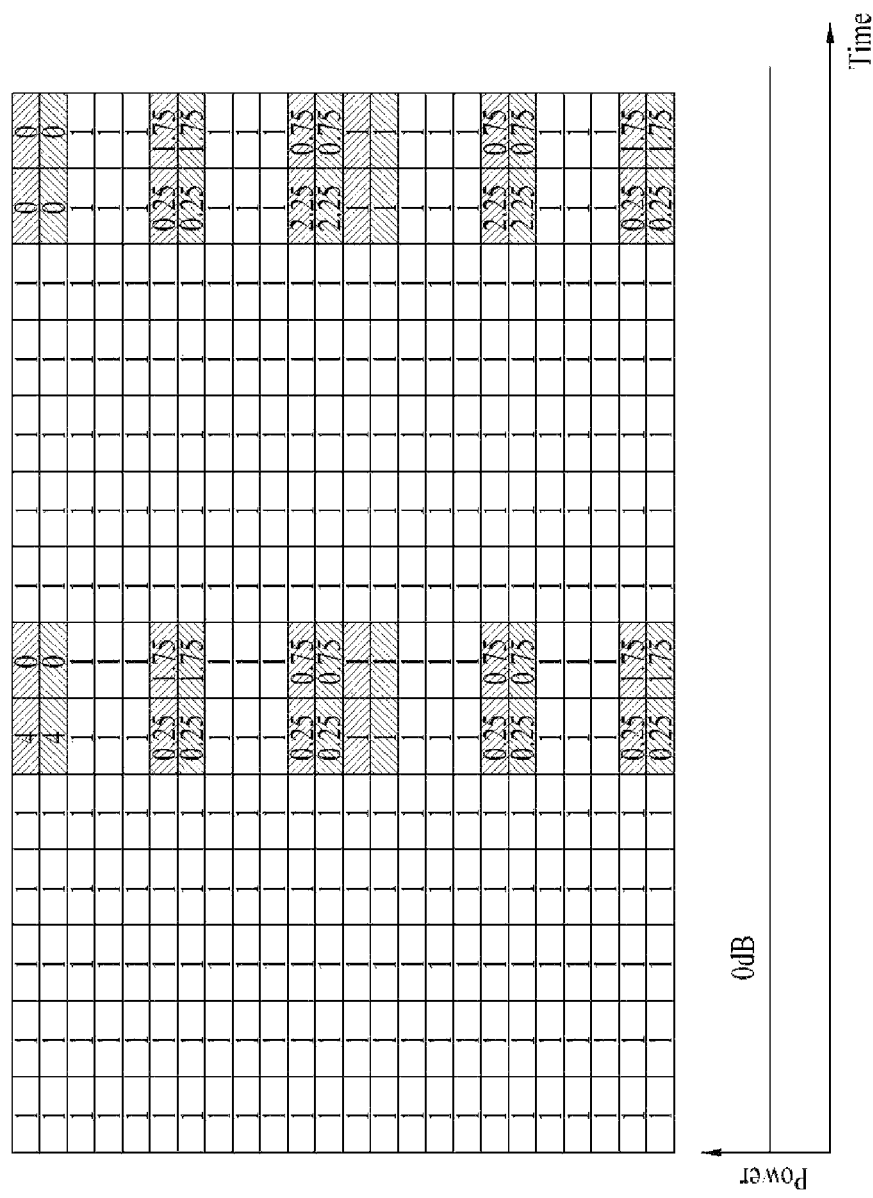
Figure 42:
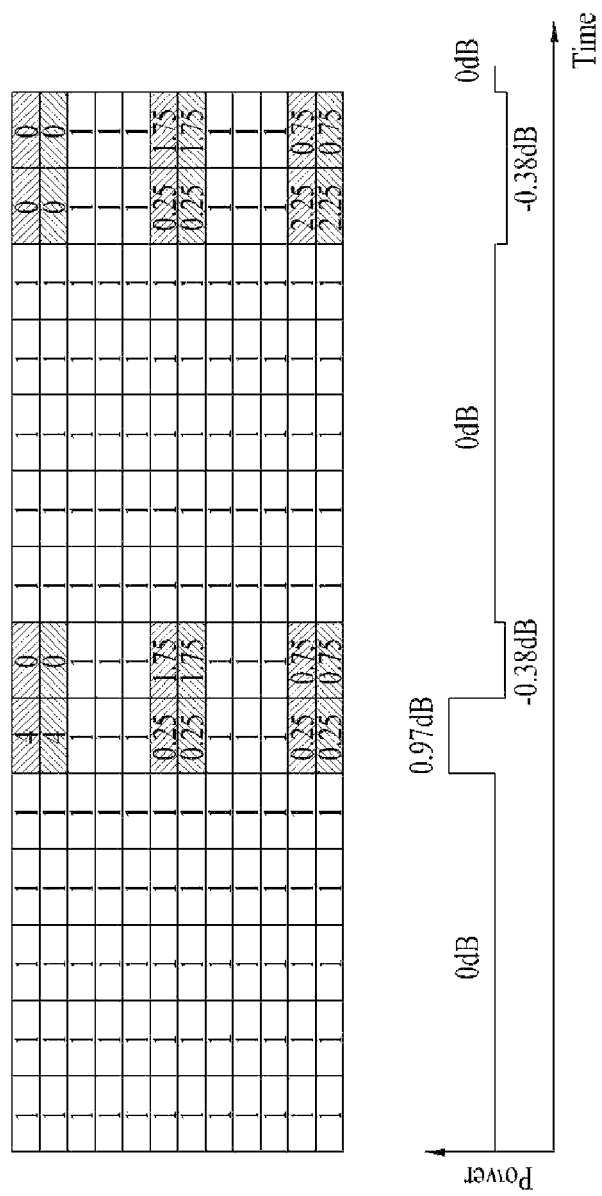

FIGS. 40, 41 and 42 are views referred to for describing advantages of applying phase offsets according to DRS subcarriers for each layer according to embodiments of the present invention.

FIG. 40 illustrates DRSs distributed to Ant #0 over two RBs in a subframe, when a phase offset is applied on a layer basis without an OCC offset between CDM groups. In FIG. 40, phase offsets are applied according to DRS subcarriers for each layer as illustrated in FIG. 39 and the precoding matrix illustrated in FIG. 34 is used.

Referring to FIG. 41, when phase offsets are applied according to DRS subcarriers for each layer, a uniform power distribution across OFDM symbols in two RBs can be achieved. According to this embodiment, however, since different phase offsets are applied to different layers as well as different DRS subcarriers, multiplexing of a plurality of layers is complicated. Compared to other embodiments related to power balancing based on an OCC offset between CDM groups, this embodiment requires higher-performance processors 400a and 400b for a transmitter and a receiver.

Power is uniformly distributed across OFDM symbols in an even number of RBs as illustrated in FIG. 41, whereas power imbalance still exists in an odd number of RBs as illustrated in FIG. 42. Perfect power balance may not be achieved for an odd number of RBs, only with phase offsets.

Figure 43:
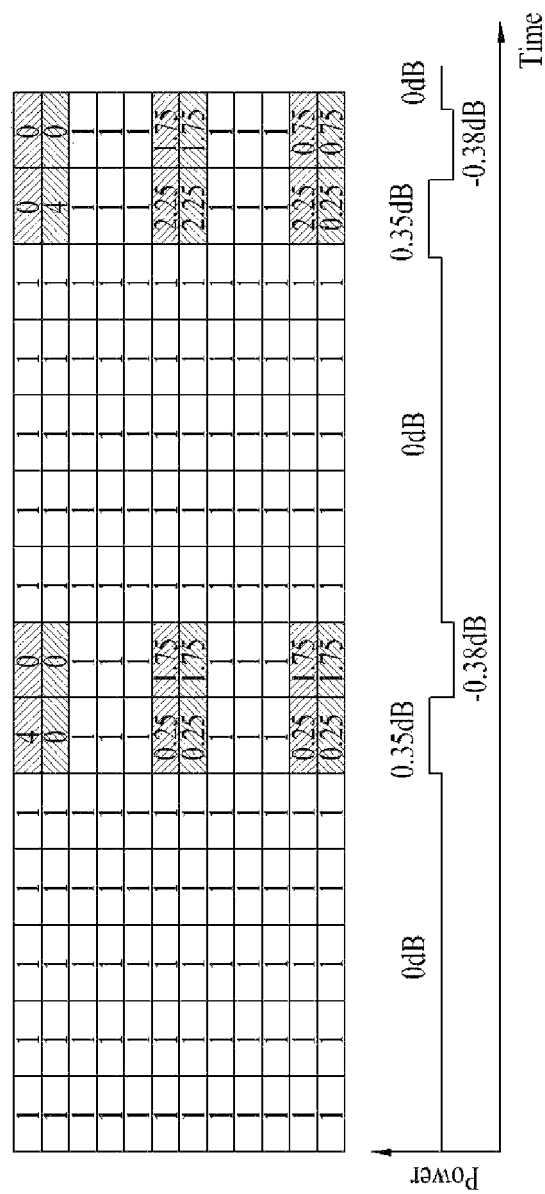
FIG. 43 is a view referred to for describing advantages achieved when OCCs are allocated so that there is a predetermined OCC offset between two CDM groups and phase offsets are applied according to DRS subcarriers for each layer according to embodiments of the present invention.

FIG. 43 is a view referred to for describing advantages achieved when OCCs are allocated so that there is a predetermined OCC offset between two CDM groups and phase offsets are applied according to DRS subcarriers for each layer according to embodiments of the present invention.

As noted from FIG. 43, the use of both an OCC offset and a phase offset may lead to a more uniform power distribution even for an odd number of RBs.

According to the present invention, a BS may spread a DRS for each layer with a predetermined spreading OCC in one of the afore-described embodiments. The BS precodes the spread DRSs with a predetermined precoding matrix, thus outputting antenna-specific symbols. For example, referring to FIG. 33, the BS spreads a part or all of layer 0 to layer 8 with predetermined Walsh codes and precodes the spread layers with a precoding matrix W, thus distributing the precoded symbols to a part or all of Ant #0 to Ant #7. The distributed symbols are converted to an OFDM signal and transmitted to a UE(s) within the coverage of the BS.

According to the present invention, the BS processor 400b may allocate one or more layers to a specific subframe. In this case, the BS processor 400b may allocate DRSs for demodulation of the respective layers to the specific subframe. The BS transmitter 100b transmits the allocated layers along with the DRSs under the control of the BS processor 400b.

The BS processor 400b may control the BS transmitter 100b to transmit the DRSs in one or more CDM groups according to one of the afore-described embodiments. For this purpose, the BS processor 400b may allocate spreading OCCs to the layers according to one of the afore-described embodiments. The BS processor 400b spreads a DRS(DRSs) corresponding to a transmission layer(s) with the predetermined spreading code(s) and controls the BS transmitter 100b to allocate the spread DRSs to a predetermined CDM group. The BS transmitter 100b may transmit the spread DRSs in the CDM group under the control of the BS processor 400b. The RE mappers 305 map the elements of the spread DRS sequences to DRS REs of the CDM group under the control of the BS processor 400b.

That is, the BS processor 400b may allocate a multiplexing OCC to one or more CDM groups according to one of the afore-described embodiments. The BS processor 400b multiplexes a plurality of DRSs using a multiplexing OCC allocated to a DRS RE. The BS transmitter 400b transmits the multiplexed DRSs on the DRS RE.

Under the control of the BS processor 400b, the BS transmitter 100b spreads a DRS for each layer, maps each element of the spread DRS to one DRS RE, and transmit the DRS on the mapped DRS RE(s). The RE mappers 305 map a layer(s) and a DRS(s) corresponding to the layer(s) to a subframe. The OFDM/SC-FDM signal generators 306 convert the mapped layer(s) and DRS(s) to an OFDM signal and the OFDM signal is transmitted to a UE(s) within the coverage of the BS.

A UE receives the OFDM signal from the BS and recovers antenna-specific symbols from the received OFDM signal. The UE recovers one or more layer signals from the antenna-specific symbols using the precoding matrix W used in the BS. The precoding matrix W may be preset between the UE and the BS. Alternatively or additionally, the UE or BS may select an appropriate precoding matrix W and signal it to the BS or UE.

The UE may detect a layer and/or a DRS destined for the UE from among the recovered layer signals. For example, referring to FIG. 33, the UE may recover signals of DRS REs by recovering antenna-specific symbols from the received OFDM signals as illustrated in FIG. 33(b). The UE recovers one or more layer signals using the precoding matrix W from the DRS RE signals. If the BS transmits a plurality of layers, a plurality of DRSs are multiplexed in DRS REs. The UE may acquire a value corresponding to an integer multiple of the layer signals by multiplying the spreading OCCs used for spreading the layers for the UE by the multiplexed signal.

For example, referring to FIG. 33(a), it is assumed that the UE receives the spread DRSs of layer 0, layer 1, layer 4 and layer 6 on a DRS subcarrier of CDM group 1 (CDM #1) over four DRS OFDM symbols. Let a reference signal for layer i be denoted by DRS i. Then the signal that the UE has received on the DRS subcarrier of CDM group 1 over four DRS OFDM symbols may be related to (DRS 0)×[+1 +1 +1 +1]+(DRS1)×[+1 −1 +1 −1]+(DRS 4)×[+1 +1 −1 −1]+(DRS 6)×[+1 −1 −1 +1]. If layer 1 is destined for the UE, the UE may extract DRS 1 by multiplying the received signal by the spreading OCC used for layer 1, $[+1\ -1\ +1\ -1]^T$. The UE may demodulate the layer using the DRS of the layer.

According to the present invention, the UE receiver 300a may receive one or more layers from the BS. The UE receiver 300a may receive from the BS one or more DRSs multiplexed in one or more CDM groups, destined for the UE according to one of the foregoing embodiments of the present invention. The UE processor 400a controls the UE receiver 300a to convert the received OFDM signal to a baseband signal. The UE receiver 300a generates antenna-specific symbols by demapping the baseband signal from REs under the control of the UE processor 400a. Under the control of the UE processor 400a, the UE receiver 300a recovers the one or more layers transmitted by the BS from the antenna-specific symbols using the precoding matrix used for precoding by the BS. To demodulate a layer destined for the UE from among the one or more layers, the UE receiver 300a detects a DRS of the layer using a spreading OCC corresponding to the layer under the control of the UE processor 400a. The spreading OCC used for detection of the layer is determined according to an afore-described embodiment of the present invention. The UE processor 400a may control the UE receiver 300a to demodulate the layer using the detected DRS.

While the above embodiments of the present invention has been described in the context that OCCs of length 4 are multiplexed in two CDM groups, they are also applicable to multiplexing of OCCs of any other length into any other number of CDM groups. For instance, power balance across OFDM symbols can be achieved by implementing the embodiments of the present invention in the same manner, when OCCs of a length larger than 4 are multiplexed in one or two CDM groups or in three or more CDM groups.

As is apparent from the above description, the present invention uniformly distributes transmission power across all OFDM symbols of a subframe.

The embodiments of the present invention can be applied to a BS, a UE, or other communication devices in a wireless communication system.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for transmitting reference signals (RSs) through an N number of RS ports by a base station (BS) in a wireless communication system, the method comprising:
spreading, by the BS, the RSs with orthogonal sequences according to a following Table; and
transmitting, by the BS, the spread RSs on a code division multiplexing (CDM) group 1 and a CDM group 2 according to the following Table,

TABLE

| RS port | Orthogonal sequence [$w_p(0)\ w_p(1)\ w_p(2)\ w_p(3)$] | CDM group |
|---|---|---|
| 0 | [+1 +1 +1 +1] | 1 |
| 1 | [+1 −1 +1 −1] | 1 |
| 2 | [+1 +1 +1 +1] | 2 |
| 3 | [+1 −1 +1 −1] | 2 |
| 4 | [+1 +1 −1 −1] | 1 |
| 5 | [−1 −1 +1 +1] | 2 |
| 6 | [+1 −1 −1 +1] | 1 |
| 7 | [−1 +1 +1 −1] | 2 | where $w_p(i)$ (i=0, 1, 2, 3) is a weight multiplied with an RS of an RS port p among the N number of RS ports in an i-th orthogonal frequency division multiplexing (OFDM) symbol among 4 OFDM symbols used for transmission of the RSs in a subframe, and where N is more than 4.

2. The method according to claim 1, wherein the RS port p corresponds to an antenna port p+7.

3. The method according to claim 1, wherein the CDM group 1 includes the 4 OFDM symbols in a time domain of the subframe and a plurality of first subcarriers, that are shifted by 5 subcarriers from each other, in a frequency domain of the subframe, and the CDM group 2 includes the 4 OFDM symbols in the time domain of the subframe and a plurality of second subcarriers, each of which is adjacent to one of the first subcarriers, in the frequency domain of the subframe.

4. The method according to claim 1, wherein the RSs are used for demodulation of a physical downlink shared channel (PDSCH) in a resource block on which the RSs are transmitted.

5. A method for receiving reference signals (RSs) of an N number of RS ports by a user equipment (UE) in a wireless communication system, the method comprising:
receiving, by the UE, the RSs, the received RSs having been spread with orthogonal sequences on a code division multiplexing (CDM) group 1 and a CDM group 2 according to a following Table,

TABLE

| RS port | Orthogonal sequence [$w_p(0)\ w_p(1)\ w_p(2)\ w_p(3)$] | CDM group |
|---|---|---|
| 0 | [+1 +1 +1 +1] | 1 |
| 1 | [+1 −1 +1 −1] | 1 |
| 2 | [+1 +1 +1 +1] | 2 |
| 3 | [+1 −1 +1 −1] | 2 |
| 4 | [+1 +1 −1 −1] | 1 |
| 5 | [−1 −1 +1 +1] | 2 |
| 6 | [+1 −1 −1 +1] | 1 |
| 7 | [−1 +1 +1 −1] | 2 | where $w_p(i)$ (i=0, 1, 2, 3) is a weight multiplied with an RS of an RS port p among the N number of RS ports in an i-th orthogonal frequency division multiplexing (OFDM) symbol among 4 OFDM symbols used for reception of the RSs in a subframe, where N is more than 4.

6. The method according to claim 5, wherein the RS port p corresponds to an antenna port p+7.

7. The method according to claim 5, wherein the CDM group 1 includes the 4 OFDM symbols in a time domain of the subframe and a plurality of first subcarriers, that are shifted by 5 subcarriers from each other, in a frequency domain of the subframe, and the CDM group 2 includes the 4 OFDM symbols in the time domain of the subframe and a plurality of second subcarriers, each of which is adjacent to one of the first subcarriers, in the frequency domain of the subframe.

8. The method according to claim 5, wherein the RSs are used for demodulation of a physical downlink shared channel in a resource block on which the RSs are received.

9. A base station configured to transmit reference signals (RSs) through an N number of RS ports in a wireless communication system, the BS comprising:
a transmitter; and
a processor, operatively coupled to the transmitter, configured to
spread the RSs with orthogonal sequences according to a following Table; and
transmit the spread RSs on a Code Division Multiplexing (CDM) group 1 and a CDM group 2 according to the following Table,

TABLE

| RS port | Orthogonal sequence [$w_p(0)\ w_p(1)\ w_p(2)\ w_p(3)$] | CDM group |
|---|---|---|
| 0 | [+1 +1 +1 +1] | 1 |
| 1 | [+1 −1 +1 −1] | 1 |
| 2 | [+1 +1 +1 +1] | 2 |
| 3 | [+1 −1 +1 −1] | 2 |
| 4 | [+1 +1 −1 −1] | 1 |
| 5 | [−1 −1 +1 +1] | 2 |
| 6 | [+1 −1 −1 +1] | 1 |
| 7 | [−1 +1 +1 −1] | 2 | where $w_p(i)$ (i=0, 1, 2, 3) is a weight multiplied with an RS of an RS port p among the N number of RS ports in an i-th orthogonal frequency division multiplexing (OFDM) symbol among 4 OFDM symbols used for transmission of the RSs in a subframe, where N is more than 4.

10. The BS according to claim 9, wherein the RS port p corresponds to an antenna port p+7.

11. The BS according to claim 9, wherein the CDM group 1 includes the 4 OFDM symbols in a time domain of the subframe and a plurality of first subcarriers, that are shifted by 5 subcarriers from each other, in a frequency domain of the subframe, and the CDM group 2 includes the 4 OFDM symbols in the time domain of the subframe and a plurality of second subcarriers, each of which is adjacent to one of the first subcarriers, in the frequency domain of the subframe.

12. The BS according to claim 9, wherein the RSs are used for demodulation of a physical downlink shared channel in a resource block on which the RSs are transmitted.

13. A user equipment (UE) configured to receive reference signals (RSs) of an N number of RS ports in a wireless communication system, the UE comprising:
a receiver; and
a processor, operatively coupled to the receiver, configured to receive the RSs, the received RSs having been spread with orthogonal sequences on a code division multiplexing (CDM) group 1 and a second CDM group 2 according to a following Table,

TABLE

| RS port | Orthogonal sequence [$w_p(0)\ w_p(1)\ w_p(2)\ w_p(3)$] | CDM group |
|---|---|---|
| 0 | [+1 +1 +1 +1] | 1 |
| 1 | [+1 −1 +1 −1] | 1 |
| 2 | [+1 +1 +1 +1] | 2 |
| 3 | [+1 −1 +1 −1] | 2 |
| 4 | [+1 +1 −1 −1] | 1 |
| 5 | [−1 −1 +1 +1] | 2 |
| 6 | [+1 −1 −1 +1] | 1 |
| 7 | [−1 +1 +1 −1] | 2 | where $w_p(i)$ (i=0, 1, 2, 3) is a weight multiplied with an RS of an RS port p among the N number of RS ports in an i-th orthogonal frequency division multiplexing (OFDM) symbol among 4 OFDM symbols used for reception of the RSs in a subframe, where N is more than 4.

14. The UE according to claim 13, wherein the RS port p corresponds to an antenna port p+7.

15. The UE according to claim 13, wherein the CDM group 1 includes the 4 OFDM symbols in a time domain of the subframe and a plurality of first subcarriers, that are shifted by 5 subcarriers from each other, in a frequency domain of the subframe, and the CDM group 2 includes the 4 OFDM symbols in the time domain of the subframe and a plurality of second subcarriers, each of which is adjacent to one of the first subcarriers, in the frequency domain of the subframe.

16. The UE according to claim 13, wherein the RSs are used for demodulation of a physical downlink shared channel in a resource block on which the RSs are received.

* * * * *